(12) United States Patent
Shibao et al.

(10) Patent No.: US 9,428,823 B2
(45) Date of Patent: Aug. 30, 2016

(54) SURFACE-TREATED STEEL SHEET AND METHOD OF MANUFACTURING THE SAME

(75) Inventors: Fumio Shibao, Tokyo (JP); Taihei Kaneto, Tokyo (JP); Masahiro Fuda, Tokyo (JP); Yoshio Kimata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/007,564

(22) PCT Filed: Mar. 29, 2012

(86) PCT No.: PCT/JP2012/058410
§ 371 (c)(1),
(2), (4) Date: Sep. 25, 2013

(87) PCT Pub. No.: WO2012/133671
PCT Pub. Date: Oct. 4, 2012

(65) Prior Publication Data
US 2014/0023879 A1    Jan. 23, 2014

(30) Foreign Application Priority Data
Mar. 29, 2011 (JP) ................................ 2011-072926

(51) Int. Cl.
*B32B 15/01*    (2006.01)
*C23C 2/06*     (2006.01)
(Continued)

(52) U.S. Cl.
CPC .............. *C23C 2/06* (2013.01); *B32B 15/013* (2013.01); *C09D 5/08* (2013.01); *C22C 38/00* (2013.01); *C23C 30/00* (2013.01); *C25D 3/565* (2013.01); *C25D 5/36* (2013.01); *C25D 5/48* (2013.01); *B05D 7/14* (2013.01); *B05D 7/51* (2013.01);
(Continued)

(58) Field of Classification Search
USPC .......................................................... 428/659
See application file for complete search history.

(56) References Cited

U.S. PATENT DOCUMENTS 3,420,754 A * 1/1969 Roehl .......................... 205/141
4,746,411 A   5/1988 Klos et al.
(Continued)

FOREIGN PATENT DOCUMENTS

| CN | 101321894 | 12/2008 |
|----|-----------|---------|
| JP | 55-054588 | 4/1980  |

(Continued)

OTHER PUBLICATIONS

International Search Report dated Jul. 3, 2012 issued in corresponding PCT Application No. PCT/JP2012/058410 [With English Translation].
(Continued)

*Primary Examiner* — Humera Sheikh
*Assistant Examiner* — Lucas Wang
(74) *Attorney, Agent, or Firm* — Kenyon & Kenyon LLP

(57) ABSTRACT

A surface-treated steel sheet includes: a steel sheet; and a coated layer which is formed on one surface or both surfaces of the steel sheet and includes zinc and vanadium, wherein the coated layer has a vanadium content of 1% or higher and 20% or less and a coating weight of 3 g/m$^2$ or higher and 40 g/m$^2$ or less, and has a plurality of dendritic arms that are grown in a thickness direction of the steel sheet, and a ratio x/y of a content x of vanadium that is present outside the arms to a content y of vanadium that is present inside the arms is 1.1 or higher and 3.0 or less in terms of vanadium element.

14 Claims, 9 Drawing Sheets

(51) Int. Cl.

| | | |
|---|---|---|
| *C09D 5/08* | (2006.01) | |
| *C25D 3/56* | (2006.01) | |
| *C25D 5/36* | (2006.01) | |
| *C25D 5/48* | (2006.01) | |
| *C23C 30/00* | (2006.01) | |
| *C22C 38/00* | (2006.01) | |
| *B05D 7/14* | (2006.01) | |
| *B05D 7/00* | (2006.01) | |

(52) U.S. Cl.
CPC .... *B05D 2350/65* (2013.01); *Y10T 428/12472* (2015.01); *Y10T 428/12799* (2015.01)

(56) References Cited

U.S. PATENT DOCUMENTS

| | | | | |
|---|---|---|---|---|
| 6,130,273 | A  * | 10/2000 | Edwards et al. | 523/351 |
| 2009/0090889 | A1 * | 4/2009 | Shinomiya et al. | 252/79.1 |
| 2009/0169903 | A1 * | 7/2009 | Kubota | 428/457 |
| 2011/0027611 | A1 * | 2/2011 | Takahashi et al. | 428/659 |
| 2012/0052307 | A1 * | 3/2012 | Plieth et al. | 428/425.8 |
| 2012/0070651 | A1 | 3/2012 | Morishita et al. | |

FOREIGN PATENT DOCUMENTS

| | | |
|---|---|---|
| JP | 55-152194 | 11/1980 |
| JP | 62-010292 | 1/1987 |
| JP | 6324092 | 2/1988 |
| JP | 11310900 | 11/1999 |
| JP | 2011-111633 | 6/2011 |
| KP | 10-2009-0025263 | 3/2009 |
| KP | 10-2009-0110256 | 10/2009 |
| WO | 2010/061964 | 6/2010 |
| WO | 2010/137726 | 12/2010 |

OTHER PUBLICATIONS

Hiroaki Nakano et al, Composite Electrodeposition of Zinc with Oxide of Less-noble Metals from Sulfate Solutions, Camp-ISIJ vol. 22(2009) 933 to 936, Kyushu University [With English Translation].

Hiroaki Nakano et al, Electrodeposition of Zn-V Oxide Composite from Sulfate Solutions , The Iron and Steel vol. 93 (2007), No. 11, 49-54 [With English Translation].

Satoshi Oue et al, Zn-V Composite Electrodeposition Behaviors from Aqueous Solutions, the Summary of 115th Lecture Conference of the Surface Finishing Society of Japan, 9A-26, p. 139-140, Faculty of Engineering, Kyushu University [With English Translation].

Hiroaki Nakano, Composite Electrodeposition of Next-Generation Zinc-Activated Metal for Purpose of Steel Plate Surface Treatment, Ferrum vol. 13, No. 4, p. 245, 2008.4.1, Graduate School of Engineering, Kyushu University [With English Translation].

Office Action dated May 6, 2014 issued in Chinese Application No. 201280015463.4 [with English Translation of Search Report].

Office Action dated Feb. 25, 2014 issued in Japanese Application No. JP 2013-048406 [with English Translation].

Notice of Allowance dated Mar. 28, 2014 issued in corresponding Korean Application No. KR 10-2013-7025125 [with English Translation].

Office Action dated Mar. 29, 2016 issued in related Japanese Application No. 2013048406 [with English Translation].

* cited by examiner

PRIOR ART

PRIOR ART

180° BENDING (0T BENDING)

SURFACE-TREATED STEEL SHEET AND METHOD OF MANUFACTURING THE SAME

TECHNICAL FIELD

The present invention relates to a surface-treated steel sheet having excellent corrosion resistance and painting adhesion and a method of manufacturing the same.

This application is a national stage application of International Application No. PCT/JP2012/058410, filed Mar. 29, 2012, which claims priority to Japanese Patent Application No. 2011-072926, filed on Mar. 29, 2011 and the content of which is incorporated herein by reference.

BACKGROUND ART

Hitherto, in various fields including household appliances, building materials, vehicles, and the like, surface-treated steel sheets (electrogalvanized steel sheets) having electrogalvanized layers have been used. In recent years, there is a demand for further enhancement in corrosion resistance for an electrogalvanized steel sheet.

As a method of enhancing corrosion resistance of the electrogalvanized steel sheet, increasing the coating amount (coating weight) of a zinc-coated layer has been considered. However, in a case where the coating weight of the zinc-coated layer is increased, manufacturing cost is increased, and workability or weldability is degraded.

As a method of enhancing the corrosion resistance or appearance of an electrogalvanized steel sheet, a technique of forming a painted film on the surface has been widely used hitherto (for example, Patent Document 1). However, when adhesion (painting adhesion) between a coated layer and the painted film of the electrogalvanized steel sheet is insufficient, even though the painted film is formed on the surface thereof, an effect of forming the painted film is not sufficiently obtained. Therefore, enhancing painting adhesion as well as enhancing corrosion resistance of the electrogalvanized steel sheet is required.

In a case where the painted film is formed on the surface, increasing the thickness of the painted film is considered in order to enhance corrosion resistance. However, since a conventional inorganic film containing a silane coupling agent and the like, which has been widely employed as the painted film, does not contain a resin component, it is difficult to increase the film thickness.

In addition, there is a demand for enhancing conductivity (hereinafter, referred to as grounding properties) as well as corrosion resistance as described above for the electrogalvanized steel sheet on which the painted film is formed. Although thinning the painted film is effective as measures of enhancing conductivity, when a thin film is formed as described above, an enhancement of corrosion resistance cannot be achieved.

As described above, according to the related art, even when a film is further formed on the surface of the electrogalvanized steel sheet, it is very difficult to satisfy characteristics of both corrosion resistance and conductivity.

In addition, in a case where a painted film is formed on the surface of a coated layer having a high surface roughness, corrosion resistance is degraded. The roughness of the coated layer is significantly dependent on the roughness of a steel sheet before being subjected to coating. Therefore, in the electrogalvanized steel sheet according to the related art, when the roughness of the steel sheet is high, the roughness of the coated layer is necessarily increased, resulting in a deterioration of corrosion resistance. In order to prevent the deterioration of corrosion resistance, reducing the roughness of the coated layer in order to improve the roughness of the steel sheet is considered. However, this is not preferable in terms of manufacturing cost. Therefore, recently, there is a demand for enhancing corrosion resistance without dependence on the roughness of a steel sheet.

In addition, in recent years, there is a surface-treated steel sheet on which a chemical conversion treatment layer is formed by performing a chemical conversion treatment on the surface of a metal sheet and a painted film is formed by applying a paint onto a chemical conversion treatment layer. However, it is difficult to enhance corrosion resistance while ensuring workability even with this painted film.

Regarding the above described, in recent years, enhancing corrosion resistance by containing a vanadium element into a zinc-coated layer of a surface-treated steel sheet subjected to electrogalvanizing has been examined. For example, in Non-Patent Documents 1 to 4, techniques of causing the surface of a copper sheet as a cathode to have complex electro deposition of a Zn—V oxide are described.

However, in a case where a coated layer containing zinc and oxides of vanadium is formed on the surface of a steel sheet by an electro coating method using the techniques described in Non-Patent Documents 1 to 4, cracks are likely to occur on the surface of the coated layer. When cracks are formed on the surface of the coated layer, a surface-treated steel sheet having sufficient corrosion resistance is not obtained.

PRIOR ART DOCUMENT

Patent Document

[Patent Document 1] International Publication No. WO2010/137726

Non-Patent Document

[Non-Patent Document 1] CAMP-ISIJ, Vol. 22 (2009), p. 933 to 936

[Non-Patent Document 2] The Iron and Steel Vol. 93 (2007), No. 11, p. 49-54

[Non-Patent Document 3] The Abstract of $115^{th}$ Lecture Conference of The Surface Finishing Society of Japan, 9A-26, p. 139 to 140

[Non-Patent Document 4] Ferrum Vol. 13, No. 4, p. 245, 2008.4.1

DISCLOSURE OF THE INVENTION

Problems to be Solved by the Invention

The present invention has been made taking the foregoing circumstances into consideration. That is, an object thereof is to provide a method of manufacturing a surface-treated steel sheet (an electro coated steel sheet) in which, when a coated layer that includes zinc and vanadium is formed on the surface of a steel sheet by an electro coating method, cracks are less likely to be formed on the surface of the coated layer and corrosion resistance and painting adhesion are excellent.

In addition, another object of the present invention is to provide a surface-treated steel sheet on which a coated layer that includes zinc and oxides of vanadium is formed on the surface of a steel sheet and corrosion resistance and painting adhesion are excellent.

In addition, in the present invention, a surface-treated steel sheet on which one or more layers of films are formed on the surface of a steel sheet (an electro coated steel sheet) having a coated layer that contains zinc and oxides of vanadium is further examined.

Means for Solving the Problems

In order to accomplish the objects, the inventors thoroughly researched the following.

The inventors had focused on the adhesion amount (coating weight) of a coated layer that contained zinc and vanadium and was formed on the surface of a steel sheet by an electro coating method, the content of vanadium, and crystal structures, and had examined the relationship between corrosion resistance and painting adhesion of the coated layer obtained by causing the surface of the steel sheet to come into contact with a coating bath using various methods.

Specifically, as a method of causing the coating bath to come into contact with the surface of the steel sheet as the cathode, a case where the steel sheet was dipped into the coating bath in a stationary state in a coating tank (stationary state), a case where the steel sheet was dipped into the coating bath in a stirred state of being stirred by a stirrer disposed at the bottom portion of the coating tank (stirred state), and a case where the steel sheet was dipped into a circulated coating bath and/or a coating bath obtained by moving the steel sheet in the coating bath to cause the coating bath to be fluidized relative to the steel sheet (fluidized state) were examined. The fluidized state is different from the stirred state and the stationary state in that the coating bath is fluidized at a substantially uniform flow rate with respect to the steel sheet.

As a result of the examination, it was found that in a case where the coating bath in the fluidized state was caused to come into contact with the steel sheet and thus a coated layer which sufficiently contained vanadium was formed, a plurality of dendritic columnar crystals which were grown in the thickness direction of the steel sheet were formed. In addition, in the present invention, the trunk portion of the dendritic columnar crystal is referred to as a primary arm, the branch portion thereof is referred to as a secondary arm, and the primary arms and the secondary arms are collectively referred to as arms.

Moreover, as a result of examining the ratio of a content x of vanadium that was present outside the arm to a content y of vanadium that was present inside the arm in the coated layer, that is, x/y, it was found that the ratio was 1.1 or higher and 3.0 or less in terms of vanadium element. In addition, the obtained coated layer was a coated layer having a surface roughness of 1.0 μm or higher and 4.0 μm or less, which was a high roughness, in terms of center-line average roughness Ra.

Contrary to this, in the case where the surface of the steel sheet comes into contact in the stationary state and the stirred state, a coated layer having dendritic columnar crystals was not formed. Therefore, compared to the case where the coating bath comes into contact with the steel sheet in the fluidized state, cracks were likely to be generated on the surface of the coated layer.

In the fluidized state, the coating bath was fluidized with respect to the steel sheet at a substantially uniform flow rate. Therefore, compared to the stationary state and the stirred state, ions were evenly and continuously supplied to the surface of the steel sheet from the coating bath. As a result, it was presumed that a uniform coated layer was formed on the surface of the steel sheet. Contrary to this, in the stationary state and the stirred state, ions were locally and intensively consumed in the coating bath in the vicinity of the surface of the steel sheet as the cathode, and ions used for deposition of the coated layer in the vicinity of the steel sheet were deficient. Therefore, it was presumed that cracks were likely to occur.

Furthermore, the inventors had examined the relationship between the content of vanadium contained in the coated layer formed through an electro deposition by causing a coating bath to come into contact with the surface of a steel sheet in the fluidized state for a time of 1 second or longer and 30 seconds or less, the coating weight of the coated layer, and the corrosion resistance of the surface-treated steel sheet having the coated layer. As a result, it was found that when the surface-treated steel sheet having the coated layer that contained zinc and vanadium formed by causing the coating bath in the fluidized state to come into contact with the surface of the steel sheet had a vanadium content of 1% or higher and 20% or less and a coating weight of 3 $g/m^2$ or higher and 40 $g/m^2$ or less, sufficient corrosion resistance was obtained.

The inventors had examined adhesion (painting adhesion) between the coated layer and a painted film by respectively applying a plurality of paints on the coated layer which contained zinc and vanadium formed by causing the coating bath in the fluidized state to come into contact with the surface of the steel sheet, and had a vanadium content of 1% or higher and 20% or less and a coating weight of 3 $g/m^2$ or higher and 40 $g/m^2$ or less.

As a result, it was found that the surface-treated steel sheet having the coated layer had excellent painting adhesion compared to the electrogalvanized steel sheet according to the related art.

The inventors had examined painting adhesion and corrosion resistance by forming a coated layer that contained zinc and vanadium in the same manner as the case of the steel sheet using a copper sheet used as the cathode in Non-Patent Documents 1 to 4 instead of a steel sheet. As a result, the coated layer formed on the surface of the copper sheet could not obtain sufficient corrosion resistance in a case where the vanadium content and the coating weight thereof were low. On the other hand, in a case where a coated layer having a vanadium content of 3% or higher and a coating weight of 3 $g/m^2$ or higher was formed on the surface of the copper sheet in order to ensure sufficient painting adhesion, the adhesion between the coated layer and the copper sheet was insufficient. As such, it was difficult to form a coated layer having sufficient corrosion resistance, excellent painting adhesion, and good adhesion between the coated layer and the copper sheet, on the surface of the copper sheet.

As described above, the inventors had formed the coated layer which contained zinc and vanadium and had a vanadium content of 1% or higher and 20% or less and a coating weight of 3 $g/m^2$ or higher and 40 $g/m^2$ or less on the steel sheet by causing the coating bath in the fluidized state to come into contact with the surface of the steel sheet through the electro coating method. The surface-treated steel sheet having the coated layer was less likely to have cracks generated on the surface thereof and had a plurality of dendritic columnar crystals that are grown in the thickness direction of the steel sheet. Moreover, the ratio x/y of the content x of vanadium that was present between the adjacent columnar crystals, that is, outside the arm to the content y of vanadium that was present inside the columnar crystals, that is, inside the arm was 1.1 or higher and 3.0 or less in terms of vanadium element, and corrosion resistance and painting adhesion were excellent.

Next, a resin film was further formed on the surface of the coated layer having excellent corrosion resistance and painting adhesion, and metal oxide particles and a lubricant were added to the resin film as necessary to examine the corrosion resistance of the resin film. As a result, it was found that even when the film was formed on the coated layer having a high roughness, sufficient corrosion resistance was obtained without deterioration of corrosion resistance.

Moreover, conductivity of the surface-treated steel sheet having the resin film on the surface of the surface-treated steel sheet which had a coated layer with a high roughness was examined. It was found that in a range in which the thickness of the film is 0.5 to 5.0 μm, sufficient conductivity was obtained without dependence on the thickness of the film. That is, sufficient conductivity was provided naturally in a case where the film was a thin film and even in a case of a thick film.

That is, it had been considered in the related art that providing a surface-treated steel sheet that satisfied both characteristics of corrosion resistance and conductivity was very difficult. However, it was found that by forming the resin film on the surface-treated steel sheet having the coated layer as described above, both characteristics of corrosion resistance and conductivity could be enhanced.

Furthermore, the inventors had examined, as in the above description, corrosion resistance and conductivity on a surface-treated steel sheet in which a film that contains an inhibitor obtained by applying a water-based metal surface treatment agent which includes a silane coupling agent onto the coated layer of the surface-treated steel sheet having the above-described coated layer and drying the agent was formed to have a total thickness of 0.5 to 4.0 μm. As a result, it was found that sufficient corrosion resistance was provided, and conductivity could be sufficiently ensured even when the thickness of the film was thick.

Moreover, in the related art, it was difficult to obtain good workability (working adhesion) even when a film was formed on the surface of a zinc-coated layer that does not contain vanadium. However, it was found that in a case of a coated layer containing vanadium, deterioration of working adhesion could be suppressed. That is, it was found that characteristics of both corrosion resistance and conductivity were compatible and excellent working adhesion could be ensured.

In addition, the surface-treated steel sheet in which the coated layer that contained zinc and oxides of vanadium was formed on the surface of the steel sheet as described above exhibited a black appearance. However, for use as a design material having the black appearance, there may be cases where fine unevenness of the appearance on the coated surface has to be shielded, or in order to impart scratch resistance needed for press working, a thick black film has to be further formed on the coated layer.

In such cases, in order to obtain a desired appearance, a thick film is further formed on the coated layer. However, there may be cases where painting adhesion is degraded while the working is in process, or a solvent in a paint bumps due to heating in a process of drying the film and painting defects called popping occur.

Therefore, a steel sheet which has sufficiently suppressed glossiness, shields the fine unevenness of the appearance of the coated surface, has a sufficiently low L* value (brightness), has excellent scratch resistance and adhesion while the working is in process, and has a more aesthetically pleasant appearance without forming a thick black film on the upper surface of the coated layer that includes zinc and vanadium is more valuable.

For this, the inventors formed, on the coated layer of the surface-treated steel sheet having the above-described coated layer, an organic resin film made of an organic resin that includes a polyester resin (A1) containing a sulfonic acid group, a curing agent (B1), and a colorant (C1), and examined painting adhesion while the working is in process, corrosion resistance, scratch resistance, glossiness, and L* value.

As a result, since the coated layer contained zinc and vanadium in the coated layer and had a plurality of dendritic columnar crystals that are grown in the thickness direction of the sheet, the coated layer had an appearance with suppressed glossiness and a low L* value. Moreover, excellent adhesion was obtained at the interface between the coated layer and the organic resin film. Furthermore, regarding the organic resin film, since the colorant (C1) that included a coloring pigment containing carbon black was uniformly distributed in the organic resin film, an appearance having sufficiently suppressed glossiness and a sufficiently low L* value was obtained even when a thick film that degraded painting adhesion was not formed, and excellent scratch resistance was obtained.

The organic resin film is a dense film obtained by curing the polyester resin (A1) containing the sulfonic acid group with the curing agent (B1). Therefore, by forming the organic resin film on the coated layer, a synergistic effect of excellent corrosion resistance and painting adhesion caused by the coated layer and the effect of enhancing corrosion resistance by the dense and thin organic resin film were obtained, and thus the surface-treated steel sheet having very excellent corrosion resistance was obtained.

Moreover, the inventors formed, on one surface or both surfaces of the surface-treated steel sheet having the coated layer, the coated layer that includes zinc and vanadium and a colored painted film layer that includes a coloring pigment layer in this order. As a result, the surface-treated steel sheet having excellent corrosion resistance and workability was obtained.

The present invention was completed on the basis of the above-described knowledge.

In order to accomplish the objects by solving the problems, the present invention employed the following measures.

(1) That is, a surface-treated steel sheet according to an aspect of the present invention includes: a steel sheet; and a coated layer which is formed on one surface or both surfaces of the steel sheet and includes zinc and vanadium, in which the coated layer has a vanadium content of 1% or higher and 20% or less and a coating weight of 3 g/m² or higher and 40 g/m² or less, and has a plurality of dendritic arms that are grown in a thickness direction of the steel sheet, and a ratio x/y of a content x of the vanadium that is present outside the arms to a content y of the vanadium that is present inside the arms is 1.1 or higher and 3.0 or less in terms of vanadium element.

(2) In the surface-treated steel sheet described in (1), the coated layer may have an emissivity of 0.30 or higher and 0.95 or less in a region where a wave number measured under a condition of a surface temperature of 100° C. is 600 to 3000 cm$^{-1}$.

(3) In the surface-treated steel sheet described in (1) or (2), a surface roughness of the coated layer may be 1.0 μm or higher and 4.0 μm or less in terms of center-line average roughness Ra specified in JIS B 0601:2001.

(4) In the surface-treated steel sheet described in any of (1) to (3), one or more layers of films may further be formed on the coated layer.

(5) In the surface-treated steel sheet described in (4), the film may contain an organic resin.

(6) In the surface-treated steel sheet described in (5), the film may be a resin film, and may contain: 5 to 50 parts by mass of metal oxide particles with respect to 100 parts by mass of a solid content of the resin film; and 0.1 to 30 mass % of a lubricant with respect to 100 mass % of the solid content of the resin film.

(7) In the surface-treated steel sheet described in (5), the organic resin may have at least one type of a carboxyl group, a hydroxyl group, a sulfonic acid group, and a silanol group in its structure, and include: a polyester resin containing a sulfonic acid group; a curing agent; and a coloring pigment containing carbon black.

(8) In the surface-treated steel sheet described in (4), the film may be obtained by applying and drying a water-based metal surface treatment agent containing a silane coupling agent onto the steel sheet.

(9) In the surface-treated steel sheet described in (8), the film may further contain an inhibitor component which essentially includes a fluorometal complex compound having at least one type selected from titanium and zirconium.

(10) In the surface-treated steel sheet described in (8) or (9), the film may be a composite film including: a polyether polyurethane resin; and a coloring pigment containing carbon black.

(11) In the surface-treated steel sheet described in (5), the film may be a coloring painted film layer including a coloring pigment layer.

(12) In the surface-treated steel sheet described in (11), the coloring painted film layer may include a primer-painted film layer, and the primer-painted film layer may be formed between the coated layer and the coloring pigment layer and includes a rust-preventive agent.

(13) In the surface-treated steel sheet described in (11) or (12), the coloring painted film layer may be formed on the coated layer to be in contact therewith.

(14) In the surface-treated steel sheet described in (11) or (12), a chemical conversion treatment layer may further be included between the coloring painted film layer and the coated layer.

(15) A method of manufacturing a surface-treated steel sheet according to another aspect of the present invention includes: a coating process of forming a coated layer that includes zinc and vanadium on a surface of a steel sheet by an electro coating method, in which, in the coating process, the coated layer is formed by dipping the steel sheet in a coating bath, and performing an electro deposition at a current density in the coating bath of 20 to 150 A/dm$^2$ for a time of 1 second or longer and 30 seconds or less, the coating bath contains a zinc compound and a vanadium compound, contains at least one type of vanadium ions and vanadyl ions at a total content of 0.01 mol/l or higher and less than 1.0 mol/l, and has a content of nitric acid ions limited to be less than 0.0005 mol/l, and the coating bath is at least one of a circulated coating bath or a coating bath obtained by moving the steel sheet in the coating bath to cause the coating bath to be fluidized relative to the steel sheet, and the coated layer has a vanadium content of 1% or higher and 20% or less and a coating weight of 3 g/m$^2$ or higher and 40 g/m$^2$ or less.

(16) In the method of manufacturing a surface-treated steel sheet described in (15), an average flow rate of the coating bath in a coating tank may be in a range of 20 to 300 m/min.

(17) In the method of manufacturing a surface-treated steel sheet described in (15) or (16), the coating bath may include sodium ions at a content of 0.1 mol/l or higher and 4.0 mol/l or less.

(18) In the method of manufacturing a surface-treated steel sheet described in any of (15) to (17), the coating bath may include nickel ions at a content of 0.01 mol/l or higher and 1.0 mol/l or less.

Advantage of the Invention

In the surface-treated steel sheet according to the aspects, the coated layer which has a vanadium content of 1% or higher and 20% or less and a coating weight of 3 g/m$^2$ or higher and 40 g/m$^2$ or less, has a plurality of dendritic arms that are grown in the thickness direction of the steel sheet, and has a ratio x/y of a content x of vanadium that is present outside the arms to a content y of vanadium that is present inside the arms of 1.1 or higher and 3.0 or less in terms of vanadium element. Therefore, corrosion resistance and painting adhesion are excellent.

In the method of manufacturing the surface-treated steel sheet according to the aspects, in the coating process, the coated layer having a vanadium content of 1% or higher and 20% or less and a coating weight of 3 g/m$^2$ or higher and 40 g/m$^2$ or less is formed by dipping the steel sheet in the coating bath in the fluidized state and performing electro deposition for a time of 1 second or longer and 30 seconds or less. Accordingly, cracks are less likely to be generated on the surface of the coated layer, and the coated layer having dendritic columnar crystals is obtained, thereby, the surface-treated steel sheet with excellent corrosion resistance and painting adhesion are obtained.

Moreover, in the surface-treated steel sheet in which films such as the resin film, the composite film, and the coloring painted film layer are further formed on the coated layer, characteristics such as corrosion resistance, conductivity, and appearances are more excellent.

EMBODIMENTS OF THE INVENTION

Hereinafter, an embodiment to which the present invention is applied will be described in detail with reference to the drawings.

First Embodiment

Figure 1:
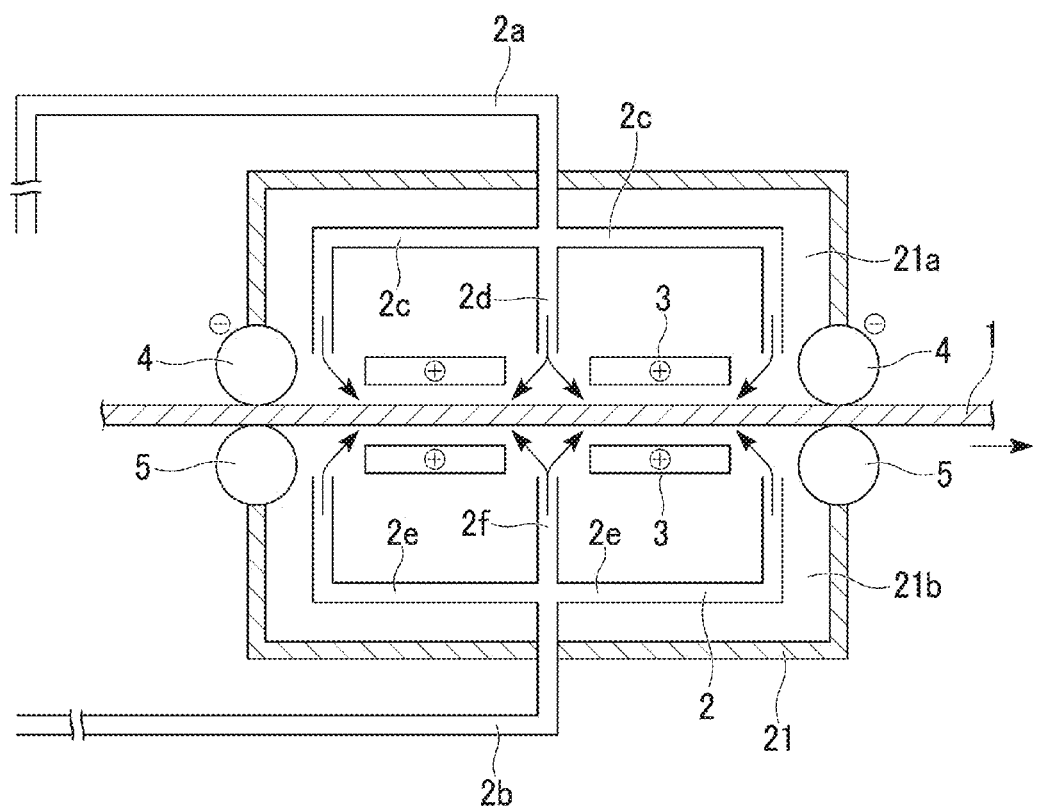
FIG. 1 is a schematic diagram illustrating an example of a coating apparatus used in a method of manufacturing a surface-treated steel sheet according to this embodiment.

A case where a surface-treated steel sheet according to this embodiment is manufactured by a method of manufacturing a surface-treated steel sheet according to this embodiment by using a coating apparatus illustrated in FIG. 1 is exemplified.

FIG. 1 is a schematic diagram illustrating an example of the coating apparatus used in the method of manufacturing a surface-treated steel sheet according to this embodiment. In FIG. 1, reference numeral 1 denotes a steel sheet, reference numeral 2 denotes a coating bath, reference numeral 21 denotes a coating tank, and reference numeral 3 denotes an anode.

The method of manufacturing the surface-treated steel sheet according to this embodiment includes a coating process of forming a coated layer that includes zinc and vanadium on the surface of the steel sheet 1 using an electro coating method.

In this embodiment, the steel sheet 1 having the coated layer formed on the surface is not particularly limited. For example, the steel sheet 1 may be a steel sheet of any type including a ultra low carbon type (a structure mainly containing ferrite), a low carbon type (a structure including pearlite in ferrite), a dual phase structure type (for example, a structure including martensite in ferrite and a structure including bainite in ferrite), a strain induced transformation type (a structure including retained austenite in ferrite), a microcrystal type (a structure mainly containing ferrite), and the like.

In FIG. 1, reference numerals 4 and 5 denote rolls which move the steel sheet 1 in a direction of the arrow in FIG. 1 to cause the steel sheet 1 to pass through the coating bath 2. In this embodiment, among the rolls 4 and 5, the roll 4 disposed on the upper portion of the steel sheet 1 functions as a connection member (conductor) that electrically connects the steel sheet 1 to a power supply (not shown). The steel sheet 1 is electrically connected to the roll 4 and acts as a cathode.

In this embodiment, in the coating process, a coating tank 21 illustrated in FIG. 1 is used. The coating tank 21 has an upper tank 21a disposed on the upper portion of the steel sheet 1 and a lower tank 21b disposed under the lower portion of the steel sheet 1.

As illustrated in FIG. 1, at positions adjacent to the steel sheet 1 in the upper tank 21a and the lower tank 21b, a plurality of anodes 3 made of platinum and the like are arranged at predetermined intervals with the steel sheet 1 interposed therebetween. The surface of each of the anodes 3 which opposes the steel sheet 1 is disposed to be substantially parallel to the surface of the steel sheet 1. Each of the anodes 3 is electrically connected to the power supply (not shown) by a connection member (not shown).

The upper tank 21a and the lower tank 21b are filled with the coating bath 2. As illustrated in FIG. 1, between the upper tank 21a and the lower tank 21b of the coating tank 21, the steel sheet 1 that is moved in a substantially horizontal surface direction is disposed. The steel sheet 1 that is caused to pass through the coating tank 21 in the arrow direction (in the rightward direction in the figure) by the rolls 4 and 5 is in a state of being dipped into the coating bath 2 in the upper tank 21a and the lower tank 21b. Therefore, in this embodiment, since the steel sheet 1 is moved in the coating bath 2 by moving the steel sheet 1 by the rolls 4 and 5, a fluidized state in which the coating bath 2 is fluidized relative to the steel sheet 1 is achieved.

As illustrated in FIG. 1, the upper tank 21a is provided with an upper supply pipe 2a for supplying the coating bath 2 to the upper tank 21a so as to penetrate through the upper surface of the upper tank 21a. The upper supply pipe 2a branches off to a plurality of outer peripheral branch paths 2c and a plurality of intermediate branch paths 2d (only one path is shown in FIG. 1) in the upper tank 21a. The plurality of intermediate branch paths 2d are arranged along the width direction of the steel sheet 1 between the adjacent anodes 3 in a plan view, and have opening portions for supplying the coating bath 2 toward spaces between the both electrodes 3 (the anodes) and the steel sheet 1. The plurality of outer peripheral branch paths 2c are arranged along the width direction of the steel sheet 1 between the anodes 3 and the rolls 4 in the plan view and have opening portions for supplying the coating bath 2 toward spaces between the electrodes 3 and the steel sheet 1.

The upper tank 21a is provided with a discharge port (not shown) for discharging the coating bath 2 and is connected to the upper supply pipe 2a via a pipe (not shown) including a pump. Therefore, the coating bath 2 is supplied from the upper supply pipe 2a to the upper tank 21a. Thereafter, the coating bath 2 is discharged from the discharge port and is supplied from the upper supply pipe 2a again by the pump via the pipe so as to be circulated.

The lower tank 21b is provided with a lower supply pipe 2b for supplying the coating bath 2 to the lower tank 21b to penetrate through the lower surface of the lower tank 21b. The lower supply pipe 2b branches off to a plurality of outer peripheral branch paths 2e and a plurality of intermediate branch paths 2f (only one path is shown in FIG. 1) in the lower tank 21b. The plurality of intermediate branch paths 2f are arranged along the width direction of the steel sheet 1 between the adjacent anodes 3 in the plan view, and have opening portions for supplying the coating bath 2 toward spaces between the electrodes 3 (the anodes) on both sides and the steel sheet 1. The plurality of outer peripheral branch paths 2e are arranged along the width direction of the steel sheet 1 between the anodes 3 and the rolls 5 in the plan view and have opening portions for supplying the coating bath 2 toward spaces between the electrodes 3 and the steel sheet 1.

The lower tank 21b is provided with a discharge port (not shown) for discharging the coating bath 2 and is connected to the lower supply pipe 2a via a pipe (not shown) including a pump. Therefore, the coating bath 2 is supplied from the lower supply pipe 2b to the lower tank 21b. Thereafter, the coating bath 2 is discharged from the discharge port and is supplied from the lower supply pipe 2b again by the pump via the pipe so as to be circulated.

In the coating apparatus illustrated in FIG. 1, four electrodes 3 are arranged, but the number of electrodes 3 may be any number. The number of electrodes 3 may be appropriately determined depending on the sizes of the coating tank 21, the steel sheet 1, and the electrodes 3, the arrangement of the upper supply pipe 2a and the lower supply pipe 2b, the average flow rate of the coating bath 2 in the coating tank 21, and the like. The arrangement and shapes of the upper supply pipe 2a and the lower supply pipe 2b may be appropriately changed depending on the shape of the electrode 3, the average flow rate of the coating bath 2 in the coating tank 21, and the like.

The coating process of this embodiment is a process of forming a coated layer that includes zinc and vanadium by dipping the steel sheet 1 into the coating bath 2 in the fluidized state in which the coating bath 2 is fluidized relative to the steel sheet 1 by setting the coating bath in the circulated and fluidized state and moving the steel sheet 1 in the coating bath 2, and performing electro deposition thereon at a current density in the coating bath of 20 to 150 A/dm$^2$ for a time of 1 second or longer and 30 seconds or less.

In this embodiment, by performing the coating process, the coated layer having dendritic columnar crystals (a primary arm and a secondary arm) with a vanadium content of 1% or higher and 20% or less and a coating weight of 3 g/m$^2$ or higher and 40 g/m$^2$ or less is formed on the surface of the steel sheet 1.

In the coating process of this embodiment, the steel sheet 1 is dipped into the coating bath 2 in the fluidized state in which the coating bath 2 is fluidized relative to the steel sheet 1 by setting the coating bath 2 in the circulated and fluidized state and causing the steel sheet 1 to pass through the coating bath 2. Therefore, ions are sufficiently supplied between the steel sheet 1 and the electrodes 3. As a result, by performing the coating process, a surface-treated steel sheet having the coated layer which has a plurality of dendritic arms that are grown in the thickness direction of the steel sheet and in which the ratio x/y of the content x of vanadium that is present outside the arms to the content y of vanadium that is present inside the arms is 1.1 or higher and 3.0 or less in terms of vanadium element is obtained.

In this embodiment, in order to sufficiently and uniformly supply ions between the steel sheet 1 and the electrodes 3, it is preferable that the steel sheet 1 is dipped into the coating bath 2 in the fluidized state in which the coating bath 2 is fluidized relative to the steel sheet 1 by setting the coating bath 2 in the circulated and fluidized state as in the coating bath 2 of the coating tank 21 illustrated in FIG. 1 and moving the steel sheet 1 in the coating bath 2. However, since the coating bath 2 of the coating tank 21 illustrated in FIG. 1 is in the fluidized state in which the coating bath 2 is fluidized relative to the steel sheet 1 by moving the steel sheet 1 in the coating bath 2, ions can be sufficiently supplied between the steel sheet 1 and the electrodes 3 even though the coating bath 2 is not circulated therein.

In this embodiment, the surface-treated steel sheet in which the coated layer formed by the coating process has a vanadium content of 1% or higher and 20% or less and a coating weight of 3 g/m$^2$ or higher and 40 g/m$^2$ or less and has sufficient corrosion resistance is obtained.

It is preferable that the vanadium content of the coated layer be 2% or higher in order to further enhance corrosion resistance and painting adhesion. The vanadium content of the coated layer is set to be 20% or less in order to obtain good adhesion between the coated layer and the steel sheet 1, and is more preferably, 15% or less.

Although the coating weight of the coated layer is 3 g/m$^2$ or higher, in a case of further enhancing corrosion resistance and painting adhesion, a coating weight of 5 g/m$^2$ or higher is preferable. The coating weight of the coated layer is preferably 40 g/m$^2$ or less and more preferably 15 g/m$^2$ or less. In a case where the coating weight of the coated layer is 40 g/m$^2$ or less, the manufacturing cost is increased, and the coating adhesion (powdering properties) is deteriorated. Moreover, in a case of 15 g/m$^2$ or less, compared to electrogalvanizing (typically, about 20 g/m$^2$) and the like performed according to the related art, the amount of metal deposited is low, and is thus economically superior in terms of metal costs and power costs for forming coated layers.

The coated layer obtained in this embodiment exhibits a black appearance since vanadium elements are dendritically present as oxides in zinc. Therefore, in a case where the surface-treated steel sheet of this embodiment is used as a material of, for example, a product having a black appearance, a desirable appearance is provided. In addition, in a case where a painted film is applied to obtain the black appearance, the thickness of the painted film can be reduced. In addition, the color of the coated layer is darkened as the vanadium content is increased, and the L* value is reduced.

In the coating process, the electro deposition time is set to 1 second or longer in order to obtain a sufficient coating weight. On the other hand, from a viewpoint of not harming productivity, the electro deposition time is set to 30 seconds or less, and preferably, set to 1 second or longer and 15 seconds or less.

In addition, in the coating process, the current density is set to 20 to 150 A/dm$^2$. When the current density is in the above range, the coated layer of this embodiment, which has a vanadium content of 1% or higher and 20% or less and a coating weight of 3 g/m$^2$ or higher and 40 g/m$^2$ or less can be easily formed. When the current density is less than 20 A/dm$^2$, a predetermined vanadium content and/or coating weight are difficult to be ensured. When the current density exceeds 150 A/dm$^2$, there is a concern that adhesion between the coated layer and the steel sheet 1 may be degraded.

In this embodiment, since the coated layer is formed by dipping the steel sheet 1 into the coating bath 2 in the fluidized state, in order to ensure a sufficiently high vanadium content, the current density needs to be high compared to a case where the coating bath is caused to come into contact with the surface of the steel sheet in the stationary state and the stirred state. This is because, in the case where the steel sheet 1 is dipped into the coating bath 2 in the fluidized state, ions are uniformly and continuously supplied to the surface of the steel sheet 1 from the coating bath 2, and thus the coated layer is difficult to incorporate vanadium compared to the case in the stationary state and in the stirred state.

In the coating process, the average flow rate of the coating bath 2 in the coating tank 21 is preferably in a range of 20 to 300 m/min, and more preferably, in a range of 40 to 200 m/min. In a case where the average flow rate of the coating bath 2 is in a range of 20 to 300 m/min, generation of cracks on the coated layer can be more effectively prevented. When the average flow rate of the coating bath 2 is below the above range, there is a concern that the effect caused by circulating the coating bath 2 to be in the fluidized state may become insufficient. In addition, when the average flow rate of the coating bath 2 exceeds the above range, there is a concern that the supply of ions to the surface of the steel sheet 1 from the coating bath 2 may be disrupted.

In the coating process, the coating bath 2 includes a V compound and a Zn compound. To the coating bath 2, in addition to the V compound and the Zn compound, as necessary, a pH adjusting agent such as $H_2SO_4$ or NaOH, metal compounds other than the V compound and the Zn compound such as a Ni compound including $NiSO_4 \cdot 6H_2O$, and additives such as $Na_2SO_4$ which stabilize the conductivity of the coating bath 2 may be added. However, the content of nitric acid ions in the coating bath 2 is limited to be less than 0.0005 mol/l in order to reliably generate dendritic columnar crystals.

Examples of the Zn compound used in the coating bath 2 include metal Zn, $ZnSO_4 \cdot 7H_2O$, and $ZnCO_3$. These may be used singly or in a combination of two or more types thereof.

Examples of the V compound used in the coating bath 2 include ammonium metavanadate (V), potassium metavanadate (V), sodium metavanadate (V), $VO(C_5H_7O_2)_2$ (vanadyl acetylacetonate (IV)), and $VOSO_4 \cdot 5H_2O$ (vanadyl sulfate (IV)). These may be used singly or in a combination of two or more types thereof.

It is preferable that the coating bath 2 include $Zn^{2+}$ and $VO^{2+}$, or $V^{4+}$ as the V compound and the Zn compound.

In a case where the coating bath 2 includes any of or both $VO^{2+}$ and $V^{4+}$, the total content thereof in the coating bath 2 is 0.01 mol/l or higher and 1.0 mol/l or less. By using the coating bath 2 that includes $VO^{2+}$ or $V^{4+}$ in the above range, the coated layer having a vanadium content of 1% or higher and 20% or less and a coating weight of 3 g/m² or higher and 40 g/m² or less can be easily formed. In the case where the content of $VO^{2+}$ or $V^{4+}$ included in the coating bath 2 is below the above range, the plurality of dendritic columnar crystals 12 are less likely to be grown in the thickness direction of the steel sheet 1, and thus the vanadium content is reduced. In addition, when the content of $VO^{2+}$ or $V^{4+}$ included in the coating bath 2 exceeds the above range, a large amount of vanadium which is expensive is used in the coating bath 2, which is economically disadvantageous.

In a case where the coating bath 2 includes $Zn^{2+}$, the content of $Zn^{2+}$ is preferably 0.1 to 1.5 mol/l and more preferably 0.35 to 1.2 mol/l.

In addition, it is preferable that 0.1 mol/l or higher of sodium ions are included in the coating bath 2. In this case, the conductivity of the coating bath 2 can be increased, and thus the coated layer of this embodiment can be easily formed. However, when the content thereof is 4.0 mol/l or higher, sodium ions are excessively included. In this case, sodium ions are not present while being dissolved in the coating bath but are precipitated, that is not preferable.

In a case where the coating bath 2 includes the Ni compound, it is preferable that 0.01 mol/l or higher of nickel ions be included in the coating bath 2. In this case, vanadium is likely to be deposited, and thus a coated layer of this embodiment can be easily formed. However, it is not preferable that the content thereof is 1.0 mol/l or higher because there is a concern about deterioration of corrosion resistance or coating adhesion of the surface-treated steel sheet.

The temperature of the coating bath 2 is not particularly limited, and is preferably in a range of 40 to 60° C. in order to easily and efficiently form the coated layer of this embodiment. In addition, the pH of the coating bath 2 is preferably in a range of 1 to 5, and more preferably in a range of 1.5 to 4 in order to easily form the coated layer of this embodiment having the dendritic columnar crystals, the above vanadium content, and the coating weight.

It is preferable that the surface roughness of the coated layer is preferably 1.0 μm or higher and 4.0 μm or less in terms of center-line average roughness Ra defined in JIS B 0601:2001. According to the related art, it has been considered that corrosion resistance is ensured by reducing the surface roughness of the coated layer. However, in the present invention, since the coated layer has sufficient corrosion resistance, even in a coated layer having a roughness Ra of 1.0 μm or higher, which is a high roughness, corrosion resistance is not deteriorated. Moreover, since the surface roughness of the coated layer is a high roughness, conductivity in a case where a film is formed later can be ensured, and working adhesion can be enhanced. On the other hand, the roughness Ra exceeds 4.0 μm, rubber of a roll coater or a pass roll is scraped off, and there is a concern that the scraped parts may stick to a product as waste. Therefore, the upper limit is set to 4.0 μm. In addition, more preferably, the roughness is 1.1 μm or higher and 3.0 μm or less.

Figure 3A:
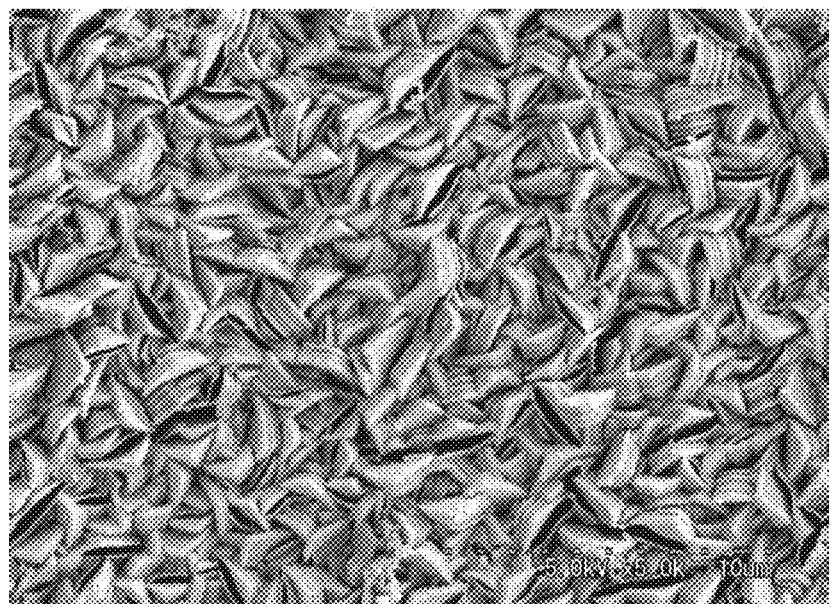
FIG. 3A is a scanning electron micrograph of a coated layer of a surface-treated steel sheet of Example m23, and is a photograph in a view from the upper surface side.
Figure 3B:
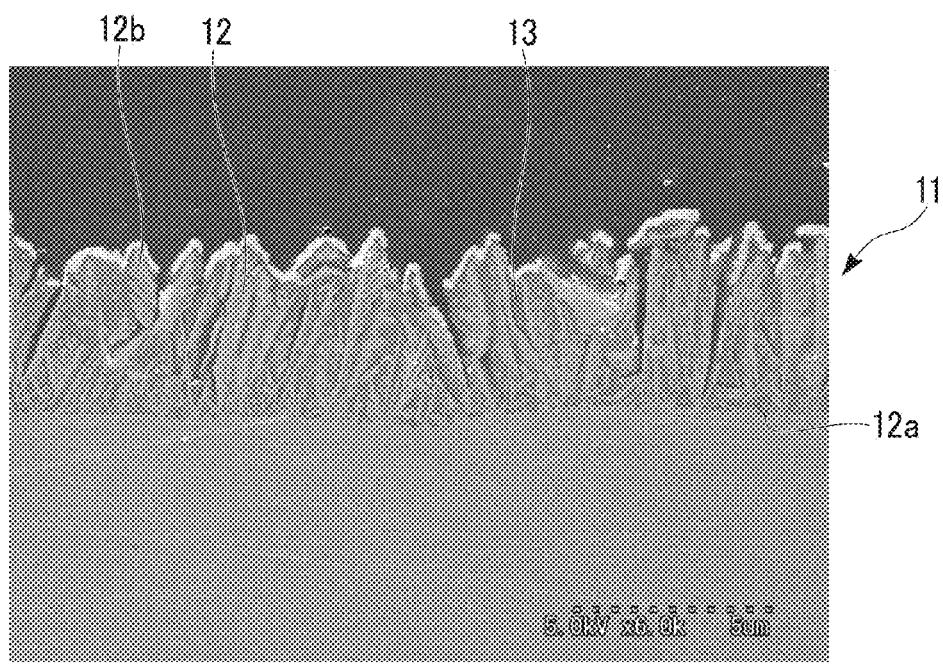
FIG. 3B is a scanning electron micrograph of the coated layer of the surface-treated steel sheet of Example m23, and is a photograph of the cross-section.

The crystal structure of the coated layer of the surface-treated steel sheet formed in this embodiment will be described using the drawings. FIGS. 3A and 3B are scanning electron micrographs of the coated layer of an example of the surface-treated steel sheet according to this embodiment. FIG. 3A is a photograph viewed from the upper surface side, and FIG. 3B is a photograph of the cross-section.

As shown in FIGS. 3A and 3B, the coated layer 11 does not have cracks (gaps) that reach the steel sheet 1 and has a plurality of fine and dense dendritic columnar crystals 12 (arms) that are grown in the thickness direction of the steel sheet 1. Each of the columnar crystals 12 are grown in the surface direction of the steel sheet 1 as well as in the thickness direction from the surface of the steel sheet 1. Therefore, at least a part of the columnar crystals 12 has a shape that is separated from a base portion 12a that comes into contact with the steel sheet 1 and is integrated with the adjacent columnar crystal 12 at a part 12b distant from the steel sheet 1 as shown in FIG. 3B.

Between the adjacent columnar crystals 12, that is, inside the coated layer and outside the arms, an area 13 having a larger content of vanadium (a dark gray part in FIG. 3B) than the content of vanadium inside the columnar crystals 12, that is, inside the arms (a light gray part in FIG. 3B) is formed so as to be fringed with the columnar crystals 12. The ratio x/y of the content x of vanadium that is present outside the arms to the content y of vanadium that is present inside the arms is 1.1 or higher in terms of vanadium element. From a viewpoint of corrosion resistance, the ratio x/y is more preferably 1.2 or higher. In a case where the x/y exceeds 3.0, V needs to be excessively added, and thus high cost is needed, that is not preferable. In a case where the ratio x/y is in a range of 1.2 to 2.0, better corrosion resistance is obtained at low cost.

The surface-treated steel sheet according to this embodiment has a plurality of fine and dense dendritic columnar crystals 12 that are grown in the thickness direction of the steel sheet 1 as shown in FIGS. 3A and 3B. In addition, the coated layer 11 in which at least a part of the columnar crystals 12 has a shape that is separated from the base portion 12a and is integrated with the adjacent columnar crystal 12 at the part 12b distant from the steel sheet 1 is formed, and thus excellent painting adhesion is provided. It is presumed that this is because the columnar crystals 12 function as the anchor effect.

In this embodiment, as shown in FIGS. 3A and 3B, the area 13 which does not have cracks (gaps) that reach the steel sheet 1 and has a larger content of vanadium between the adjacent columnar crystals 12 (outside the arms) than the content of vanadium inside the columnar crystals 12 (inside the arms) is formed. Therefore, it is presumed that the effect of enhancing corrosion resistance by containing vanadium is more effectively exhibited.

In addition, in this embodiment, the coated layer 11 has a vanadium content of 1% or higher and 20% or less and a coating weight of 3 $g/m^2$ or higher and 40 $g/m^2$ or less, and has a plurality of dendritic columnar crystals 12 that are grown in the thickness direction of the steel sheet 1. The coated layer formed in this embodiment has an emissivity of 0.30 or higher in a region in which the wave number measured at 100° C. is 600 to 3000 $cm^{-1}$.

The emissivity becomes the same as the absorptance of an object at a predetermined temperature, and increase in emissivity results in increase in thermal absorptivity. The emissivity of the coated layer 11 is preferably 0.30 or higher, and more preferably 0.60 or higher in order to sufficiently obtain the thermal absorptivity effect and a heat dissipation effect.

In a case where the vanadium content of the coated layer 11 is less than 1% or in a case where the coating weight thereof is less than 3 $g/m^2$, the emissivity is more likely to be less than 0.30. When the emissivity of the coated layer 11 is less than 0.30, there may be cases where the thermal absorptivity effect and the heat dissipation effect are not sufficiently obtained.

In addition, absorption of radiations in a range in which the wave number is less than 600 $cm^{-1}$ or higher than 3000 $cm^{-1}$ has a very small influence on the thermal absorptivity of the surface-treated steel sheet and a very small effect in a temperature reduction, and thus the emissivity including radiations in such a wave number range is inappropriate. In addition, the temperature at which the emissivity is measured was set to 100° C. in consideration of operation temperatures of electronic circuits such as IC chips used in electronic components.

In the surface-treated steel sheet of this embodiment, the coated layer 11 having an emissivity of 0.30 or higher in a region in which the wave number measured at 100° C. is 600 to 3000 $cm^{-1}$ is formed on the surface of the steel sheet 1. Therefore, the surface-treated steel sheet can absorb more heat from the outside and efficiently dissipate heat and thus can be appropriately used as, for example, a heat sink of an electronic component.

Second Embodiment

A surface-treated steel sheet and a method of manufacturing the same according to a second embodiment will be described using a coating apparatus illustrated in FIG. 2.

Figure 2:
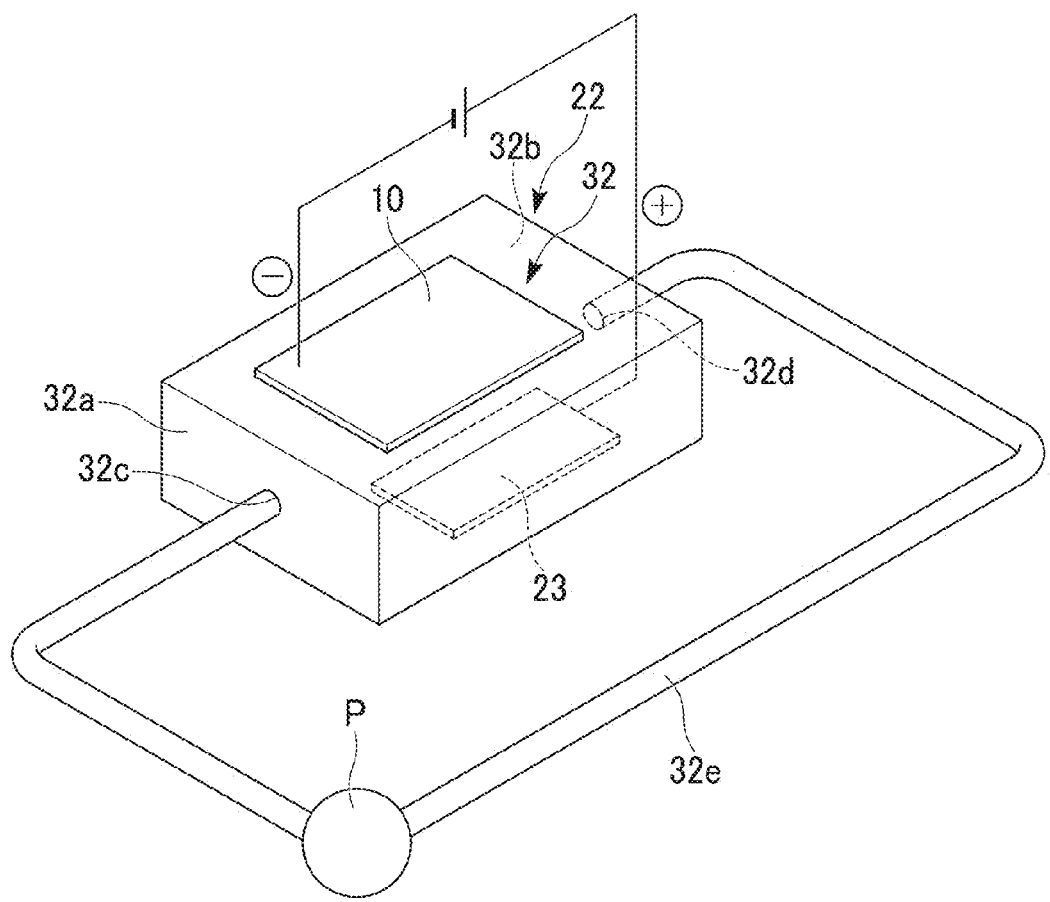
FIG. 2 is a schematic diagram illustrating another example of the coating apparatus used in the method of manufacturing a surface-treated steel sheet according to this embodiment.

FIG. 2 is a schematic diagram illustrating another example of the coating apparatus used in the method of manufacturing the surface-treated steel sheet according to this embodiment. In FIG. 2, reference numeral 10 denotes a steel sheet, reference numeral 32 denotes a coating bath, reference numeral 22 denotes a coating tank, and reference numeral 23 denotes an anode.

The steel sheet 10 illustrated in FIG. 2 has a plane shape smaller than the plane shape of the coating tank 22. The steel sheet 10 is not particularly limited, and may use those made of the same material as the steel sheet 1 used in the first embodiment.

The coating bath 32 may use the same coating bath 2 used in the first embodiment.

In this embodiment, a coating process of forming a coated layer that includes zinc and vanadium on the surface of the steel sheet 10 by an electro coating method using the coating tank 22 illustrated in FIG. 2 is performed. A discharge port 32c is provided in one side surface 32a of opposing side surfaces of the coating tank 22. A supply port 32d is provided in the other side surface 32b. As illustrated in FIG. 2, the discharge port 32c and the supply port 32d are connected by a pipe 32e, and a pump P is connected to the pipe 32e.

As illustrated in FIG. 2, the anode 23 made of platinum and the like is disposed at the bottom portion of the coating tank 22. The coating tank 22 is filled with the coating bath 32, and the steel sheet 10 as the cathode is dipped into the coating bath 32 substantially horizontally in the surface direction.

The coating process of this embodiment, as illustrated in FIG. 2, is a process of forming a coated layer that includes zinc and vanadium by dipping the steel sheet 10 into the coating bath 32 in a fluidized state in which the coating bath 32 is discharged from the discharge port 32c of the coating tank 22 and the coating bath 32 is supplied from the supply port 32d by the pump P via the pipe 32e so as to be circulated.

Even in this embodiment, by performing the coating process, the coated layer having dendritic columnar crystals with a vanadium content of 1% or higher and 20% or less and a coating weight of 3 $g/m^2$ or higher and 40 $g/m^2$ or less is formed on the surface of the steel sheet 10.

In the coating process of this embodiment, since the steel sheet 10 is dipped into the coating bath 32 in the circulated and fluidized state, ions are sufficiently supplied between the steel sheet 10 and the electrode (anode) 23. As a result, by performing the coating process, a surface-treated steel sheet having the coated layer which has a plurality of dendritic arms (columnar crystals) that are grown in the thickness direction of the steel sheet 10 and in which the ratio x/y of the content x of vanadium that is present outside the arms (between the adjacent columnar crystals) to the content y of vanadium that is present inside the arms (inside the columnar crystals) is 1.1 or higher and 3.0 or less in terms of vanadium element is obtained.

As in the first and second embodiment, in the case where the steel sheet is dipped into the coating bath in the circulated and fluidized state, as in the coating bath 2 of the coating tank 21 of the first embodiment, the coating bath 2 may be in the fluidized state of being fluidized relative to the steel sheet 1, or the steel sheet may not be moved in the coating bath as in the second embodiment. In the second embodiment, since the coating bath 32 is in the circulated and fluidized state, the coating bath is fluidized relative to the steel sheet, and thus ions can be sufficiently supplied between the steel sheet 10 and the electrode 23.

Hereinafter, an example in which one or more layers of films are further formed on the upper surface of the coated layer of the surface-treated steel sheet obtained in the first or second embodiment will be described in [Third Embodiment] to [Sixth Embodiment].

Third Embodiment

A surface-treated steel sheet obtained by forming a resin film on the surface-treated steel sheet having the coated layer that includes zinc and vanadium according to the first or second embodiment will be described. In addition, there may be cases where the resin film is referred to as a resin film according to this embodiment. In addition, there may be cases where the coated layer included in the surface-treated steel sheet used in this embodiment is referred to as a coated layer according to this embodiment.

As the resin film (A) according to this embodiment, one or more layers of the resin films (A) are formed on the upper surface of the coated layer according to this embodiment. The thickness of at least one layer of the plurality of resin films (A) is preferably 0.5 to 5.0 µm. According to the related art, it has been considered that a reduction in the thickness of the film and an increase in the roughness of the coated layer cause deterioration of corrosion resistance. However, as described above, since the coated layer according to this embodiment has very high corrosion resistance, even when the coated layer has a high roughness, sufficient corrosion resistance can be ensured with the thickness of the films described above. Moreover, since the coated layer according to this embodiment has a high roughness, sufficient conductivity can be ensured with the thickness of the films described above. In terms of corrosion resistance, the thickness of the resin films (A) is more preferably 0.5 µm or higher, and even more preferably 1.0 µm or higher. In addition, in terms of conductivity, the thickness of the resin films (A) is more preferably 5.0 µm or less, and even more preferably 4.0 µm or less.

The resin film (A) is collectively referred to as, other than a water-soluble resin, a resin (water-dispersible resin) which is not soluble in water and can be in a state of being finely dispersed in water like an emulsion or a suspension.

The type of the resin film (A) is not particularly limited. For example, at least one or more types selected from the group consisting of a polyester-based resin, a polyurethane resin, an acrylic resin, an epoxy-based resin, polyolefin, and modified resins thereof.

The polyester-based resin is not particularly limited. For example, those obtained by carrying out dehydration-condensation of polyols such as ethylene glycol, propylene glycol, diethylene glycol, 1,6-hexanediol, neopentyl glycol, triethylene glycol, bisphenol hydroxypropyl ether, glycerin, trimethylol ethane, and trimethylol propane and polybasic acid such as phthalic anhydride, isophthalic acid, terephthalic acid, succinic anhydride, adipic acid, sebacic acid, maleic anhydride, itaconic acid, fumaric acid, and himic anhydride, and neutralizing the resultant with ammonia, an amine compound, or the like, followed by dispersion in water can be used.

The polyurethane resin is not particularly limited. For example, those obtained by causing polyols such as ethylene glycol, propylene glycol, diethylene glycol, 1,6-hexanediol, neopentyl glycol, triethylene glycol, bisphenol hydroxypropyl ether, glycerin, trimethylol ethane, and trimethylol propane to react with a diisocyanate compound such as hexamethylene diisocyanate, isophorone diisocyanate, and tolylene diisocyanate, and further chain-extending the resultant with diamine or the like, followed by dispersion in water can be used.

The acrylic resin is not particularly limited. For example, those obtained by radical polymerization of unsaturated monomers such as styrene, alkyl(meth)acrylates, (meth) acrylic acids, hydroxyalkyl(meth)acrylates, and alkoxysilane(meth)acrylates in an aqueous solution using a polymerization initiator can be used. In addition, the polymerization initiator is not particularly limited, and for example, persulfates such as potassium persulfate and ammonium persulfate and an azo compound such as azobiscyanovaleric acid and azobisisobutyronitrile can be used.

The epoxy resin is not particularly limited. For example, those obtained by causing epoxy resins such as bisphenol A type epoxy resin, bisphenol F type epoxy resin, resorcinol type epoxy resin, hydrogenated bisphenol A type epoxy resin, hydrogenated bisphenol F type epoxy resin, resorcinol type epoxy resin, and novolac type epoxy resin to react with an amine compound such as diethanolamine and N-methylethanolamine, and neutralizing the resultant with an organic acid or an inorganic acid, or those obtained by carrying out radical polymerization of a high acid value acrylic resin in the presence of the epoxy resins and thereafter neutralizing the resultant with ammonia or an amine compound, followed by dispersion in water can be used.

The polyolefin resin is not particularly limited. For example, those obtained by carrying out radical polymerization of ethylene and unsaturated carboxylic acid such as methacrylic acid, acrylic acid, maleic acid, fumaric acid, itaconic acid, and crotonic acid at a high temperature and a high pressure, and thereafter neutralizing the resultant with ammonia or an amine compound, a metal compound such as KOH, NaOH, and LiOH, an ammonia or an amine compound containing the metal compound, or the like, followed by dispersion in water can be used.

In addition, as types of the resin film (A), a phenol resin can be used.

In addition, the phenol resin is not particularly limited. For example, those obtained by causing phenol resins such as a methylol phenol resin which is obtained by an addition reaction of aromatics such as phenol, resorcin, cresol, bisphenol A, and paraxylylene dimethyl ether and formaldehyde in the presence of a reaction catalyst to react with an amine compound such as diethanolamine and N-methylethanolamine, and neutralizing the resultant with an organic acid or an inorganic acid can be used.

It is preferable that the resin film according to this embodiment contain metal oxide particles and a lubricant. In this case, the content of the metal oxide particles (B) is 5 to 50 mass % with respect to 100 mass % of the solid content of the resin film (A). In a case where the content thereof is less than 5 mass %, an effect of enhancing corrosion resistance is small. On the other hand, in a case of a content of higher than 50 mass %, a resin-based film becomes brittle, and the effect of enhancing corrosion resistance of worked parts is small.

The type of the metal oxide particles (B) is not particularly limited. For example, particles made from at least one type of metal element selected from the group consisting of Si, Ti, Al, and Zr may be employed, and more specifically, silica particles, titania particles, alumina particles, zirconia particles, and the like can be used. As the metal oxide particles (B), particles having an average particle diameter of about 1 to 300 nm are appropriate. These may be used singly or in a combination of two or more types thereof.

In addition, it is preferable that the content of the lubricant (H) is 0.1 to 30 mass % with respect to 100 mass % of the solid content of the resin film (A). In a case where the content is less than 0.1%, an effect of enhancing workability is small, and in the case of a content of higher than 30%, there may be cases where the effect of enhancing corrosion resistance is not obtained.

As the lubricant (H) is contained as described above, lubricity of the resin-based film is enhanced. As a result, there are advantages in enhancement of workability during press molding, prevention of scratches due to molds or handling, and prevention of abrasion flaws during transportation of molded products or coils.

The lubricant (H) is not particularly limited. Well-known fluorine-based, hydrocarbon-based, fatty acid amide-based, ester-based, alcohol-based, metallic soap-based, and inorganic lubricants and the like can be used. As the criteria of selection of lubricating additives for enhancing workability, to select a material which is present on the surface of the resin film rather than present while being dispersed in the resin film formed by the added lubricant is effective in terms of reducing friction between the surface of a molded article and a mold and maximizing the lubricating effect. In a case where the lubricant is present while being dispersed in the formed resin film, poor appearances called a powdering phenomenon in which the coefficient of surface friction is high, the resin film is easily broken, and powdery materials are peeled and deposited, and degradation in workability occurs. As the material that is present on the surface of the resin film, a material that is not compatible with resins and has a low surface energy is selected.

A polyolefin wax is more preferably used as the lubricant (H) because the coefficient of kinetic friction of the surface is reduced, workability is significantly enhanced, and corrosion resistance after working is good. Examples of the wax include a hydrocarbon-based wax such as paraffin, microcrystalline, or polyethylene. In addition, while the working is in process, the temperature of the film is increased due to the deformation heat and frictional heat of materials, and thus the melting point of the wax is more preferably 70 to 160° C. When the melting point is less than 70° C., there may be cases where the lubricant is softened and melted while the working is in process and does not exhibit excellent characteristics as a lubricant. In addition, when the melting point exceeds 160° C., hard particles are present on the surface and degrade frictional characteristics, and thus there may be cases where high-degree molding workability is not obtained.

The particle diameter of the wax is more preferably 0.1 to 5 μm. When the particle diameter thereof exceeds 5 μm, there is a possibility that distribution of the solidified wax may become uneven or the wax may come away from the resin-based film. In addition, in a case where the particle diameter thereof is less than 0.1 μm, there may be cases where workability is insufficient.

It is preferable that the resin film (A) according to this embodiment further contain a phosphate compound (C). When the phosphate compound (C) is contained, a phosphate layer is formed on the surface of the coated layer and is passivated, resulting in enhancement in corrosion resistance.

Examples of the phosphate compound (C) include phosphoric acid such as orthophosphoric acid, metaphosphoric acid, pyrophosphoric acid, triphosphoric acid, and tetraphosphoric acid, and salts thereof; phosphonic acid such as aminotri(methylenephosphonic acid), 1-hydroxyethylidene-1,1-diphosphonic acid, ethylenediamine tetra(methylenephosphonic acid), and diethylene triamine penta(methylenephosphonic acid), and salts thereof; and organophosphorus acid such as phytic acid, and salts thereof. The cationic types of salts are not particularly limited, and examples thereof include Cu, Co, Fe, Mn, Sn, V, Mg, Ba, Al, Ca, Sr, Nb, Y, Ni, and Zn. These may be used singly or in a combination of two or more types thereof.

It is preferable that 0.01 to 20 mass % of the phosphate compound (C) be contained with respect to 100 mass % of the solid content of the resin film (A). In a case of a content of less than 0.01 mass %, the content is small and thus there may be cases where the effect of enhancing corrosion resistance is not obtained. In a case of a content of higher than 20 mass %, there may be cases where the resin-based film becomes brittle and the effect of enhancing corrosion resistance of worked parts is not obtained.

It is preferable that the resin film (A) according to this embodiment further contain at least one type of cross-linking agent (D) selected from the group consisting of a silane coupling agent, a crosslinkable zirconium compound, and a crosslinkable titanium compound. These may be used singly or in a combination of two or more types thereof.

In the case where at least one type of cross-linking agent (D) selected from the group consisting of a silane coupling agent, a crosslinkable zirconium compound, and a crosslinkable titanium compound is contained, adhesion between the coated layer and the resin film (A) is further enhanced.

The silane coupling agent is not particularly limited. For example, vinyl trimethoxysilane, vinyl triethoxysilane, γ-aminopropyltrimethoxy silane, γ-aminopropylethoxy silane, N-[2-(N-vinylbenzylamino)ethyl]-3-aminopropyltrimethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-glycidoxypropyltriethoxysilane, γ-glycidoxypropylmethyldiethoxysilane, γ-glycidoxypropyltrimethoxysilane, epoxycyclohexyl)ethyltrimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-phenyl-γ-aminopropyltrimethoxysilane, γ-mercaptpropyltrimethoxysilane, and the like, which are sold by Shin-Etsu Chemical Co., Ltd., Nippon Unicar Company Limited, Chisso Corporation, Toshiba Silicone Co., Ltd., and the like can be used. The silane coupling agents may be used singly or in a combination of two or more types thereof.

The crosslinkable zirconium compound is not particularly limited as long as it is a zirconium-containing compound having a plurality of functional groups that can react with a carboxyl group or a hydroxyl group. Here, a compound which is soluble in water or an organic solvent is preferable, a water-soluble zirconium compound is more preferable. Examples of the compound include zirconyl ammonium carbonate.

The crosslinkable titanium compound is not particularly limited as long as it is a titanium-containing compound having a plurality of functional groups which can react with a carboxyl group or a hydroxyl group. For example, dipropoxy.titanium bis(triethanolaminate), dipropoxy.titanium bis(diethanolaminate), propoxy.titanium tris(diethanolaminate), dibutoxy.titanium bis(triethanolaminate), dibutoxy.titanium bis(diethanolaminate), dipropoxy.titanium bis(acetylacetonato), dibutoxy.titanium bis(acetylacetonato), a salt of dihydroxy.titanium bis(lactato) monoammonium, a salt of dihydroxy.titanium bis(lactato) diammonium, propanedioxytitaniumbis(ethylacetoacetate), oxotitaniumbis (monoammonium oxalate), isopropyltri(N-amidoethyl.aminoethyl)titanate, and the like can be used. The cross-linking agents may be used singly or in a combination of two or more types thereof.

In the case where at least one type of cross-linking agent (D) selected from the group consisting of a silane coupling agent, a crosslinkable zirconium compound, and a crosslinkable titanium compound is contained, the content thereof is preferably 0.1 to 50 mass % with respect to 100 mass % of the solid content of the aqueous resin (A). In a case of a content of less than 0.1 mass %, the content is small and thus there may be cases where the effect of enhancing adhesion is not obtained, and in a case of a content of higher than 50 mass %, there may be cases where stability of the aqueous composition is degraded.

It is preferable that the resin film (A) according to this embodiment further contain at least one type of cross-linking agent (E) selected from the group consisting of an amino resin, a polyisocyanate compound and a blocked substance thereof, an epoxy compound, and a carbodiimide compound. The cross-linking agents may be used singly or in a combination of two or more types thereof.

In the case where at least one type of cross-linking agent (E) selected from the group consisting of an amino resin, a polyisocyanate compound and a blocked substate thereof, an epoxy compound, and a carbodiimide compound is contained, the crosslink density is increased, and the barrier properties of the resin-based film are enhanced, thereby further enhancing corrosion resistance.

The amino resin is not particularly limited. For example, a melamine resin, a benzoguanamine resin, a urea resin, a glycoluril resin, and the like can be used.

The polyisocyanate compound is not particularly limited. For example, hexamethylene diisocyanate, isophorone diisocyanate, xylylene diisocyanate, tolylene diisocyanate, and the like can be used. In addition, the blocked substance thereof is a blocked substance of the polyisocyanate compound.

The epoxy compound is not particularly limited as long as it has a plurality of oxirane rings. For example, diglycidyl ester adipate, diglycidyl ester phthalate, diglycidyl ester terephthalate, sorbitan polyglycidyl ether, pentaerythritol polyglycidyl ether, glycerin polyglycidyl ether, trimethylpropan polyglycidyl ether, neopentyl glycol polyglycidyl ether, ethylene glycol diglycidyl ether, polyethylene glycol diglycidyl ether, propylene glycol diglycidyl ether, polypropylene glycol diglycidyl ether, 2,2-bis-(4'-glycidyl oxyphenyl)propane, tris(2,3-epoxypropyl)isocyanurate, bisphenol A diglycidyl ether, hydrogenated bisphenol A diglycidyl ether, and the like can be used.

Examples of the carbodiimide compound include compounds obtained by synthesizing isocyanate-terminated polycarbodiimide through a condensation reaction of a diisocyanate compound such as aromatic diisocyanate, aliphatic diisocyanate, and alicyclic diisocyanate accompanied with the release of carbon dioxide, and thereafter adding a hydrophilic segment having a functional group which has the reactivity with an isocyanate group.

It is preferable that 0.1 to 50 mass % of at least one type of cross-linking agent (E) selected from the group consisting of an amino resin, a polyisocyanate compound and a blocked substate thereof, an epoxy compound, and a carbodiimide compound is contained with respect to 100 mass % of the solid content of the resin film (A). In a case of a content of less than 0.1 mass %, the content is small and thus there may be cases where the effect of enhancing corrosion resistance is not obtained, and in a case of a content of higher than 50 mass %, there may be cases where the resin film becomes brittle and the effect of enhancing corrosion resistance of worked parts is not obtained.

The resin film (A) according to this embodiment may further contain at least one type (F) selected from the group consisting of a vanadium compound, a tungsten compound, and a molybdenum compound. These may be used singly or in a combination of two or more types thereof.

By containing at least one type (F) selected from the group consisting of a vanadium compound, a tungsten compound, and a molybdenum compound, the corrosion resistance of the resin film according to this embodiment is enhanced.

The vanadium compound is not particularly limited. Well-known vanadium-containing compounds can be used, and for example, vanadic acid, vanadate such as ammonium vanadate and sodium vanadate, phosphovanadic acid, phosphovanadate such as ammonium phosphovanadate, and the like can be used.

The tungsten compound is not particularly limited. Well-known tungsten-containing compounds can be used, and for example, tungstic acid, tungstate such as ammonium tungstate and sodium tungstate, phosphotungstate such as phosphotungstic acid, ammonium phosphotungstate, and the like can be used.

The molybdenum compound is not particularly limited. Well-known molybdenum-containing compounds can be used, and for example, molybdate can be used. The skeleton and the condensation degree of the molybdate are not limited, and examples thereof include orthomolybdate, paramolybdate, and metamolybdate. In addition, any salts such as a single salt and double salts are included, phosphate molybdate or the like can be used as the double salts.

In the case where at least one type (F) selected from the group consisting of a vanadium compound, a tungsten compound, and a molybdenum compound is contained, the content is preferably 0.01 to 20 mass % with respect to 100 mass % of the solid content of the resin film (A). In a case of a content of less than 0.01 mass %, the content is small and thus there may be cases where the effect of enhancing corrosion resistance is not obtained. On the other hand, in a case of a content of higher than 20 mass %, there may be cases where the resin-based film becomes brittle and the effect of enhancing corrosion resistance of worked parts is not obtained.

The resin film (A) according to this embodiment may further contain a polyphenolic compound (G).

Since the polyphenolic compound (G) is contained, corrosion resistance of the resin-based film and adhesion of a post-coating film in a case of being used for post-coating are enhanced.

The polyphenolic compound (G) is a compound having two or more phenolic hydroxyl groups bonded to a benzene ring or a condensate thereof. Examples of the compound having two or more phenolic hydroxyl groups bonded to the benzene ring include gallic acid, pyrogallol, and catechol. The condensate of the compound having two or more phenolic hydroxyl groups bonded to the benzene ring is not particularly limited, and for example, polyphenolic compounds that are widely distributed in the plant kingdom, typically called tannic acid, and the like can be used. Tannic acid is a generic term for aromatic compounds with complex structures having a number of phenolic hydroxyl groups that are widely distributed in the plant kingdom. The tannic acid may hydrolysable tannic acid or condensed tannic acid. The tannic acid is not particularly limited. For example, hamameli tannin, persimmon tannin, tea tannin, gallnut tannin, gallate tannin, myrobalan tannin, divi-divi tannin, algarovilla tannin, valonia tannin, catechin tannin, and the like can be used.

As the tannic acid, some kind of the tannic acid which are commercially available, for example, "tannic acid essence A", "B tannic acid", "N tannic acid", "industrial tannic acid", "purified tannic acid", "Hi tannic acid", "F tannic acid", and "station tannic acid" (all of which are manufactured by Dainippon Pharmaceutical Co., Ltd.), "tannic acid: AL" (manufactured by Fuji Chemical Industry Co., Ltd.), and the like can be used. The polyphenolic compounds may be used singly or in a combination of two or more types thereof.

It is preferable that 0.1 to 50 mass % of the polyphenolic compound (G) is contained with respect to 100 mass % of the solid content of the resin film (A). In a case of a content of less than 0.1 mass %, the content is small and thus there may be cases where the effect of enhancing corrosion resistance is not obtained, and in a case of a content of higher than 50 mass %, there may be cases where stability of the aqueous composition is degraded.

The resin film according to this embodiment may further be blended with other additives. For example, pigments may be blended. As the pigment, for example, various coloring pigments such as inorganic pigments including titanium oxide ($TiO_2$), zinc oxide (ZnO), calcium carbonate ($CaCO_3$), barium sulfate ($BaSO_4$), alumina ($Al_2O_3$), kaoling clay, carbon black, and iron oxides ($Fe_2O_3$, $Fe_3O_4$) and organic pigments can be used.

In the method of painting the resin film (A), the aqueous composition which is the raw material of the resin film (A) is applied onto the surface of the coated steel sheet to form a film. The application method is not particularly limited. For example, roll coating, air spraying, airless spraying, dipping, and the like, which are generally used, may be appropriately employed. In order to increase the hardenability of the film, it is preferable that an article to be painted is heated in advance, or the article to be painted is thermally dried after painting. As a thermal drying method, any method including hot air, induction heating, near-infrared light, far-infrared light, and the like may be used, or the methods may be used in a combination. In the case of the thermal drying, the heating temperature of the article to be painted is 50 to 250° C., and preferably 70 to 220° C. When the heating temperature is less than 50° C., there may be cases where the evaporating rate of moisture is low, sufficient film forming properties are not obtained, and corrosion resistance is degraded. On the other hand, when the heating temperature is higher than 250° C., the resin is thermally decomposed and thus corrosion resistance is degraded, and the appearance becomes poor due to yellowing or the like. A drying time in the case of the thermal drying after painting is preferably 1 second to 5 minutes. In addition, when the resin is cured by electron beams or ultraviolet light, a curing may be achieved by such irradiation or may be used in combination with the thermal drying.

Fourth Embodiment

On the upper surface of the coated layer of the surface-treated steel sheet obtained in the first or second embodiment, one or more layers of film obtained by applying and drying a water-based metal surface treatment agent that contains an organic silicon compound (W) including a silane coupling agent (I) are further formed.

In addition, there may be cases where the film is referred to as a film according to this embodiment.

The organic silicon compound (W) which is an essential component of the water-based metal surface treatment agent in this embodiment can be obtained by blending a silane coupling agent (I) that contains one or more amino groups in the molecules with a silane coupling agent (J) that contains one or more glycidyl groups in the molecules. A blending ratio of the silane coupling agent (I) to the silane coupling agent (J) is, in terms of solid content mass ratio [(I)/(J)], preferably 0.5 to 1.7, more preferably 0.7 to 1.7, and most preferably 0.9 to 1.1. When the solid content mass ratio [(I)/(J)] is less than 0.5, fingerprint resistance, bath stability, and black deposit resistance are significantly degraded, that is not preferable. In contrast, when the ratio exceeds 1.7, water resistance is significantly degraded, that is not preferable.

The silane coupling agent (I) that contains one or more amino groups in the molecules according to this embodiment is not particularly limited. Examples thereof include 3-aminopropyltriethoxysilane, 3-aminopropyltrimethoxysilane, and the like. As the silane coupling agent (J) that contains one or more glycidyl groups in the molecules, 3-glycidoxypropyltrimethoxysilane, 3-glycidoxypropyltriethoxysilane, and the like can be used.

A method of manufacturing the organic silicon compound (W) in this embodiment is not particularly limited, and a method of sequentially adding, to water adjusted to pH4, the silane coupling agent (I) and the silane coupling agent (J) and stirring the resultant for a predetermined time may be employed.

In addition, in the organic silicon compound (W), there are two or more functional groups (a) expressed by the formula —$SiR^1R^2R^3$ (in the formula, $R^1$, $R^2$, and $R^3$ each independently represent an alkoxy group or a hydroxyl group, and at least one thereof represents an alkoxy group) in the molecules, and it is preferable that the number of functional groups (a) that contain one or more of at least one type of hydrophilic functional group (b) selected from the group consisting of a hydroxyl group (different from that can be included in the functional groups (a)) and an amino group be two or more. In a case where the number of functional groups (a) is one, adhesion to the surface of a metal material and film forming properties are degraded, and thus there is a concern that black deposit resistance may be degraded. The number of carbon of alkoxy groups in the definition of $R^1$, $R^2$, and $R^3$ of the functional groups (a) is not particularly limited, but is preferably 1 to 6, more preferably 1 to 4, and most preferably 1 or 2. The ratio of the functional groups (b) being present may be one or more in a molecule.

The average molecular weight of the organic silicon compound (W) is preferably 1000 to 10,000, and more preferably 1300 to 6000. The molecular weight mentioned here is not particularly limited, and may use any of direct measurement according to a TOF-MS method and converted measurement according to chromatography. When the average molecular weight is less than 1000, water resistance of the formed film is significantly reduced. On the other hand, when the average molecular weight is greater than 10,000, it becomes difficult to stably dissolve and disperse the organic silicon compound.

It is preferable that the film according to this embodiment contain an inhibitor component essentially having a fluorometal complex compound with at least one type selected from titanium and zirconium. By containing the inhibitor component, an effect of suppressing corrosion of the surface-treated steel sheet can be significantly enhanced.

Regarding the blending amount of the fluorometal complex compound (N) of the present invention, the solid content mass ratio [(N)/(W)] of the organic silicon compound (W) and the fluorometal complex compound (N) is preferably 0.02 to 0.07, more preferably 0.03 to 0.06, and most preferably 0.04 to 0.05. When the solid content mass ratio [(N)/(W)] of the organic silicon compound (W) and the fluorometal complex compound (N) is less than 0.02, the addition effect is not exhibited, that h is not preferable. In contrast, when the ratio is greater than 0.07, the conductivity is degraded, that is not preferable.

It is preferable that the film according to this embodiment contain phosphoric acid (Y). Regarding the blending amount of the phosphoric acid (Y), the solid content mass ratio [(Y)/(W)] of the organic silicon compound (W) and the phosphoric acid (Y) is preferably 0.03 to 0.12, more preferably 0.05 to 0.12, and most preferably 0.09 to 0.1. When the solid content mass ratio [(Y)/(W)] of the organic silicon compound (W) and the phosphoric acid (Y) is less than 0.03, the addition effect is not exhibited, that is not preferable. In contrast, when the ratio exceeds 0.12, the solubility of the film in water becomes significant, that is not preferable.

It is preferable that the film according to this embodiment contain a vanadium compound (Z). Regarding the blending amount of the vanadium compound (Z), the solid content mass ratio [(Z)/(W)] of the organic silicon compound (W) and the vanadium compound (Z) is more preferably 0.05 to 0.17, more preferably 0.07 to 0.15, even more preferably 0.09 to 0.14, and most preferably 0.11 to 0.13. When the solid content mass ratio [(Z)/(W)] of the organic silicon compound (W) and the vanadium compound (Z) is less than 0.05, the addition effect is not exhibited, that is not preferable. In contrast, when the ratio exceeds 0.17, stability is extremely degraded, that is not preferable.

The vanadium compound (Z) is not particularly limited. Examples thereof include vanadium (V) oxide $V_2O_5$, metavanadate $HVO_3$, ammonium metavanadate, sodium metavanadate, vanadium oxytrichloride $VOCl_3$, vanadium (III) oxide $V_2O_3$, vanadium (IV) oxide $VO_2$, vanadium (IV) oxysulfate $VOSO_4$, vanadium (IV)oxy acetylacetonate $VO(OC(=CH_2)CH_2COCH_3))_2$, vanadium (III) acetylacetonate $(OC(=CH_2)CH_2COCH_3))_3$, vanadium (III) chloride $VCl_3$, and phosphovanadomolybdic acid. In addition, those obtained by reducing a pentavalent vanadium compound to tetravalent to divalent compounds using an organic compound having at least one functional group selected from the group consisting of a hydroxyl group, a carbonyl group, a carboxyl group, primary to tertiary amino groups, an amide group, a phosphate group, and a phosphonate group can be used.

In addition, regarding the blending amount of the fluorometal complex compound (N) and the vanadium compound (Z), the solid content mass ratio [(Z)/(N)] of the fluorometal complex compound (N) and the vanadium compound (Z) needs to be 1.3 to 6.0, is preferably 1.3 to 3.5, even more preferably 2.5 to 3.3, and most preferably 2.8 to 3.0. When the solid content mass ratio [(Z)/(N)] of the fluorometal complex compound (N) and the vanadium compound (Z) is less than 1.3, the effect of adding the vanadium compound (Z) is not exhibited, that is not preferable. In contrast, when the ratio exceeds 6.0, bath stability and black deposit resistance are degraded, that is not preferable. Examples of the fluorometal complex compound (N) include titanium hydrofluoric acid (O) and zirconium hydrofluoric acid (P).

It is preferable that the film according to this embodiment contain at least one type of metal component selected from Mg, Co, and W. By containing such metal components, the metal components may be caused to function as an inhibitor for elution, thereby suppressing corrosion of the surface-treated steel sheet. From this point of view, it is more preferable that a cobalt compound (Co) be added to the film according to this embodiment. It is preferable that the cobalt compound is at least one type of cobalt compound selected from the group consisting of cobalt sulfate, cobalt nitrate, and cobalt carbonate. In addition, regarding the blending ratio thereof, the solid content mass ratio [(Co)/(W)] of the organic silicon compound (W) and the cobalt compound (Co) is preferably 0.01 to 0.1, more preferably 0.02 to 0.07, and most preferably 0.03 to 0.05. When the solid content mass ratio [(Co)/(W)] of the organic silicon compound (W) and the cobalt compound (Co) is less than 0.01, the effect of adding the cobalt compound (Co) is not exhibited, that is not preferable. In contrast, when the ratio is greater than 0.1, the effect of enhancing corrosion resistance is not obtained, that is not preferable.

It is preferable that the above-described water-based metal surface treatment agent is applied to the surface-treated steel sheet according to this embodiment, drying is performed thereon at an end-point temperature of higher than 50° C. and less than 250° C., and the thickness of the resultant after drying is 0.05 to 2.0 μm. Regarding the drying temperature, the end-point temperature is preferably higher than 50° C. and less than 250° C., more preferably 70° C. to 150° C., and most preferably 100° C. to 140° C. When the end-point temperature is 50° C. or less, the solvent of the water-based metal surface treatment agent is not completely volatilized, that is not preferable. In contrast, when the temperature is 250° C. or higher, a part of organic chains of the film formed by the water-based metal surface treatment agent is decomposed, that is not preferable.

The thickness of the film is preferably 0.05 to 2.0 μm, more preferably 0.2 to 1.0 μm, and most preferably 0.3 to 0.6 μm. When the thickness is less than 0.05 μm, the surface of the metal material cannot be painted, and thus there may be cases where the effect of enhancing corrosion resistance is not obtained. In contrast, when the thickness is greater than 2.0 μm, conductivity and working adhesion are degraded, that is not preferable.

The water-based metal surface treatment agent used in the present invention can use a leveling agent or a water-soluble solvent, a metal stabilizer, an etching inhibitor, a pH adjusting agent, and the like for enhancing painting properties, in a range in which the effects of the present invention are not harmed.

The film of the present invention may further contain a polyethylene wax (Q) as a lubricant.

By containing the polyethylene wax (Q), lubricity of the film is enhanced, there is an effect on enhancement in workability during press-forming, prevention of scratches due to molds or handling, and prevention of abrasion flaws during transportation of formed products or coils.

It is preferable that 0.1 to 10 mass % of the polyethylene wax (Q) is contained with respect to 100 mass % of the solid content of the film. In a case of a content of less than 0.1%, the effect of enhancing workability is small, and in a case of content of higher than 10%, there may be cases where corrosion resistance is degraded.

It is more preferable that the particle diameter of the wax is 0.1 to 5 μm. When the particle diameter exceeds 5 μm, there is a possibility that the distribution of the solidified wax may become uneven or the wax may be peeled off from the resin-based film. In a case of a particle diameter of less than 0.1 μm, there may be cases where workability is insufficient.

Modified Example of Fourth Embodiment

The above-described film may be a composite film obtained by applying and drying a water-based metal surface treatment agent that further includes an organic resin (GB) in addition to the organic silicon compound (W) including the silane coupling agent (I). In this case, those described below are preferable. In addition, there may be cases where the composite film is referred to as a composite film according to this embodiment.

The organic silicon compound (W) is obtained by blending a silane coupling agent (I) that contains one or more amino groups in the molecules with a silane coupling agent (J) that contains one or more glycidyl groups in the molecules at a predetermined solid content mass ratio [(I)/(J)]. The blending ratio of the silane coupling agent (I) and the silane coupling agent (J) is, in terms of solid content mass ratio [(I)/(J)], preferably a ratio of 0.50 to 0.75, more preferably 0.50 to 0.65, and most preferably 0.55 to 0.65. When the solid content mass ratio [(I)/(J)] is less than 0.50, hydrophobicity and self-crosslinking properties of the organic silicon compound (W) become strong, and thus the treatment agent stability is significantly degraded. In contrast, when the solid content mass ratio [(I)/(J)] exceeds 0.75, hydrophilicity of the organic silicon compound (W) becomes too strong, and thus water resistance of the obtained film is significantly degraded.

The silane coupling agent (I) that contains one or more amino groups in the molecules in this embodiment is not particularly limited. For example, 3-aminopropyltriethoxysilane, 3-aminopropyltrimethoxysilane, and the like can be used. As the silane coupling agent (J) that contains one or more glycidyl groups in the molecules, for example, 3-glycidoxypropyltrimethoxysilane, 3-glycidoxypropyltriethoxysilane, and the like can be used.

A method of manufacturing the organic silicon compound (W) described above is not particularly limited. For example, there is a method of sequentially adding, to water adjusted to pH4, the silane coupling agent (I) and the silane coupling agent (J) and stirring the resultant for a predetermined time.

It is preferable that the number of functional groups (a) in the organic silicon compound (W) is two or more. In a case where the number of functional groups (a) is one, adhesion to the surface of a zinc-plated material, self-crosslinking properties of the organic silicon compound (W), bonding to a polyether polyurethane resin (K) are degraded, and thus there may be cases where the film is not sufficiently formed. In this case, an effect by forming the composite film on the coated layer is not obtained. The number of carbon atoms of the alkyl group and the alkoxy group in the definition of $R^1$, $R^2$, and $R^3$ of the functional groups (a) is not particularly limited, but is more preferably 1 to 6, even more preferably 1 to 4, and most preferably 1 or 2.

Moreover, in the organic silicon compound (W), the ratio of a functional group (b) expressed by the formula —$SiR^1R^2R^3$ (in the formula, $R^1$, $R^2$, and $R^3$ each independently represents an alkoxy group or a hydroxyl group, and at least one thereof represents an alkoxy group) in the molecules may be one or more in a molecule. In addition, the average molecular weight is preferably 1000 to 10,000, and more preferably 1300 to 6000. The molecular weight mentioned here is not particularly limited, and may use any of direct measurement according to a TOF-MS method and converted measurement according to chromatography. In addition, it is preferable that GFC (gel filtration chromatography) is used and ethylene glycol be used as molecular weight standard substances. When the average molecular weight obtained by the same method is less than 1000, solubility of the organic silicon compound in water becomes strong, and thus water resistance of the formed film is significantly reduced. On the other hand, when the average molecular weight is greater than 10,000, it becomes difficult to stably dissolve and disperse the organic silicon compound (W).

The type of the organic resin (GB) as an essential component is not particularly limited, and for example, a polyether polyurethane resin (K) is preferably used.

In the case where the polyether polyurethane resin (K) is used, it is preferable to have at least one structural unit (L) selected from the group consisting of a structural unit (L1) expressed by the following general formula [1], an alicyclic structure (L2) having 4 to 6 carbon atoms, and an aromatic ring structure (L3) having 6 carbon atoms. The structural unit (L1) acts as a point that reacts to the organic silicon compound (W). Therefore, when the structural unit (L1) is included, the degree of cross-linking is increased and corrosion resistance or cleaner resistance is significantly enhanced. In addition, when the alicyclic structure (L2) having 4 to 6 carbon atoms is included, the structure is entangled with the organic silicon compound (W) during film formation, and the same effect as that of the case of being cross-linked is obtained. In addition, when the aromatic ring structure (L3) is included, the barrier properties of the aromatic ring are imparted to the polyether polyurethane resin (K). Therefore, although the cross-linking reaction or the entangling reaction does not occur, the same effects as those are obtained.

[Chem. 1]

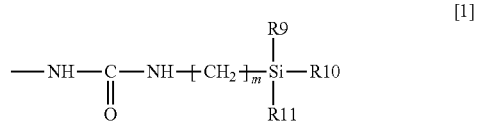

As the type of the organic resin, a polyester polyurethane resin is not preferable because hydrolysis occurs due to acids or alkalis. Polycarbonate polyurethane is likely to form a film that is hard and brittle and has degraded adhesion while the working is in process and degraded corrosion resistance of worked parts, and is thus not preferable.

Although R9, R10, and R11 in the structural unit (L1) are not particularly limited, it is preferable that R9 is a monovalent organic residue selected from the group consisting of a hydrogen atom, an alkyl group, an aryl group, and an aralkyl group, it is preferable that R10 and R11 each independently are a functional group selected from the group consisting of an alkoxyl group, an acyloxy group, a hydroxyl group, and a halogen atom, it is most preferable that R9 is an alkyl group, and it is most preferable that R10 and R11 are hydroxyl groups. The number m of ethylene chains of the structural unit (L1) is not particularly limited, but is preferably 1 to 5 and most preferably 2 or 3.

The polyether polyurethane resin (K) according to this embodiment is not particularly limited. Examples thereof include a urethane resin which is a polycondensate of polyether polyol and an aliphatic, alicyclic, or aromatic polyisocyanate, and polyurethane obtained by using polyol having an (substituted) amino group as a part of polyol used. As the polyether polyol, those obtained by addition-polymerizing one or more types of compounds such as ethylene oxide, propylene oxide, butylene oxide, styrene oxide, epichlorohydrin, tetrahydrofuran, and cyclohexylene using ethylene glycol, diethylene glycol, triethylene glycol, propylene glycol, 1,3-propanediol, 1,3-butanediol, 1,4-butanediol, hexamethylene glycol, saccharose, methylene glycol, glycerine, and the like as an initiator can be used. As the polyisocyanate, tolylene diisocyanate, diphenylmethane diisocyanate, xylylene diisocyanate, dicyclohexylmethane diisocyanate, cyclohexylene diisocyanate, hexamethylenediisocyanate, lysine diisocyanate, and the like can be used.

In a case where the polyether polyurethane resin (K) contains the structural unit (L1), this structural unit (L1) can be obtained at a stage in which a skeletal terminal of the polyether polyurethane resin (K) becomes isocyanate by a reaction of the terminal isocyanate of the polyether polyurethane resin (K) and primary amine using an organic compound having both primary amine and trialkoxysilane. Examples of the organic compound having both primary amine and trialkoxysilane include 3-aminopropyltriethoxysilane, and 3-aminopropyltrimethoxysilane.

The composite film according to this embodiment preferably contain a cationic phenolic resin (M), and in this case, the cationic phenolic resin (M) preferably has a bisphenol A skeleton. The above-mentioned cationic phenolic resin (M) is not particularly limited, but is a novolac-type phenolic resin having bisphenol A as the main skeletal structure by condensing bisphenol A, and may include a compound having a form three-dimensionally condensed as well as a linear compound. The cationic properties of the cationic phenolic resin (M) are not particularly limited. For example, it is preferable that, in an aromatic ring in the bisphenol A skeleton, $—CH_2NHCH_2OH$ and/or $—CH_2NHCH_2OC_2H_5$ added by removing a hydrogen atom bonded to a carbon atom included in the aromatic ring be exhibited by being neutralized with inorganic acid ions such as sulfuric acid ions and phosphoric acid ions or organic acid ions such as nitric acid ions and formic acid ions and forming quaternary ammonium salts. In addition, as the neutralizing acid, phosphoric acid is most preferable.

It is preferable that the composite film according to this embodiment contain an inhibitor component (d) essentially having a fluorometal complex compound (N) with at least one type selected from titanium and zirconium. By containing the inhibitor component, the effect of suppressing corrosion of the surface-treated steel sheet is significantly enhanced.

Examples of the fluorometal complex compound (N) having titanium include titanium hydrofluoric acid (O), and examples of the fluorometal complex compound (N) having zirconium include zirconium hydrofluoric acid (P).

In addition, in a case where the inhibitor component (d) contains both the titanium hydrofluoric acid (O) and the zirconium hydrofluoric acid (P), regarding the blending ratio thereof, the metal component mass ratio [(Mo)/(Mp)] of a Ti amount (Mo) included in the titanium hydrofluoric acid (O) to a Zr amount (Mp) included in the zirconium hydrofluoric acid (P) is preferably in a range of 0.5 to 0.8, more preferably 0.6 to 0.8, and most preferably 0.6 to 0.7. When the metal component mass ratio [(Mo)/(Mp)] is in a predetermined range, the ratio of titanium or a film of oxides thereof which are produced from the titanium hydrofluoric acid and have relatively high workability and low alkali resistance, and zirconium or oxides thereof which are relatively hard and brittle and have high alkali resistance becomes appropriate. As a result, an ability to follow the deformation of the film associated with the plastic deformation of the material is increased, and thus film defects are less likely to occur and corrosion resistance is less likely to be degraded. In contrast, when the ratio exceeds 0.8, the ratio of titanium or a film of oxides thereof which have relatively low alkali resistance is increased, and thus the alkali resistance of the film is degraded, so that the effect of enhancing corrosion resistance is not obtained.

It is preferable that the composite film according to this embodiment contain a phosphoric acid (Y). The phosphoric acid (Y) is not particularly limited. Examples thereof include phosphoric acid, an ammonium salt of phosphoric acid, an alkali metal salt of phosphoric acid, an alkaline-earth metal salt of phosphoric acid. These have an effect of mainly imparting corrosion resistance. Elution properties of the phosphoric acid can be controlled according to the types of salts of the phosphate compound, and a time to hold corrosion resistance can be lengthened. Among these, phosphoric acid or magnesium biphosphate can obtain a higher effect of improving corrosion resistance and is thus preferable. It is more preferable to use phosphoric acid and magnesium biphosphate in combination.

It is preferable that the composite film according to this embodiment contain the vanadium compound (Z). The vanadium compound (Z) is not particularly limited. For example, those obtained by reducing vanadium (V) of a compound such as vanadium (V) pentoxide "$V_2O_5$", metavanadate "$HVO_3$", ammonium metavanadate "$NH_4VO_3$", sodium metavanadate "$NaVO_3$", and vanadium oxytrichloride "$VOCl_3$" to vanadium (IV) using a reducing agent such as alcohols and organic acids, a vanadium (IV)-containing compound such as vanadium (IV) dioxide "$VO_2$", vanadium (IV) oxy acetylacetonate "$VO(C_5H_7O_2)_2$", and vanadium (IV) oxysulfate $VOSO_4$, those obtained by oxidizing vanadium (III) of a compound such as vanadium acetylacetonate "$V(C_5H_7O_2)_3$", vanadium trioxide "$V_2O_3$", and vanadium trichloride "$VCl_3$" to vanadium (IV) using an arbitrary oxidizing agent, and the like may be used.

It is preferable that the water-based metal surface treatment agent described above include a polyethylene wax (Q) described later in addition to the film-forming component (c) and the inhibitor component (d), is made of an aqueous medium, and have a pH of 4 to 6.

The polyethylene wax (Q) is not particularly limited, and the number average particle diameter thereof is preferably 0.1 to 4.0 μm, more preferably 0.2 to 3.0 μm, and most preferably 0.3 to 2.5 μm. When the number average particle diameter is less than 0.1 μm, the amount of the polyethylene wax exposed to the surface of the film is small, and the coefficient of friction is increased, that is not preferable. In contrast, when the diameter exceeds 4.0 μm, the thickness of the polyethylene wax with respect to that of the film is significantly increased, and thus the wax is not held in the film but is peeled off by slight sliding. Therefore, the effect of reducing the coefficient of friction is not exhibited. In addition, the density of the polyethylene wax (Q) is preferably 0.90 to 0.96 g/m$^2$, more preferably 0.90 to 0.94 g/m$^2$, and most preferably 0.91 to 0.93 g/m$^2$. When the density thereof is less than 0.90 g/m$^2$, the softening point and hardness are reduced, the film itself is softened, and thus workability is degraded, that is not preferable. On the other hand, when the density exceeds 0.96 g/m$^2$, the coefficient of static friction becomes too low, and thus a roll slip or coil collapse occurs, resulting in degradation in operability.

It is preferable that the pH of the water-based metal surface treatment agent described above be 4 to 6. When the pH is less than 4, the material is excessively etched, and a large amount of the material penetrates into chemicals, thereby degrading stability of chemicals. On the other hand, when the pH exceeds 6, the solubility of the above-described inhibitor component (d) is significantly reduced, and thus stability is degraded.

Regarding the blending ratio of the organic silicon compound (W) according to this embodiment and the organic resin (GB) by the polyether polyurethane resin (K) in terms of solid content, the solid content mass ratio [(GB×K)/(W)] of the organic silicon compound (W) and the organic resin (GB) by the polyether polyurethane resin (K) is preferably 0.33 to 0.90, is more preferably 0.33 to 0.80, and most preferably 0.35 to 0.70. When the solid content mass ratio [(GB×K)/(W)] is less than 0.33, the barrier properties of the film-forming component (c) are degraded, that is not preferable. In contrast, when the ratio exceeds 0.90, adhesion to the material caused by the organic silicon compound (W) is significantly degraded, and thus overall performance is degraded.

Regarding the blending ratio of the organic resin (GB) according to this embodiment by the polyether polyurethane resin (K) and the cationic phenolic resin (M) in terms of solid content, the solid content mass ratio [(M)/(GB×K)] of the organic resin (GB) by the polyether polyurethane resin (K) and the cationic phenolic resin (M) is preferably 0.010 to 0.030, more preferably 0.010 to 0.025, and most preferably 0.010 to 0.022. When the mass ratio [(M)/(GB×K)] is less than 0.010, an effect of adding the cationic phenolic resin (M) is not exhibited, and corrosion resistance or solvent resistance is degraded, that is not preferable. When the mass ratio exceeds 0.030, the film is colored in light yellow by the phenolic resin, and significant yellowing occurs under a high-humidity environment or an environment exposed to ultraviolet light, that is not preferable.

In this embodiment, the blending ratio of Si ($Si_W$) derived from the organic silicon compound (W) in the inhibitor component (d), and a Ti amount ($M_o$) of the titanium hydrofluoric acid (O) and a Zr amount ($M_p$) of the zirconium hydrofluoric acid (P), the metal component mass ratio [($M_o$+$M_p$)/($Si_W$)] of Si ($Si_W$) derived from the organic silicon compound (W), and a Ti amount ($M_o$) of the titanium hydrofluoric acid (O) and a Zr amount ($M_p$) of the zirconium hydrofluoric acid (P) is preferably 0.08 to 0.20, more preferably 0.08 to 0.17, and most preferably 0.08 to 0.15. When the metal component mass ratio [($M_o$+$M_p$)/($Si_W$)] is less than 0.08, the amount of titanium, zirconium, or a compound film thereof generated from the titanium hydrofluoric acid and the zirconium hydrofluoric acid during film formation is small, resulting in reduction in corrosion resistance. On the other hand, when the ratio exceeds 0.20, the surface coverage of the material of the film made from titanium, zirconium, or oxides thereof described above is increased, points that react to the material of the organic silicon compound (W) are reduced, and thus an effect of imparting adhesion by the organic silicon compound (W) is reduced. In this case, the overall effect of the formation of the composite film is degraded.

In this embodiment, the solid content mass ratio [(Y)/(W)] of the organic silicon compound (W) and the phosphoric acid (Y) is preferably 0.020 to 0.110, more preferably 0.030 to 0.110, and most preferably 0.040 to 0.100. When the solid content mass ratio [(Y)/(W)] is less than 0.020, the effect of enhancing alkali resistance, corrosion resistance, and the like, which is the effect obtained by adding the phosphoric acid (Y), is not exhibited. On the other hand, when the ratio exceeds 0.110, chemical stability is degraded.

In this embodiment, the solid content mass ratio [(Z)/(W)] of the organic silicon compound (W) and the vanadium compound (Z) is preferably 0.020 to 0.060, more preferably 0.025 to 0.060, and most preferably 0.030 to 0.055. When the solid content mass ratio [(Z)/(W)] is less than 0.020, an inhibitor effect caused by the vanadium compound (Z) is not obtained. On the other hand, when the ratio exceeds 0.060, the film is likely to be colored in yellow due to increase in humidity by a complex compound of the vanadium compound and organic substances included in the film.

In this embodiment, in a case where the structural unit (L1) is contained in the polyether polyurethane resin (K), regarding the blending ratio of the organic silicon compound (W) and the polyether polyurethane resin (K), the mass ratio [($Si_K$)/($Si_W$+$Si_K$)] of Si ($Si_K$) derived from the structural unit (L1) included in the polyether polyurethane resin (K) to the sum of Si ($Si_W$) derived from the organic silicon compound (W) and Si ($Si_K$) derived from the structural unit (L) included in the polyether polyurethane resin (K) is preferably 0.015 to 0.045, more preferably 0.015 to 0.040, and most preferably 0.20 to 0.040. When the mass ratio [($Si_K$)/($Si_W$+$Si_K$)] is in this range, the degree of cross-linking between the polyether polyurethane resin (K) and the organic silicon compound (W) becomes appropriate, and a film having excellent barrier properties and hardness of the film is formed. As a result, corrosion resistance and cleaner resistance are improved and self-crosslinking properties of the polyether polyurethane resin itself become sufficient, thereby enhancing printing adhesion as well as workability and slidability. In addition, since dispersion stability of the polyether polyurethane resin (K) is improved and the reaction of the organic silicon compound (W) to the functional groups (a) and the reaction of the organic silicon compound (W) to the material are well-balanced, sufficient adhesion is obtained.

In this embodiment, the mass ratio [(Q)/(W)] of the organic silicon compound (W) and the polyethylene wax (Q) in terms of solid content is preferably 0.05 to 0.30, more preferably 0.07 to 0.30, and most preferably 0.10 to 0.25. When the mass ratio [(Q)/(W)] is less than 0.05, sufficient lubricity is not exhibited. On the other hand, when the mass ratio is 0.30 or higher, continuity of the film is hindered by the polyethylene wax, the film is likely to be cracked, and thus there is a concern that corrosion resistance may be degraded.

It is preferable that the composite film according to this embodiment contain a coloring pigment containing carbon black (P1).

The addition amount of the coloring pigment is preferably 5 to 35 mass. In such a range, the emissivity of the obtained surface-treated steel sheet is increased, and blackening can be achieved. When the addition amount is less than 5 mass %, enhancement of emissivity is insufficient, that is not preferable. In addition, when the addition amount exceeds 35 mass %, storage stability and corrosion resistance of the metal surface treatment agent are deteriorated, that is not preferable.

It is preferable that the composite film according to this embodiment contain at least one type of metal component selected from Mg, Co, and W. By containing such metal components, the metal components may be caused to function as an inhibitor for elution, thereby achieving enhancement in corrosion resistance of the surface-treated steel sheet. From a viewpoint of corrosion resistance, it is more preferable that a cobalt compound is added. It is preferable that the cobalt compound be at least one type of cobalt compound selected from the group consisting of cobalt sulfate, cobalt nitrate, and cobalt carbonate.

When the composite film according to this embodiment is formed, the composite film is obtained by applying the above-described water-based metal surface treatment agent and drying the resultant at an end-point temperature of 50 to 250° C. Regarding the drying temperature, the end-point temperature is 50° C. to 250° C., more preferably 70° C. to 150° C., and most preferably 100° C. to 140° C. When the end-point temperature is 50° C. or less, the solvent of the water-based metal surface treatment agent is not completely volatilized. In contrast, when the temperature exceeds 250° C., a part of organic chains of the film formed by the water-based metal surface treatment agent is decomposed.

In order to enhance corrosion resistance, increasing the thickness of the film is effective. However, since an inorganic film does not include resin components, it is difficult to form a thick film. Furthermore, there is a problem in that conductivity is deteriorated by thickening the film. The composite film according to this embodiment is a composite film that contains the organic silicon compound (W) and the organic resin (GB) in the film formed on the coated layer, it is possible to form the film to be thick. As a result, corrosion resistance can be significantly enhanced. Moreover, according to the composite film, even when the film is thickened, conductivity can be maintained without being deteriorated. Moreover, hitherto, it has been considered that there is a concern that working adhesion may be deteriorated by forming such a composite film on the zinc-coated layer. However, by forming, as an object on which the composite film is to be formed, the coated layer that contains zinc and vanadium as described above, excellent working adhesion can be ensured.

In addition, in terms of corrosion resistance and conductivity, the thickness of the composite film is preferably 0.3 to 4.0 μm, more preferably 0.5 to 3.0 μm, and most preferably 1.0 to 2.0 μm. When the thickness of the composite film is less than 0.3 μm, the surface of the steel sheet cannot be coated, and thus the effect of enhancing corrosion resistance is not obtained. In contrast, when the thickness exceeds 4.0 μm, conductivity and adhesion are degraded.

It is possible for the water-based metal surface treatment agent used in this embodiment to use a leveling agent or a water-soluble solvent, a metal stabilizer, an etching inhibitor, and the like for enhancing painting properties, in a range in which the effects of the composite film according to this embodiment are not harmed. Examples of the leveling agent include adducts of polyethylene oxide or polypropylene oxide and an acetylene glycol compound as a nonionic or cationic surfactant. Examples of the water-soluble solvent include alcohols such as ethanol, isopropyl alcohol, tert-butyl alcohol, and propylene glycol, Ketones such as ethylene glycol monobutyl ether and ethylene glycol monoethyl ether, esters such as ethyl acetate and butyl acetate, and ketones such as acetone, methyl ethyl ketone, and methyl isobutyl ketone. Examples of the metal stabilizer include a chelate compound such as EDTA and DTPA. Examples of the etching inhibitor include an amine compound such as ethylenediamine, triethylenepentamine, guanidine, and pyrimidine. Particularly, those having two or more amino groups in a molecule are effective as the metal stabilizer and thus are more preferable.

Fifth Embodiment

Figure 7:
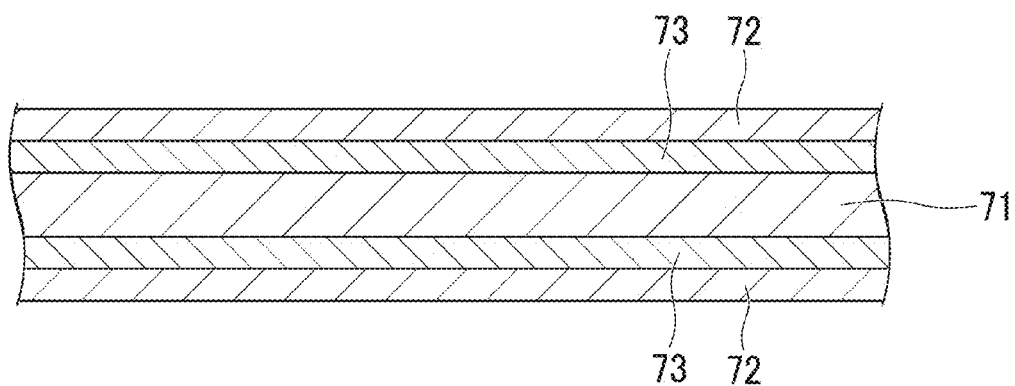
FIG. 7 is an enlarged cross-sectional view for explaining an example of a surface-treated steel sheet according to a fifth embodiment.

FIG. 7 is an enlarged cross-sectional view for explaining an example of a surface-treated steel sheet according to a fifth embodiment. The surface-treated steel sheet according to this embodiment has a coated layer 73 formed in the method of the first or second embodiment and a single layer of an organic resin film 72 formed on the upper surface of the coated layer 73, on each of the surfaces of both sides of a steel sheet 71. In the following description, there may be cases where the organic resin film 72 is referred to as an organic resin film according to this embodiment.

In a case where the surface-treated steel sheet has an L* value of 10 to 35, the surface-treated steel sheet can be used as a material having a black appearance for various purposes, that is preferable. In a case of an L* value of higher than 35, it is difficult to use the steel sheet as a material having a black appearance. In addition, in a case of an L* value of less than 10, the thickness of the organic resin film is increased or the concentration of the pigment in the film is increased. Therefore, painting adhesion between the coated layer 73 and the organic resin film 72 is not sufficiently obtained, and there is a concern that corrosion resistance may be degraded. Therefore, it is preferable that the surface-treated steel sheet according to this embodiment have an L* value of 10 to 35, which represents brightness.

It is preferable that the 60-degree gloss value that represents glossiness in the surface-treated steel sheet of this embodiment is 50 or less. When the gloss value of the surface-treated steel sheet is 50 or less, the steel sheet can be used as a material having a black appearance for various purposes. In a case of a gloss value of higher than 50, scratches are easily noticeable during handling or press work, and thus there may be cases where the surface-treated steel sheet cannot be used as a design material.

The organic resin film 72 according to this embodiment will be described. The organic resin film 72 of this embodiment is made from an organic resin that includes a polyester resin (A1) containing a sulfonic acid group, a curing agent (B1), and a colorant (C1) as a coloring pigment containing carbon black, and is formed by applying a black water-based paint that includes the polyester resin (A1) containing a sulfonic acid group, the curing agent (B1), and the colorant (C1) and curing the resultant through baking and drying.

In order to obtain excellent painting adhesion, it is more preferable that the thickness of the organic resin film 72 is smaller in a range in which a predetermined appearance having a sufficiently low glossiness and L* value is obtained. Specifically, the thickness is preferably 1 to 10 μm, and more preferably 2 to 5 μm. When the thickness of the organic resin film 72 is less than 1 μm, there may be cases where a predetermined appearance having a sufficiently low glossiness and L* value is not obtained or a thin-painted appearance is obtained while fine unevenness on the coating surface is not shielded. In addition, when the thickness of the organic resin film 72 exceeds 10 μm, there is a concern of inconvenience such as degradation in painting adhesion or popping is more likely to occur during film formation.

The thickness of the above-described organic resin film 72 can be measured by cross-section observation or by using an electromagnetic film thickness meter. In addition, the mass of painted film attached per unit area may be calculated by dividing the mass by the specific gravity of the painted film or the specific gravity after drying a paint. The mass of the painted film attached may be obtained by appropriately selecting a technique from conventional techniques such as measurement of a mass difference before and after formation of the painted film or a mass difference before and after the painted film is peeled off, and measurement of the amount of an element being present, of which the content in the painted film is known in advance through fluorescent X-ray analysis of the painted film. In addition, the specific gravity of the painted film or the specific gravity of the paint after drying may be obtained by appropriately selecting a technique from conventional techniques such as collection of an appropriate amount of paint to measure the volume and mass of an isolated painted film in a container and measurement of the volume and mass after drying the resultant in the vessel, or calculation from the amount of painted film constituent components being blended and the conventional specific gravity of each of the components.

[Polyester Resin (A1) Containing Sulfonic Acid Group]

Although a polyester resin itself is hydrophobic, in a case where a sulfonic acid group is contained in the polyester resin, high hydrophilicity is exhibited. Therefore, the polyester resin (A1) containing the sulfonic acid group is stably dissolved or dispersed in a water-based paint. In addition, the polyester resin (A1) containing the sulfonic acid group enhances the compatibility between carbon black having hydrophobic surfaces and water and has an important role of causing the carbon black to be uniformly and stably dispersed in the water-based paint. This is achieved by an effect in which the main skeleton of the polyester resin having hydrophobicity is oriented in the direction of the carbon black.

Therefore, the surface-treated steel sheet according to this embodiment has carbon black uniformly dispersed in the organic resin film 72, and thus has extremely excellent design properties (coloring properties and concealing properties) even when the organic resin film 72 is thin.

The water-based paint for forming the organic resin film 72 of this embodiment may not perform a surface hydrophilization treatment or contain a surfactant in order to enhance the dispersability of the carbon black. Therefore, there is no concern of corrosion resistance of the organic resin film 72 being degraded by the surface hydrophilization treatment and the surfactant.

The sulfonic acid group included in the polyester resin (A1) has an effect of enhancing adhesion with the coated layer 73 disposed in contact with the organic resin film 72. Therefore, in the surface-treated steel sheet of this embodiment, adhesion between the organic resin film 72 and the coated layer 73 is excellent.

The polyester resin (A1) containing the sulfonic acid group is not particularly limited as long as the sulfonic acid group is contained. For example, those obtained by dissolution or dispersion in water of the resultant obtained through polycondensation of a polyester raw material made from a polycarboxylic acid component and a polyol component can be used. The polycarboxylic acid component is not particularly limited. Examples thereof include terephthalic acid, isophthalic acid, orthophthalic acid, 2,6-naphthalenedicarboxylic acid, succinic acid, glutaric acid, adipic acid, sebacic acid, dodecanedicarboxylic acid, azelaic acid, 1,2-cyclohexanedicarboxylic acid, 1,3-cyclohexanedicarboxylic acid, 1,4-cyclohexanedicarboxylic acid, dimer acid, trimellitic anhydride, and pyromellitic dianhydride. Only one type or two or more types thereof can be arbitrarily used.

The polyol component is not particularly limited. Examples thereof include ethylene glycol, diethylene glycol, 1,3-propanediol, 1,2-propanediol, triethylene glycol, 2-methyl-1,3-propanediol, 2,2-dimethyl-1,3-propanediol, 2-butyl-2-ethyl-1,3-propanediol, 1,4-butanediol, 2-methyl-1,4-butanediol, 2-methyl-3-methyl-1,4-butanediol, 1,5-pentanediol, 3-methyl-1,5-pentanediol, 1,6-hexanediol, 1,4-cyclohexanedimethanol, 1,3-cyclohexanedimethanol, 1,2-cyclohexanedimethanol, hydrogenated bisphenol A, dimer diol, trimethylol ethane, trimethylol propane, glycerine, and pentaerythritol. Only one type or two or more types thereof can be arbitrarily used.

The sulfonic acid group included in the polyester resin (A1) represents a functional group expressed by —$SO_3H$ and may be those neutralized by alkali metals, amines including ammonia, and the like. The neutralized sulfonic acid group may be those assembled in a polyester resin with an already neutralized sulfonic acid group, or those neutralized after assembling a sulfonic acid group in a resin. Particularly, a group of sulfonic acid metal salt neutralized by alkali metals such as Li, Na, and K has higher hydrophilicity and thus enhances dispersability of the carbon black, thereby being appropriate for obtaining high design properties. In addition, in order to further enhance adhesion between the organic resin film 72 and the coated layer 73, the sulfonic acid group is preferably a group of sulfonic acid metal salt neutralized by alkali metals, and a group of sulfonic acid sodium salt is most preferable.

It is preferable that the polyester resin (A1) containing the sulfonic acid group contain a urethane bond in the skeleton. By containing the urethane bond, corrosion resistance and adhesion between the organic resin film 72 and the coating 73 is enhanced.

A method of introducing the urethane bond in the skeleton of the polyester resin (A1) containing the sulfonic acid group is not particularly limited. For example, this is obtained by causing the hydroxyl group included in the polyester resin to react with a diisocyanate compound such as hexamethylene diisocyanate, isophorone diisocyanate, and tolylene diisocyanate.

It is preferable that the organic resin film 72 further contain an acrylic resin (A3) in addition to the polyester resin (A1) containing the sulfonic acid group. By further containing the acrylic resin (A3), dispersability of the carbon black in a water-based black paint that becomes the organic resin film 72 can further be enhanced. As a result, design properties (coloring properties and concealing properties) of the organic resin film 72 can further be enhanced.

The type of the acrylic resin (A3) is not particularly limited. For example, those obtained by radical polymerization of unsaturated monomers such as styrene, alkyl(meth)acrylates, (meth)acrylic acids, hydroxyalkyl(meth)acrylates, and alkoxysilane(meth)acrylates in an aqueous solution using a polymerization initiator can be used. In addition, the polymerization initiator is not particularly limited, and for example, persulfates such as potassium persulfate and ammonium persulfate and an azo compound such as azobiscyanovaleric acid and azobisisobutyronitrile can be used.

In a case where the acrylic resin (A3) is contained, the content thereof is preferably 0.5 to 10 mass % with respect to 100 mass % of the polyester resin (A1) containing the sulfonic acid group. When the content is less than 0.5 mass %, there may be cases where an effect caused by containing the acrylic resin (A3) is not sufficiently obtained. When the content exceeds 10 mass %, there may be cases where corrosion resistance or workability is degraded compared to a case where the acrylic resin (A3) is not contained.

It is preferable that the organic resin film 72 further contain a polyurethane resin (A2) containing a carboxyl group. By further containing the polyurethane resin (A2) containing a carboxyl group, corrosion resistance or adhesion between the organic resin film 72 and the coated layer 73 can be enhanced.

The type of the polyurethane resin (A2) containing the carboxyl group is not particularly limited as long as the carboxyl group is contained. For example, those obtained by causing polyols such as ethylene glycol, propylene glycol, diethylene glycol, 1,6-hexanediol, neopentyl glycol, triethylene glycol, bisphenol hydroxypropyl ether, glycerine, trimethylol ethane, and trimethylol propane to react with a diisocyanate compound such as hexamethylene diisocyanate, isophorone diisocyanate, and tolylene diisocyanate, and further chain-extending the resultant with diamine or the like, followed by dispersion in water can be used. The chain-extension with diamine not only increases the molecular weight of a resin, but also generates a urea group through the reaction of an isocyanate group and an amino group. As the urea group having high cohesive energy is contained in the resin, cohesive force of the painted film can be further increased, and corrosion resistance or scratch resistance of the organic resin film 72 can be further increased.

The content of the polyurethane resin (A2) is preferably 5 to 100 mass % with respect to 100 mass % of the polyester resin (A1) containing the sulfonic acid group. When the content is less than 5 mass %, there may be cases where an effect caused by containing the polyurethane resin (A2) is not sufficiently obtained. When the content exceeds 100 mass %, there may be cases where workability is degraded compared to a case where the polyurethane resin (A2) is not contained.

[Curing Agent (B1)]

The organic resin film 72 of this embodiment is obtained by curing the polyester resin having high ductility and high workability with the curing agent (B1). Therefore, degradation in film forming properties caused by including the colorant (C1) containing the carbon black is suppressed, resulting in being dense. As a result, the organic resin film 72 of this embodiment has excellent humidity resistance, corrosion resistance, scratch resistance, and chemical resistance.

The curing agent (B1) is not particularly limited as long as the polyester resin (A1) containing the sulfonic acid group is cured. Examples thereof include a melamine resin or a polyisocyanate compound. From the viewpoint of scratch resistance and chemical resistance of the organic resin film 72, the melamine resin is preferably contained.

As the melamine resin, a resin obtained by etherifying a part or all of the methylol groups of the product obtained by condensing melamine and formaldehyde with a lower alcohol such as methanol, ethanol, or butanol can be used.

In the case where the curing agent (B1) contains the melamine resin, the content of the melamine resin is preferably 30 to 100 mass % in the curing agent (B1). When the content is less than 30 mass %, there may be cases where the effect obtained by containing the melamine resin is not sufficiently obtained.

The polyisocyanate compound is not particularly limited. Examples thereof include hexamethylene diisocyanate, isophorone diisocyanate, xylylene diisocyanate, and tolylene diisocyanate. In addition, examples of the blocked substance thereof include a blocked substance of hexamethylene diisocyanate, a blocked substance of isophorone diisocyanate, a blocked substance of xylylene diisocyanate, and a blocked substance of tolylene diisocyanate, which is a blocked substance of a polyisocyanate compound. These curing agents may be used singly or in a combination of two or more types thereof.

The content of the curing agent (B1) is preferably 5 to 35 mass % with respect to 100 mass % of the whole organic resins (in a case where the organic resin film 72 includes a resin other than the polyester resin (A1), the whole resins includes the resin). When the content is less than 5 mass %, baking and curing are insufficiently achieved, and thus there may be cases where the effect of enhancing corrosion resistance is not obtained or cases where humidity resistance, scratch resistance, and chemical resistance are degraded. On the other hand, when the content exceeds 35 mass %, baking and curing are excessively achieved, and thus there may be cases where corrosion resistance and workability are degraded.

[Colorant (C1)]

The colorant (C1) includes a coloring pigment containing the carbon black. The carbon black has high concealing properties at low cost. In addition to the carbon black, a coloring inorganic pigment such as titanium dioxide, carbon black, graphite, and iron oxide, a coloring organic pigment such as phthalocyanine blue, phthalocyanine green, quinacridone, azo orange, azo yellow, and azo red, and a luminous material such as aluminum powder, titanium dioxide-coated mica powder, and titanium dioxide-coated glass powder may further included.

The carbon black is not particularly limited, and for example, well-known carbon blacks such as furnace black, Ketjenblack, acetylene black, and channel black can be used. In addition, well-known ozon-treated, plasma-treated, and liquid phase oxidation-treated carbon blacks may also be used.

In consideration of design properties (coloring properties and concealing properties) of the organic resin film 72 or corrosion resistance, the number average particle diameter of the carbon black in a state of being dispersed in the painted film is preferably 20 to 300 nm.

Assuming that the content of the carbon black in the organic resin film 72 is X mass % and the thickness of the organic resin film 72 is Y μm, the absolute amount of the carbon black may be represented by the product of the content (X mass %) of the carbon black included in the organic resin film 72 and the thickness (Y μm) of the painted film. In order to ensure design properties (coloring properties and concealing properties) of the organic resin film 72, the product of the X and the Y, which is the absolute amount of the carbon black included in the organic resin film 72 is preferably 18 or higher. When the product of the X and the Y is less than 18, there is a concern that design properties (coloring properties and concealing properties) may not be sufficiently enhanced. In addition, when the X exceeds 15, film forming properties of the organic resin film 72 are degraded, and thus there is a concern that the effect of enhancing the corrosion resistance of the surface-treated steel sheet may not be obtained. Therefore, it is preferable that $X \times Y \geq 18$ and $X \leq 15$.

It is preferable that the organic resin film 72 further contain silica (D1) in order to enhance corrosion resistance and scratch resistance. The silica (D1) is not particularly limited, and is preferably fine silica particles such as colloidal silica or fumed silica having primary particle diameters of 5 to 50 nm. From the viewpoint of corrosion resistance or workability, it is preferable that the fine silica particles be dispersed in the organic resin film 72 while having primary particle diameters (number average particle diameter) of 5 to 50 nm.

The content of the silica (D1) in the organic resin film 72 is preferably 5 to 30 mass %. When the content is less than 5 mass %, there may be cases where an effect caused by containing the silica (D1) is not sufficiently obtained. When the content exceeds 30 mass %, there may be cases where corrosion resistance, workability, and the like are degraded.

It is preferable that the organic resin film 72 further contain a lubricant (E1). By containing the lubricant (E1), scratch resistance is enhanced. The lubricant (E1) is not particularly limited, and well-known lubricants can be used. It is more preferable to use at least one type selected from a fluororesin-based lubricant and a polyolefin resin-based lubricant.

As the fluororesin-based lubricant, for example, polytetrafluoroethylene (PTFE), tetrafluoroethylene-hexafluoropropylene copolymer (FEP), tetrafluoroethylene-perfluoroalkyl vinyl ether copolymer (PFA), polychlorotrifluoroethylene (PCTFE), polyvinylidene fluoride (PVDF), polyvinyl fluoride (PVF), ethylene-tetrafluoroethylene copolymer (ETFE), ethylene-chlorotrifluoroethylene copolymer (ECTFE), and the like can be used. A single type of them may be used singly, or two or more types of them may be used in combinations.

The polyolefin resin-based resin is not particularly limited. For example, a hydrocarbon-based wax such as paraffin, microcrystalline, and polyethylene, derivatives thereof, and the like can be used. A polyethylene resin is more preferable. The derivatives are not particularly limited, and for example, carboxylated polyolefin, chlorinated polyolefin, and the like can be used. A single type of them may be used singly, or two or more types of them may be used in combination.

In a case where the polyethylene resin is used, from the viewpoint of corrosion resistance and scratch resistance, it is preferable that particles having a number average particle diameter of 0.5 to 2 μm are dispersed in the organic resin film 72.

The content of the lubricant (E1) in the organic resin film 72 is preferably 0.5 to 10 mass %. When the content is less than 0.5 mass %, there may be cases where an effect caused by containing the lubricant (E) is not sufficiently obtained. When the content exceeds 10 mass %, there may be cases where the effect of enhancing corrosion resistance is not obtained or cases where workability is degraded.

The surface-treated steel sheet according to this embodiment has excellent corrosion resistance and painting adhesion, sufficiently suppressed glossiness, a sufficiently low L* value, excellent adhesion and scratch resistance while the working is in process, and an aesthetically pleasant appearance.

Since the surface-treated steel sheet according to this embodiment has an appearance with sufficiently suppressed glossiness, there is no need to form a film containing a delustering agent on the surface of the organic resin film 72 or cause the organic resin film 72 to contain a delustering agent, and low glossiness can be realized with a thin film. In addition, since the adhesion between organic resin film 72 and the coated layer 73 is excellent, an underlayer does not need to be provided between the organic resin film 72 and the coated layer 73, thereby being manufactured.

In this embodiment, the surface-treated steel sheet having a single layer of the organic resin film 72 is exemplified. However, the organic resin film 72 may have one or more layers or two or more layers. In a case where two or more layers of the organic resin film are provided, the total thickness of the layers of the organic resin film is preferably 1 to 10 μm.

The organic resin film according to this embodiment is obtained by applying a black water-based paint that includes the polyester resin (A1) containing the sulfonic acid group, the curing agent (B1), and the carbon black as the colorant (C1) onto the steel sheet 71 formed with the coated layer 17, followed by baking and drying.

The method of manufacturing the water-based paint is not particularly limited, and examples thereof include a method of adding the polyester resin (A1) containing the sulfonic acid group, the curing agent (B1), and the carbon black as the colorant (C1), which are the components of the organic resin film 72, into water, and stirring the resultant with a disperser so as to be dissolved or dispersed.

The method of applying the water-based paint is not particularly limited, and for example, well-known roll coating, curtain coating, die coating, spraying, bar coating, dipping, electrostatic coating, and the like can be appropriately used.

The baking and drying method is not particularly limited, and drying may be performed by heating the steel sheet 71 formed with the coated layer 73 in advance or heating the steel sheet 71 formed with the coated layer 73 after applying the water-based paint, or combining these methods.

Regarding the baking and drying temperature, the end-point temperature is preferably 150° C. to 250° C., more preferably 160° C. to 230° C., and most preferably 180° C. to 220° C. When the end-point temperature is less than 150° C., baking and curing are insufficiently achieved, and thus there is a concern that the effect of enhancing corrosion resistance may not be sufficiently obtained. On the other hand, when the end-point temperature exceeds 250° C., baking and curing are excessively achieved, and thus there may be cases where the effect of enhancing corrosion resistance is not obtained or cases where workability is degraded. The baking and drying time is preferably 1 to 60 seconds and more preferably 3 to 20 seconds. When the baking and drying time is shorter than 1 second, there may be cases where baking and curing are insufficiently achieved. When the baking and drying time exceeds 60 seconds, productivity is degraded.

Sixth Embodiment

Hereinafter, a case where a coloring painted film layer that includes a coloring pigment layer is further formed on the surface of the coated layer of the surface-treated steel sheet obtained in the first or the second embodiment will be described with reference to the drawings.

Figure 8A:
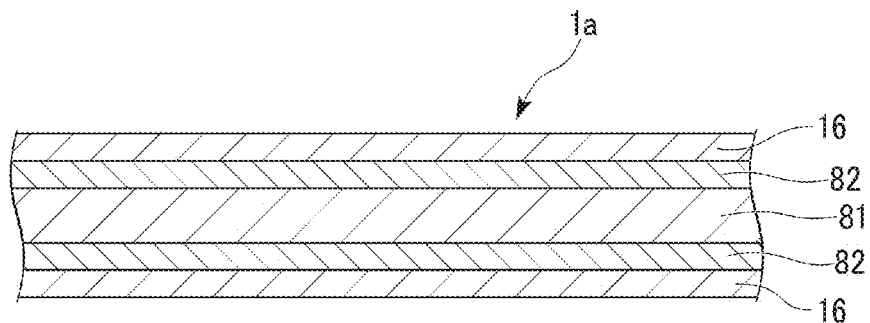
FIG. 8A is an enlarged cross-sectional view for explaining an example of the surface-treated steel sheet according to a sixth embodiment.

FIG. 8A is an enlarged cross-sectional view for explaining an example of the surface-treated steel sheet according to the sixth embodiment. A surface-treated steel sheet 81a illustrated in FIG. 8A is manufactured by the method of the first or second embodiment, coloring painted film layers made from the coloring pigment layers 16 formed on the coated layers 82 to be in contact therewith are formed on both surfaces of the surface-treated steel sheet 81 having the coated layers.

In the surface-treated steel sheet illustrated in FIG. 8A, the case where the coated layers 82 and the coloring painted film layers (the coloring pigment layers 16) are formed on both surfaces of the steel sheet 81 is exemplified. However, the coated layer 82 and the coloring painted film layer may also be formed on only one surface of the steel sheet. In addition, it is preferable that the same layers are formed on one surface and the other surface of the steel sheet 81 in terms of easy manufacture. However, different layers may also be formed.

The coloring pigment layer 16 includes a pigment and a resin and does not include a rust-preventive agent. In this embodiment, even though the coloring pigment layer 16 does not include the rust-preventive agent at all, the adhesion between the coated layer 82 and the coloring painted film layer is excellent, thereby ensuring sufficiently high corrosion resistance in the surface-treated steel sheet 81a.

When the rust-preventive agent such as a rust-preventive pigment is contained in the coloring pigment layer 16, the coloring pigment layer 16 becomes brittle, and workability of the surface-treated steel sheet 81a is degraded. In this embodiment, since the coloring pigment layer 16 does not include the rust-preventive agent, excellent workability can be ensured compared to a case where a rust-preventive agent such as a rust-preventive pigment is included therein.

As the pigment used in the coloring pigment layer 16, one type or two or more types of generally well-known pigments can be used, and the pigment is not particularly limited. For example, titanium oxide which is a white pigment, carbon black which is a black pigment, and the like can be used.

As the resin used in the coloring pigment layer 16, one type or two or more types of generally well-known resins, for example, a polyester resin, a urethane resin, an acrylic resin, an epoxy resin, a fluorine-based resin, a silicon-based resin, and the like can be used. As a curing agent for forming the coloring pigment layer 16, generally well-known curing agents for painting such as melamine and isocyanate can be used. In addition, when a resin obtained by cross-linking the polyester resin with melamine or a resin obtained by cross-linking the polyester resin with isocyanate is used as the resin used in the coloring pigment layer 16, more excellent workability is obtained, which is more appropriate.

Hitherto, in a case where the polyester resin is applied to the painted film that is directly painted onto the coated layer 82, in order to ensure adhesion with the coated layer 82, generally, a resin with high adhesion such as an epoxy resin among polyester resins is added for use.

On the other hand, the surface-treated steel sheet according to this embodiment can ensure sufficient painting adhesion even when only the resin obtained by cross-linking the polyester resin with the melamine curing agent or the resin obtained by cross-linking the polyester resin with the isocyanate curing agent is used as the resin used in the coloring pigment layer 16, and thus the coloring pigment layer 16 is not peeled off even when strict work such as binding or bending is performed.

In this embodiment, as described above, the coated layer 82 has excellent painting adhesion to the painted film formed thereon. Therefore, the effect of enhancing corrosion resistance, which is caused by forming the coloring pigment layer 16 on the coated layer 82, is effectively exhibited. Therefore, compared to the related art, the thickness of the coloring pigment layer 16 can be reduced. In addition, since the surface-treated steel sheet 81*a* of this embodiment has excellent adhesion between the coated layer 82 and the coloring pigment layer 16, high corrosion resistance and workability can be ensured even when a chemical conversion treatment layer or primer-painted film layer is not formed between the coated layer 82 and the coloring pigment layer 16. Therefore, like the surface-treated steel sheet 81*a* illustrated in FIG. 8A, the coloring pigment layer 16 (the coloring painted film layer) is formed on the coated layer 82 to be in contact therewith. In this case, compared to the case where a chemical conversion treatment layer and a primer-painted film layer are formed, simplification of the manufacturing process can be achieved, and the lowered manufacturing cost can be achieved.

A process of forming the coloring painted film layer made from the coloring pigment layer 16 which comes into contact with the coated layer 82 will be described. The coloring pigment layer 16 can be formed by applying a paint including a pigment and a resin onto the coated layer 82 of the surface-treated steel sheet obtained in the method of the first or second embodiment.

Modified Example of Sixth Embodiment

Figure 8B:
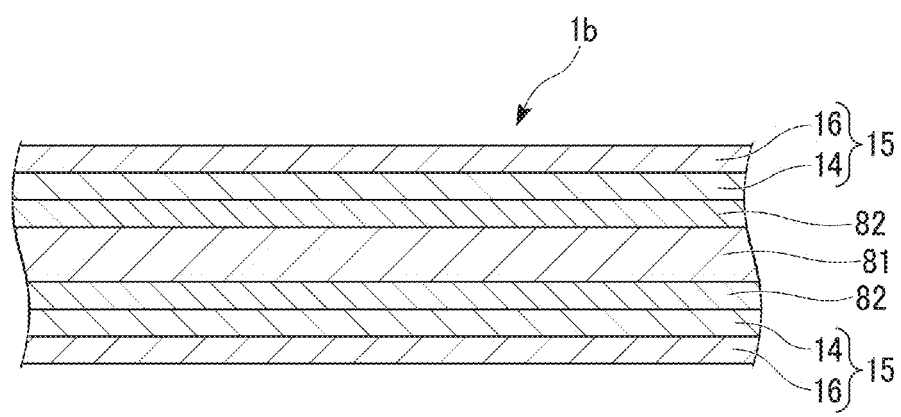
FIG. 8B is an enlarged cross-sectional view for explaining the surface-treated steel sheet according to a modified example of the sixth embodiment.

The surface-treated steel sheet according to this embodiment is not limited to the above-described example illustrated in FIG. 8A. FIG. 8B is an enlarged cross-sectional view for explaining another example of the surface-treated steel sheet according to the sixth embodiment. In a surface-treated steel sheet 81*b* illustrated in FIG. 8B, unlike the surface-treated steel sheet 81*a* illustrated in FIG. 8A, the coloring painted film layer 15 includes a primer-painted film layer 14 formed between the coated layer 82 and the coloring pigment layer 16. In the surface-treated steel sheet 81*b* illustrated in FIG. 8B, the primer-painted film layer 14 is formed between the coated layer 82 and the coloring pigment layer 16, and thus more excellent corrosion resistance is obtained.

The primer-painted film layer 14 illustrated in FIG. 8B includes a resin and a rust-preventive agent.

As the resin used in the primer-painted film layer 14, the same resin that can be used in the coloring painted film layer 16 may be employed. The resin used in the primer-painted film layer 14 and the resin used in the coloring painted film layer 16 may be the same or may be different from each other.

It is more preferable that the rust-preventive agent included in the primer-painted film layer 14 use a non-chromium agent that does not include hexavalent chromium from the viewpoint of compatibility with the environment. As the non-chromium rust-preventive agent, those including any one of or both Si and P are preferable. In this case, more excellent corrosion resistance is obtained. The rust-preventive agent may include a rust-preventive pigment, may not include a rust-preventive pigment, or may be only a rust-preventive pigment.

Examples of the rust-preventive agent including any one of or both Si and P include a silica-based rust-preventive pigment, a zinc phosphate-based rust-preventive pigment, an aluminum phosphate-based rust-preventive pigment, and a magnesium phosphate-based rust-preventive pigment. As commercially available rust-preventive agents, for example, "SHIELDEX" (registered trademark) series as calcium-adsorbed silica made by W. R. Grace & Co.-Conn., "K-WHITE" (registered trademark) series as aluminum dihydrogen tripolyphosphate made by Tayca Corporation.

In a case where the rust-preventive agent included in the primer-painted film layer 14 is the rust-preventive pigment, the content of the rust-preventive agent in the primer-painted film layer 14 is preferably 5 to 30 mass % in terms of solid content concentration. In a case where the content of the rust-preventive pigment in the primer-painted film layer 14 is in the above range, more excellent corrosion resistance is obtained while ensuring workability. In the case where the rust-preventive agent is the rust-preventive pigment, when the content of the rust-preventive agent in the primer-painted film layer 14 is less than 5 mass %, there is a concern that an effect caused by containing the rust-preventive agent may not be sufficiently exhibited. On the other hand, when the content of the rust-preventive agent exceeds 30 mass %, the primer-painted film layer 14 becomes brittle, and the painted film of worked parts is likely to be peeled off in a case where molding work is performed, and thus there is a concern that workability of the surface-treated steel sheet may be disrupted.

In order to manufacture the surface-treated steel sheet 81*b* illustrated in FIG. 8B, first, the primer-painted film layer 14 is formed on the coated layer 82 to be in contact therewith of the surface-treated steel sheet 81 having the coated layer. The primer-painted film layer 14 is formed by forming a painted film by applying a paint including the resin and the rust-preventive agent onto the coated layer 82, drying and baking the resultant, followed by water cooling.

Next, on each of both surfaces of the steel sheet 81 where the coated layer 82 and the primer-painted film layer 14 are formed, the coloring pigment layer 16 is formed in the same manner as the surface-treated steel sheet 81*a* illustrated in FIG. 8A. Accordingly, the coloring painted film layer 15 made from the coloring pigment layer 16 and the primer-painted film layer 14 is formed.

In the surface-treated steel sheet 81*b* of this embodiment, since the coated layer 82 has excellent painting adhesion to the painted film formed thereon, high corrosion resistance and workability can be ensured even when a chemical conversion treatment layer is not formed between the coated layer 82 and the primer-painted film layer 14 of the coloring painted film layer 15. Therefore, like the surface-treated steel sheet 81*b* illustrated in FIG. 8B, the primer-painted film layer 14 can be formed on the coated layer 82 to be in contact therewith. In the surface-treated steel sheet 81*b* illustrated in FIG. 8B, compared to the case where the chemical conversion treatment layer is formed, simplification of the manufacturing process can be achieved, and manufacture can be achieved at low cost.

Another Modified Example of Sixth Embodiment

In order to further enhance corrosion resistance, a chemical conversion treatment layer may be formed between the coloring painted film layer and the coated layer in the surface-treated steel sheet according to this embodiment as necessary.

Figure 8C:
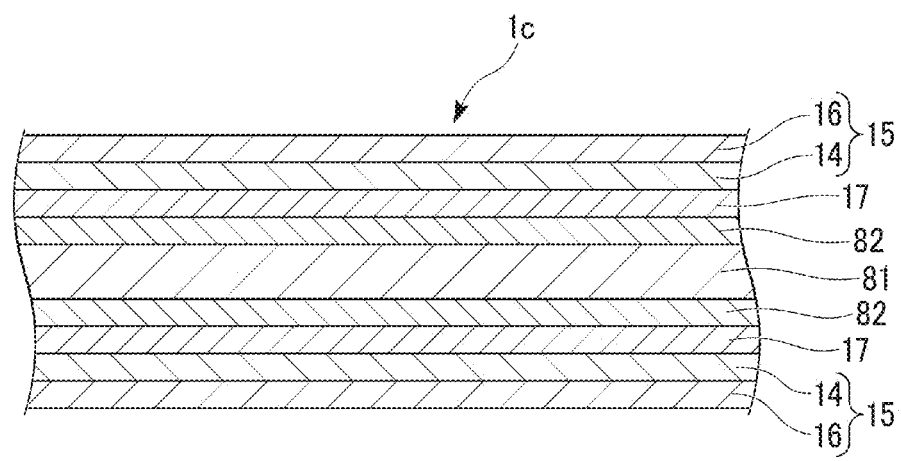
FIG. 8C is an enlarged cross-sectional view for explaining the surface-treated steel sheet according to another modified example of the sixth embodiment.

FIG. 8C is an enlarged cross-sectional view for explaining another modified example of the surface-treated steel sheet according to the sixth embodiment. In a surface-treated steel sheet 81c illustrated in FIG. 8C, unlike the surface-treated steel sheet 81b illustrated in FIG. 8B, a chemical conversion treatment layer 17 is formed between the coloring painted film layer 15 and the coated layer 82. Since the surface-treated steel sheet 81c illustrated in FIG. 8C includes the chemical conversion treatment layer 17 formed between the coloring painted film layer 15 and the coated layer 82, more excellent corrosion resistance is obtained.

It is preferable that the chemical conversion treatment layer 17 illustrated in FIG. 8C is obtained by performing a chemical conversion treatment using a treatment liquid including silica, a silane coupling agent, and a resin. In this case, the chemical conversion treatment layer 17 having more excellent adhesion between the coloring painted film layer 15 and the coated layer 82 is obtained.

As the resin included in the treatment liquid of the chemical conversion treatment, generally well-known resins such as a polyester resin, an acrylic resin, a urethane resin, and an epoxy resin can be used. Among such resins, a water-soluble type resin or a resin dispersed in water is more appropriate because handling of the treatment liquid used in the chemical conversion treatment is facilitated.

As the silica included in the treatment liquid of the chemical conversion treatment, generally well-known silica can be used. Particularly, silica having fine particle diameters can maintain stability in a case of being dispersed in the treatment liquid of the chemical conversion treatment and is thus more appropriate. As the silica contained in the treatment liquid, commercially available silica may be used. As the commercially available silica, for example, silica gel such as "SNOWTEX N", "SNOWTEX C", "SNOWTEX UP", and "SNOWTEX PS" (all of which are made by NISSAN CHEMICAL INDUSTRIES, Ltd.) and "Aderaito AT-20 Q" (made by ADEKA Corporation) or powder silica such as AEROSIL #300 (made by Nippon Aerosil Co., Ltd.), and the like can be used.

As the silane coupling agent included in the treatment liquid of the chemical conversion treatment, for example, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropylmethyldimethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, N-β-(N-vinylbenzylaminoethyl)-γ-aminopropyltrimethoxysilane, N-β-(N-vinylbenzylaminoethyl)-γ-aminopropylmethyldimethoxysilane, N-β-(N-vinylbenzylaminoethyl)-γ-aminopropyltriethoxysilane, N-β-(N-vinylbenzylaminoethyl)-γ-aminopropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, vinyl trimethoxysilane, vinylmethyldimethoxysilane, vinyl triethoxysilane, vinylmethyldiethoxysilane, octadecyldimethyl[3-(trimethoxysilyl)propyl]ammonium chloride, octadecyldimethyl[3-(methyldimethoxysilyl)propyl]ammonium chloride, octadecyldimethyl[3-(triethoxysilyl)propyl]ammonium chloride, octadecyldimethyl[3-(methyldiethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, and the like can be used. When γ-glycidoxypropyltrimethoxysilane having a glycidyl ether group and γ-glycidoxypropyltriethoxysilane are used, the working adhesion of the painted film is particularly improved. Moreover, when a silane coupling agent in a triethoxy-type is used, the preservation stability of an under-layer treatment liquid can be improved. It is considered that this is because triethoxysilane is relatively stable in an aqueous solution and has a low polymerization speed.

The chemical conversion treatment layer may include a rust-preventive agent including any one or two or more selected from tannin, tannic acid, a zirconium compound, and a titanium compound.

In order to manufacture the surface-treated steel sheet 81c illustrated in FIG. 8C, first, on the coated layer 82 of the surface-treated steel sheet obtained in the method of the first or second embodiment, the chemical conversion treatment of applying the treatment liquid including the silica, the silane coupling agent, and the resin is performed, and the resultant is dried and naturally cooled, thereby forming a chemical conversion treatment film.

In a case where the treatment liquid of the chemical conversion treatment includes a zirconium compound, as the zirconium compound, generally well-known compounds such as zirconyl ammonium carbonate, zircon hydrofluoric acid, ammonium hexaflorozirconate, potassium hexafluorozirconate, sodium hexafluorozirconate, zirconium (IV) acetylacetonate, a zirconium (IV) butoxide 1-butanol solution, zirconium (IV) n-propoxide, and the like can be used.

In addition, in a case where the treatment liquid of the chemical conversion treatment include a titanium compound, as the titanium compound, generally well-known compounds such as titanium hydrofluoric acid, titanium ammonium fluoride, titanium potassium oxalate, titanium isopropoxide, isopropyl titanate, titanium ethoxide, titanium 2-ethyl 1-hexanolate, titanium tetraisopropoxide, titanate tetra-n-butyl potassium hexafluorotitanate, sodium hexafluorotitanate, and the like can be used.

Next, on each surface of both surfaces of the steel sheet 81 where the coated layer 82 and the chemical conversion treatment layer 17 are formed, the coloring painted film layer 15 made from the primer-painted film layer 14 and the coloring pigment layer 16 is formed in the same manner as the surface-treated steel sheet 81b illustrated in FIG. 8B.

The surface-treated steel sheet 81c according to this embodiment has excellent painting adhesion to the coated layer 82, has the chemical conversion treatment layer 17 formed between the coloring painted film layer 15 and the coated layer 82, and thus has extremely high corrosion resistance and workability.

Example 1

Examples m1 to m73, Comparative Examples x1, x5 to x15

Surface-treated steel sheets were formed by the method described as follows by using the coating apparatus illustrated in FIG. 2.

In a coating bath in a fluidized states in which the coating bath having the coating bath composition, pH, and temperature shown in Tables 1 to 3 was discharged from the discharge port 2c, supplied from the supply port 2d, and circulated at an average flow rate shown in Tables 1 to 3, a steel sheet as the cathode shown in Tables 1 to 3 was dipped. Using the material shown in Tables 1 to 3 as the anode, the coated layers in Examples m1 to m73, and Comparative Examples x1, x5 to x15, each of which included zinc and vanadium on the surface of the steel sheet (in Comparative Example 1, only zinc was included) were formed by the electro coating method at a current density for a time (electro deposition time) shown in Tables 1 to 3.

In addition, as the steel sheet, SPCD having a sheet thickness of 0.8 mm for drawing a general cold-rolled steel sheet described in JIS G 3141 was used.

TABLE 1

COATING CONDITIONS

| | | ELECTRODES | | COATING BATH COMPOSITION mol/L (g/L) | | | | | | COATING BATH | | AVERAGE FLOW RATE | CURRENT DENSITY | TIME |
|---|---|---|---|---|---|---|---|---|---|---|---|---|---|---|
| | | | | $Zn^{2+}$ | V ($V^{4+}$, $VO^{2+}$) | $Na^+$ | $Ni^{2+}$ | NITRIC ACID ION | | TEMPERATURE | | | | |
| No. | | ANODE | CATHODE | mol/L | mol/L | mol/L | mol/L | mol/L | pH | °C | STATE | m/min | A/dm² | s |
| EXAMPLE | m1 | Pt | Fe | 0.52 | 0.04 | 0.00 | 0.00 | 0.00 | 3.0 | 60 | FLUIDIZED | 80 | 70 | 2 |
| EXAMPLE | m2 | Pt | Fe | 0.52 | 0.04 | 0.00 | 0.00 | 0.00 | 3.0 | 60 | FLUIDIZED | 80 | 70 | 3 |
| EXAMPLE | m3 | Pt | Fe | 0.52 | 0.04 | 0.00 | 0.00 | 0.00 | 3.0 | 60 | FLUIDIZED | 80 | 70 | 6 |
| EXAMPLE | m4 | Pt | Fe | 0.52 | 0.04 | 0.00 | 0.00 | 0.00 | 3.0 | 60 | FLUIDIZED | 80 | 70 | 9 |
| EXAMPLE | m5 | Pt | Fe | 0.52 | 0.10 | 0.00 | 0.00 | 0.00 | 2.6 | 60 | FLUIDIZED | 80 | 70 | 2 |
| EXAMPLE | m6 | Pt | Fe | 0.52 | 0.10 | 0.00 | 0.00 | 0.00 | 2.6 | 60 | FLUIDIZED | 80 | 70 | 3 |
| EXAMPLE | m7 | Pt | Fe | 0.52 | 0.10 | 0.00 | 0.00 | 0.00 | 2.6 | 60 | FLUIDIZED | 80 | 70 | 6 |
| EXAMPLE | m8 | Pt | Fe | 0.52 | 0.10 | 0.00 | 0.00 | 0.00 | 2.6 | 60 | FLUIDIZED | 80 | 70 | 9 |
| EXAMPLE | m9 | Pt | Fe | 0.52 | 0.20 | 0.00 | 0.00 | 0.00 | 2.3 | 60 | FLUIDIZED | 80 | 70 | 2 |
| EXAMPLE | m10 | Pt | Fe | 0.52 | 0.20 | 0.00 | 0.00 | 0.00 | 2.3 | 60 | FLUIDIZED | 80 | 70 | 3 |
| EXAMPLE | m11 | Pt | Fe | 0.52 | 0.20 | 0.00 | 0.00 | 0.00 | 2.3 | 60 | FLUIDIZED | 80 | 70 | 6 |
| EXAMPLE | m12 | Pt | Fe | 0.52 | 0.20 | 0.00 | 0.00 | 0.00 | 2.3 | 60 | FLUIDIZED | 80 | 70 | 9 |
| EXAMPLE | m13 | Pt | Fe | 0.52 | 0.40 | 0.00 | 0.00 | 0.00 | 2.3 | 60 | FLUIDIZED | 80 | 70 | 6 |
| EXAMPLE | m14 | Pt | Fe | 0.52 | 0.79 | 0.00 | 0.00 | 0.00 | 2.3 | 60 | FLUIDIZED | 80 | 70 | 6 |
| EXAMPLE | m15 | Pt | Fe | 0.52 | 0.04 | 0.00 | 0.00 | 0.00 | 3.0 | 60 | FLUIDIZED | 80 | 100 | 1 |
| EXAMPLE | m16 | Pt | Fe | 0.52 | 0.04 | 0.00 | 0.00 | 0.00 | 3.0 | 60 | FLUIDIZED | 80 | 100 | 2 |
| EXAMPLE | m17 | Pt | Fe | 0.52 | 0.04 | 0.00 | 0.00 | 0.00 | 3.0 | 60 | FLUIDIZED | 80 | 100 | 3 |
| EXAMPLE | m18 | Pt | Fe | 0.52 | 0.04 | 0.00 | 0.00 | 0.00 | 3.0 | 60 | FLUIDIZED | 80 | 100 | 4 |
| EXAMPLE | m19 | Pt | Fe | 0.52 | 0.04 | 0.00 | 0.00 | 0.00 | 3.0 | 60 | FLUIDIZED | 80 | 100 | 6 |
| EXAMPLE | m20 | Pt | Fe | 0.52 | 0.20 | 0.00 | 0.00 | 0.00 | 2.3 | 60 | FLUIDIZED | 80 | 100 | 2 |
| EXAMPLE | m21 | Pt | Fe | 0.52 | 0.20 | 0.00 | 0.00 | 0.00 | 2.3 | 60 | FLUIDIZED | 80 | 100 | 3 |
| EXAMPLE | m22 | Pt | Fe | 0.52 | 0.20 | 0.00 | 0.00 | 0.00 | 2.3 | 60 | FLUIDIZED | 80 | 100 | 4 |
| EXAMPLE | m23 | Pt | Fe | 0.52 | 0.20 | 0.00 | 0.00 | 0.00 | 2.3 | 60 | FLUIDIZED | 80 | 100 | 6 |
| EXAMPLE | m24 | Pt | Fe | 0.52 | 0.40 | 0.00 | 0.00 | 0.00 | 2.3 | 60 | FLUIDIZED | 80 | 100 | 6 |
| EXAMPLE | m25 | Pt | Fe | 0.52 | 0.79 | 0.00 | 0.00 | 0.00 | 2.3 | 60 | FLUIDIZED | 80 | 100 | 6 |
| EXAMPLE | m26 | Pt | Fe | 0.52 | 0.19 | 0.00 | 0.00 | 0.00 | 1.8 | 60 | FLUIDIZED | 80 | 70 | 6 |
| EXAMPLE | m27 | Pt | Fe | 0.52 | 0.38 | 0.00 | 0.00 | 0.00 | 1.8 | 60 | FLUIDIZED | 80 | 100 | 6 |
| EXAMPLE | m28 | Pt | Fe | 0.52 | 0.20 | 0.56 | 0.00 | 0.00 | 2.6 | 60 | FLUIDIZED | 80 | 35 | 6 |
| EXAMPLE | m29 | Pt | Fe | 0.52 | 0.20 | 0.56 | 0.00 | 0.00 | 2.6 | 60 | FLUIDIZED | 80 | 35 | 9 |
| EXAMPLE | m30 | Pt | Fe | 0.52 | 0.20 | 0.56 | 0.00 | 0.00 | 2.6 | 60 | FLUIDIZED | 80 | 35 | 12 |
| EXAMPLE | m31 | Pt | Fe | 0.52 | 0.20 | 0.56 | 0.00 | 0.00 | 3.1 | 60 | FLUIDIZED | 80 | 35 | 6 |
| EXAMPLE | m32 | Pt | Fe | 0.52 | 0.20 | 0.56 | 0.00 | 0.00 | 3.1 | 60 | FLUIDIZED | 80 | 35 | 9 |
| EXAMPLE | m33 | Pt | Fe | 0.52 | 0.20 | 0.56 | 0.00 | 0.00 | 3.1 | 60 | FLUIDIZED | 80 | 35 | 12 |
| EXAMPLE | m34 | Pt | Fe | 0.52 | 0.20 | 0.56 | 0.00 | 0.00 | 2.6 | 60 | FLUIDIZED | 80 | 50 | 6 |
| EXAMPLE | m35 | Pt | Fe | 0.52 | 0.20 | 0.56 | 0.00 | 0.00 | 2.6 | 60 | FLUIDIZED | 80 | 50 | 9 |

TABLE 2

COATING CONDITIONS

| | | ELECTRODES | | COATING BATH COMPOSITION mol/L (g/L) | | | | | | COATING BATH | | AVERAGE FLOW RATE | CURRENT DENSITY | TIME |
|---|---|---|---|---|---|---|---|---|---|---|---|---|---|---|
| | | | | $Zn^{2+}$ | V ($V^{4+}$, $VO^{2+}$) | $Na^+$ | $Ni^{2+}$ | NITRIC ACID ION | | TEMPERATURE | | | | |
| No. | | ANODE | CATHODE | mol/L | mol/L | mol/L | mol/L | mol/L | pH | °C | STATE | m/min | A/dm² | s |
| EXAMPLE | m36 | Pt | Fe | 0.52 | 0.20 | 0.56 | 0.00 | 0.00 | 3.1 | 60 | FLUIDIZED | 80 | 50 | 6 |
| EXAMPLE | m37 | Pt | Fe | 0.52 | 0.20 | 0.56 | 0.00 | 0.00 | 3.1 | 60 | FLUIDIZED | 80 | 50 | 9 |
| EXAMPLE | m38 | Pt | Fe | 0.52 | 0.20 | 0.56 | 0.00 | 0.00 | 2.6 | 60 | FLUIDIZED | 80 | 70 | 6 |
| EXAMPLE | m39 | Pt | Fe | 0.52 | 0.20 | 0.56 | 0.00 | 0.00 | 3.1 | 60 | FLUIDIZED | 80 | 70 | 6 |
| EXAMPLE | m40 | Pt | Fe | 0.52 | 0.20 | 0.56 | 0.01 | 0.00 | 2.8 | 60 | FLUIDIZED | 80 | 35 | 6 |
| EXAMPLE | m41 | Pt | Fe | 0.52 | 0.20 | 0.56 | 0.01 | 0.00 | 2.8 | 60 | FLUIDIZED | 80 | 35 | 9 |

TABLE 2-continued

| | | | | COATING CONDITIONS | | | | | | | | | |
|---|---|---|---|---|---|---|---|---|---|---|---|---|---|
| | | | | COATING BATH COMPOSITION mol/L (g/L) | | | | | | | AVERAGE | CURRENT | |
| | | ELECTRODES | | $Zn^{2+}$ | $V (V^{4+}, VO^{2+})$ | $Na^+$ | $Ni^{2+}$ | NITRIC ACID ION | COATING BATH | | FLOW RATE | DENSITY | TIME |
| | | | | | | | | | | TEMPERATURE | | | |
| No. | | ANODE | CATHODE | mol/L | mol/L | mol/L | mol/L | mol/L | pH | °C. | STATE | m/min | A/dm² | s |
| EXAMPLE | m42 | Pt | Fe | 0.52 | 0.20 | 0.56 | 0.01 | 0.00 | 2.8 | 60 | FLUIDIZED | 80 | 35 | 12 |
| EXAMPLE | m43 | Pt | Fe | 0.52 | 0.20 | 0.56 | 0.02 | 0.00 | 2.8 | 60 | FLUIDIZED | 80 | 35 | 6 |
| EXAMPLE | m44 | Pt | Fe | 0.52 | 0.20 | 0.56 | 0.02 | 0.00 | 2.8 | 60 | FLUIDIZED | 80 | 35 | 9 |
| EXAMPLE | m45 | Pt | Fe | 0.52 | 0.20 | 0.56 | 0.02 | 0.00 | 2.8 | 60 | FLUIDIZED | 80 | 35 | 12 |
| EXAMPLE | m46 | Pt | Fe | 0.52 | 0.20 | 0.56 | 0.01 | 0.00 | 2.8 | 60 | FLUIDIZED | 80 | 50 | 6 |
| EXAMPLE | m47 | Pt | Fe | 0.52 | 0.20 | 0.56 | 0.01 | 0.00 | 2.8 | 60 | FLUIDIZED | 80 | 50 | 9 |
| EXAMPLE | m48 | Pt | Fe | 0.52 | 0.20 | 0.56 | 0.02 | 0.00 | 2.8 | 60 | FLUIDIZED | 80 | 50 | 6 |
| EXAMPLE | m49 | Pt | Fe | 0.52 | 0.20 | 0.56 | 0.02 | 0.00 | 2.8 | 60 | FLUIDIZED | 80 | 50 | 9 |
| EXAMPLE | m50 | Pt | Fe | 0.52 | 0.20 | 0.56 | 0.01 | 0.00 | 2.8 | 60 | FLUIDIZED | 80 | 70 | 6 |
| EXAMPLE | m51 | Pt | Fe | 0.52 | 0.20 | 0.56 | 0.02 | 0.00 | 2.8 | 60 | FLUIDIZED | 80 | 70 | 6 |
| EXAMPLE | m52 | Pt | Fe | 0.52 | 0.20 | 0.56 | 0.08 | 0.00 | 3.2 | 60 | FLUIDIZED | 80 | 35 | 13 |
| EXAMPLE | m53 | Pt | Fe | 0.52 | 0.20 | 0.56 | 0.08 | 0.00 | 3.2 | 60 | FLUIDIZED | 80 | 50 | 9 |
| EXAMPLE | m54 | Pt | Fe | 0.52 | 0.20 | 0.56 | 0.15 | 0.00 | 3.1 | 60 | FLUIDIZED | 80 | 21 | 21 |
| EXAMPLE | m55 | Pt | Fe | 0.52 | 0.20 | 0.56 | 0.15 | 0.00 | 3.1 | 60 | FLUIDIZED | 80 | 35 | 13 |
| EXAMPLE | m56 | Pt | Fe | 0.52 | 0.20 | 0.56 | 0.15 | 0.00 | 3.1 | 60 | FLUIDIZED | 80 | 50 | 9 |
| EXAMPLE | m57 | Pt | Fe | 1.04 | 0.20 | 0.56 | 0.15 | 0.00 | 3.1 | 60 | FLUIDIZED | 80 | 21 | 21 |
| EXAMPLE | m58 | Pt | Fe | 1.04 | 0.20 | 0.56 | 0.15 | 0.00 | 3.1 | 60 | FLUIDIZED | 80 | 35 | 13 |
| EXAMPLE | m59 | Pt | Fe | 1.04 | 0.20 | 0.56 | 0.15 | 0.00 | 3.1 | 60 | FLUIDIZED | 80 | 50 | 9 |
| EXAMPLE | m60 | Pt | Fe | 1.04 | 0.20 | 0.56 | 0.15 | 0.00 | 3.1 | 60 | FLUIDIZED | 80 | 70 | 6 |
| EXAMPLE | m61 | Pt | Fe | 1.04 | 0.20 | 0.56 | 0.15 | 0.00 | 3.1 | 40 | FLUIDIZED | 80 | 21 | 21 |
| EXAMPLE | m62 | Pt | Fe | 1.04 | 0.20 | 0.56 | 0.15 | 0.00 | 3.1 | 40 | FLUIDIZED | 80 | 70 | 6 |
| EXAMPLE | m63 | Pt | Fe | 1.04 | 0.20 | 0.56 | 0.15 | 0.00 | 3.1 | 40 | FLUIDIZED | 20 | 21 | 21 |
| EXAMPLE | m64 | Pt | Fe | 1.04 | 0.20 | 0.56 | 0.15 | 0.00 | 3.1 | 40 | FLUIDIZED | 20 | 70 | 6 |
| EXAMPLE | m65 | Pt | Fe | 1.04 | 0.20 | 0.56 | 0.15 | 0.00 | 3.1 | 40 | FLUIDIZED | 300 | 21 | 21 |
| EXAMPLE | m66 | Pt | Fe | 1.04 | 0.20 | 0.56 | 0.15 | 0.00 | 3.1 | 40 | FLUIDIZED | 300 | 70 | 6 |
| EXAMPLE | m67 | Pt | Fe | 0.52 | 0.20 | 0.00 | 0.00 | 0.00 | 2.3 | 60 | FLUIDIZED | 80 | 150 | 4 |
| EXAMPLE | m68 | Pt | Fe | 0.52 | 0.20 | 0.00 | 0.00 | 0.00 | 2.3 | 60 | FLUIDIZED | 15 | 70 | 6 |
| EXAMPLE | m69 | Pt | Fe | 0.52 | 0.20 | 0.00 | 0.00 | 0.0004 | 2.3 | 60 | FLUIDIZED | 80 | 70 | 6 |
| EXAMPLE | m70 | Pt | Fe | 0.52 | 0.20 | 0.00 | 0.00 | 0.0004 | 2.3 | 60 | FLUIDIZED | 80 | 70 | 6 |
| EXAMPLE | m71 | Pt | Fe | 0.52 | 0.95 | 2.00 | 0.5 | 0.00 | 3.1 | 60 | FLUIDIZED | 80 | 70 | 6 |
| EXAMPLE | m72 | Pt | Fe | 0.52 | 0.95 | 4.00 | 1 | 0.00 | 3.1 | 60 | FLUIDIZED | 80 | 70 | 6 |
| EXAMPLE | m73 | Pt | Fe | 0.52 | 0.95 | 4.00 | 1 | 0.00 | 3.1 | 60 | FLUIDIZED | 80 | 70 | 21 |

TABLE 3

| | | | | COATING CONDITIONS | | | | | | | | | |
|---|---|---|---|---|---|---|---|---|---|---|---|---|---|
| | | | | COATING BATH COMPOSITION mol/L (g/L) | | | | | | | AVERAGE | CURRENT | |
| | | ELECTRODES | | $Zn^{2+}$ | $V (V^{4+}, VO^{2+})$ | $Na^+$ | $Ni^{2+}$ | NITRIC ACID ION | COATING BATH | | FLOW RATE | DENSITY | TIME |
| | | | | | | | | | | TEMPERATURE | | | |
| No. | | ANODE | CATHODE | mol/L | mol/L | mol/L | mol/L | mol/L | pH | °C. | STATE | m/min | A/dm² | s |
| COMPARATIVE EXAMPLE | x1 | Pt | Fe | 0.52 | 0.00 | 0.00 | 0.00 | 0.00 | 2.5 | 60 | FLUIDIZED | 80 | 70 | 6 |
| COMPARATIVE EXAMPLE | x2 | Pt | Cu | 0.52 | 0.20 | 0.00 | 0.00 | 0.00 | 2.5 | 60 | FLUIDIZED | 80 | 70 | 7 |
| COMPARATIVE EXAMPLE | x3 | Pt | Fe | 0.52 | 0.20 | 0.00 | 0.00 | 0.00 | 2.5 | 60 | STATIONARY | — | 50 | 24 |
| COMPARATIVE EXAMPLE | x4 | Pt | Fe | 0.52 | 0.20 | 0.00 | 0.00 | 0.00 | 2.5 | 60 | STIRRED | — | 50 | 24 |
| COMPARATIVE EXAMPLE | x5 | Pt | Fe | 0.52 | 0.04 | 0.00 | 0.00 | 0.00 | 3.0 | 60 | FLUIDIZED | 80 | 70 | 0.5 |
| COMPARATIVE EXAMPLE | x6 | Pt | Fe | 0.52 | 0.10 | 0.00 | 0.00 | 0.00 | 2.6 | 60 | FLUIDIZED | 80 | 70 | 0.5 |
| COMPARATIVE EXAMPLE | x7 | Pt | Fe | 0.52 | 0.20 | 0.00 | 0.00 | 0.00 | 2.3 | 60 | FLUIDIZED | 80 | 70 | 0.5 |
| COMPARATIVE EXAMPLE | x8 | Pt | Fe | 0.52 | 0.20 | 0.00 | 0.00 | 0.00 | 2.3 | 60 | FLUIDIZED | 80 | 100 | 0.5 |
| COMPARATIVE EXAMPLE | x9 | Pt | Fe | 0.52 | 0.005 | 0.00 | 0.00 | 0.00 | 2.5 | 60 | FLUIDIZED | 80 | 35 | 12 |

TABLE 3-continued

| | | | | COATING CONDITIONS | | | | | | | | |
|---|---|---|---|---|---|---|---|---|---|---|---|---|
| | | | | COATING BATH COMPOSITION mol/L (g/L) | | | | | | | AVERAGE FLOW RATE | CURRENT DENSITY | |
| | | ELECTRODES | | $Zn^{2+}$ | V ($V^{4+}$, $VO^{2+}$) | $Na^+$ | $Ni^{2+}$ | NITRIC ACID ION | | COATING BATH | | | TIME |
| No. | | ANODE | CATHODE | mol/L | mol/L | mol/L | mol/L | mol/L | pH | TEMPERATURE °C. | STATE | m/min | A/dm² | s |
| COMPARATIVE EXAMPLE | x10 | Pt | Fe | 0.26 | 0.005 | 0.00 | 0.00 | 0.00 | 2.5 | 60 | FLUIDIZED | 80 | 35 | 18 |
| COMPARATIVE EXAMPLE | x11 | Pt | Fe | 0.52 | 0.008 | 0.00 | 0.00 | 0.00 | 2.3 | 60 | FLUIDIZED | 80 | 35 | 18 |
| COMPARATIVE EXAMPLE | x12 | Pt | Fe | 0.26 | 0.008 | 0.00 | 0.00 | 0.00 | 2.3 | 60 | FLUIDIZED | 80 | 35 | 18 |
| COMPARATIVE EXAMPLE | x13 | Pt | Fe | 0.52 | 0.20 | 0.56 | 0.02 | 0.00 | 2.8 | 60 | FLUIDIZED | 80 | 18 | 35 |
| COMPARATIVE EXAMPLE | x14 | Pt | Fe | 0.52 | 0.20 | 0.56 | 0.15 | 0.00 | 3.1 | 60 | FLUIDIZED | 80 | 18 | 35 |
| COMPARATIVE EXAMPLE | x15 | Pt | Fe | 0.52 | 0.20 | 0.00 | 0.00 | 0.01 | 2.3 | 60 | FLUIDIZED | 80 | 70 | 6 |

Comparative Example x2

An electro coated copper sheet was formed by the method described as follows using the coating apparatus illustrated in FIG. 2.

In a coating bath in a fluidized state in which the coating bath having the coating bath composition, pH, and temperature shown in Table 3 was discharged from the discharge port 2c, supplied from the supply port 2d, and circulated at an average flow rate shown in Table 3, a copper sheet as the cathode shown in Table 3 was dipped. Using the material shown in Table 3 as the anode, the coated layer in Comparative Example x2, which included zinc and vanadium on the surface of the copper sheet was formed by the electro coating method at a current density for a time shown in Table 3.

Comparative Example x3

A surface-treated steel sheet was formed by the method described as follows using the coating apparatus illustrated in FIG. 2.

In a coating bath in a stationary state in which the coating bath having the coating bath composition, pH, and temperature shown in Table 3 was not circulated, a steel sheet as the cathode shown in Table 3 was dipped. Using the material shown in Table 3 as the anode, the coated layer in Comparative Example x3, which included zinc and vanadium on the surface of the steel sheet was formed by the electro coating method at a current density for a time shown in Table 3.

Comparative Example 4

A coated layer in Comparative Example x4 was formed in the same manner as Comparative Example x3 except that a coating bath in a coating tank was not circulated but was in a state of being stirred by a stirrer disposed at the bottom portion of the coating tank (stirred state).

In the coating bath compositions shown in Tables 1 to 3, $ZnSO_4 \cdot 7H_2O$ was used as the Zn compound, $VOSO_4 \cdot 5H_2O$ was used as the V compound ($VO(C_5H_7O_2)_2$ was used as the V compound only in Examples m26 and m27), $H_2SO_4$ was further used as the pH adjusting agent as necessary, and $Na_2SO_4$ was used to stabilize conductivity of the coating bath. Moreover, $NiSO_4 \cdot 6H_2O$ was used as another metal compound, the contents thereof were adjusted to achieve the concentrations of $Zn^{2+}$, V($V^{4+}$, $VO^{2+}$), $Na^+$, and $Ni^{2+}$ shown in Tables 1 to 3.

The coating weights, the vanadium contents, and the surface roughnesses Ra of the coated layers of Examples m1 to m73 and Comparative Examples x1 to x15 obtained as described above were obtained by the method described as follows.

The coating weight of the coated layer was the total mass per unit area of V elements and Zn elements detected by fluorescent X-rays. The vanadium content was calculated in a percentage by dividing the amount of V elements detected by the fluorescent X-rays by the coating weight. The surface roughness Ra of the coated layer (center-line average roughness) was measured based on JIS B 0601:2001.

The results are shown in Tables 4 to 6.

TABLE 4

| | | COMPONENT | | SURFACE | V CONTENT | VARIOUS PERFORMANCES | | | | |
|---|---|---|---|---|---|---|---|---|---|---|
| | | COATING WEIGHT | V CONTENT | ROUGHNESS Ra | IN CRYSTAL | RUST % AFTER 24 H FROM SST FOR CORROSION | POWDERING | COATING | | |
| No. | | g/m² | wt % | μm | (x/y) | RESISTANCE | PROPERTIES | ADHESION | EMISSIVITY |
| EXAMPLE | m1 | 4.9 | 2.5 | 1.2 | 1.1 | 4 | A | A | 0.38 |
| EXAMPLE | m2 | 7.2 | 2.3 | 1.3 | 1.1 | 4 | A | A | 0.47 |
| EXAMPLE | m3 | 15 | 1.8 | 2.1 | 1.1 | 5 | A | A | 0.46 |

TABLE 4-continued

| No. | | COMPONENT COATING WEIGHT g/m² | V CONTENT wt % | SURFACE ROUGHNESS Ra μm | V CONTENT IN CRYSTAL (x/y) | VARIOUS PERFORMANCES RUST % AFTER 24 H FROM SST FOR CORROSION RESISTANCE | POWDERING PROPERTIES | COATING ADHESION | EMISSIVITY |
|---|---|---|---|---|---|---|---|---|---|
| EXAMPLE | m4 | 24.6 | 1.4 | 2.4 | 1.1 | 4 | A | A | 0.53 |
| EXAMPLE | m5 | 4 | 7.7 | 1.4 | 1.4 | 5 | A | S | 0.77 |
| EXAMPLE | m6 | 6 | 7.5 | 1.5 | 1.3 | 5 | A | S | 0.79 |
| EXAMPLE | m7 | 12 | 6.3 | 2.3 | 1.2 | 5 | A | S | 0.81 |
| EXAMPLE | m8 | 17 | 4.9 | 2.1 | 1.2 | 6 | A | S | 0.85 |
| EXAMPLE | m9 | 5 | 9 | 1.8 | 1.2 | 6 | A | S | 0.79 |
| EXAMPLE | m10 | 4.6 | 8.6 | 1.6 | 1.3 | 6 | A | S | 0.77 |
| EXAMPLE | m11 | 9.6 | 5.8 | 1.8 | 1.2 | 5 | A | S | 0.81 |
| EXAMPLE | m12 | 14.1 | 5.6 | 2.3 | 1.2 | 5 | A | S | 0.80 |
| EXAMPLE | m13 | 7.5 | 6.2 | 1.6 | 1.2 | 4 | A | S | 0.59 |
| EXAMPLE | m14 | 5.2 | 7.9 | 1.5 | 1.3 | 4 | A | S | 0.80 |
| EXAMPLE | m15 | 3.3 | 3.7 | 1.2 | 1.2 | 4 | A | S | 0.51 |
| EXAMPLE | m16 | 6.9 | 3.1 | 1.3 | 1.2 | 5 | A | A | 0.61 |
| EXAMPLE | m17 | 6.4 | 3.4 | 1.3 | 1.2 | 5 | A | A | 0.60 |
| EXAMPLE | m18 | 12.3 | 2.2 | 1.6 | 1.1 | 4 | A | A | 0.72 |
| EXAMPLE | m19 | 12.7 | 2.4 | 1.6 | 1.2 | 4 | A | A | 0.73 |
| EXAMPLE | m20 | 4.6 | 12.3 | 2.5 | 1.2 | 6 | A | S | 0.62 |
| EXAMPLE | m21 | 6 | 9.9 | 2.1 | 1.4 | 6 | A | S | 0.65 |
| EXAMPLE | m22 | 7.4 | 8.3 | 2.0 | 1.3 | 6 | A | S | 0.69 |
| EXAMPLE | m23 | 10.2 | 6.9 | 2.3 | 1.2 | 5 | A | S | 0.75 |
| EXAMPLE | m24 | 7.6 | 7.8 | 2.3 | 1.3 | 6 | A | S | 0.68 |
| EXAMPLE | m25 | 5.4 | 10.9 | 2.0 | 1.3 | 5 | A | S | 0.67 |
| EXAMPLE | m26 | 8.4 | 3.7 | 1.4 | 1.2 | 5 | A | A | 0.52 |
| EXAMPLE | m27 | 9.5 | 4.5 | 1.8 | 1.2 | 5 | A | S | 0.67 |
| EXAMPLE | m28 | 5 | 1.1 | 1.1 | 1.1 | 4 | S | A | 0.42 |
| EXAMPLE | m29 | 7.5 | 1.8 | 1.2 | 1.6 | 4 | S | A | 0.42 |
| EXAMPLE | m30 | 10 | 2.3 | 1.6 | 1.4 | 4 | S | A | 0.42 |
| EXAMPLE | m31 | 5.2 | 3 | 1.3 | 1.2 | 4 | S | A | 0.52 |
| EXAMPLE | m32 | 7.6 | 3.7 | 1.4 | 1.4 | 5 | S | S | 0.51 |
| EXAMPLE | m33 | 10 | 4.5 | 1.9 | 1.5 | 5 | S | S | 0.69 |
| EXAMPLE | m34 | 8.4 | 9.6 | 2.2 | 1.5 | 5 | S | S | 0.82 |
| EXAMPLE | m35 | 10.5 | 6.8 | 1.8 | 1.6 | 5 | A | S | 0.75 |

TABLE 5

| No. | | COMPONENT COATING WEIGHT g/m² | V CONTENT wt % | SURFACE ROUGHNESS Ra μm | V CONTENT IN CRYSTAL (x/y) | VARIOUS PERFORMANCES RUST % AFTER 24 H FROM SST FOR CORROSION RESISTANCE | POWDERING PROPERTIES | COATING ADHESION | EMISSIVITY |
|---|---|---|---|---|---|---|---|---|---|
| EXAMPLE | m36 | 7.3 | 8.1 | 1.9 | 1.5 | 5 | S | S | 0.72 |
| EXAMPLE | m37 | 10.8 | 7.7 | 2.2 | 1.7 | 5 | A | S | 0.78 |
| EXAMPLE | m38 | 8.4 | 9.6 | 2.2 | 1.5 | 5 | A | S | 0.75 |
| EXAMPLE | m39 | 9.5 | 11.8 | 2.8 | 1.5 | 6 | A | S | 0.84 |
| EXAMPLE | m40 | 5 | 4.7 | 1.3 | 1.3 | 4 | S | S | 0.58 |
| EXAMPLE | m41 | 7.2 | 6.4 | 1.0 | 1.4 | 5 | S | S | 0.64 |
| EXAMPLE | m42 | 9.5 | 7.3 | 1.5 | 1.3 | 5 | S | S | 0.69 |
| EXAMPLE | m43 | 4.9 | 5.1 | 1.3 | 1.2 | 4 | S | S | 0.53 |
| EXAMPLE | m44 | 7.2 | 6.2 | 1.4 | 1.4 | 5 | S | S | 0.65 |
| EXAMPLE | m45 | 9.2 | 6.5 | 1.5 | 1.5 | 5 | S | S | 0.66 |
| EXAMPLE | m46 | 6.6 | 12.1 | 2.3 | 1.6 | 5 | S | S | 0.75 |
| EXAMPLE | m47 | 9.7 | 11.5 | 2.8 | 1.6 | 5 | S | S | 0.82 |
| EXAMPLE | m48 | 6.4 | 12.5 | 2.3 | 1.6 | 5 | A | S | 0.78 |
| EXAMPLE | m49 | 9.4 | 11.4 | 2.5 | 1.5 | 5 | A | S | 0.81 |
| EXAMPLE | m50 | 9.1 | 13 | 2.7 | 1.4 | 6 | A | S | 0.71 |
| EXAMPLE | m51 | 9.1 | 12.4 | 2.6 | 1.6 | 6 | A | S | 0.83 |
| EXAMPLE | m52 | 10 | 8.1 | 2.2 | 1.4 | 5 | S | S | 0.78 |
| EXAMPLE | m53 | 9.3 | 12.7 | 2.6 | 1.7 | 6 | A | S | 0.72 |
| EXAMPLE | m54 | 10.9 | 1 | 1.5 | 1.1 | 4 | S | A | 0.48 |
| EXAMPLE | m55 | 11.6 | 9.8 | 2.7 | 1.4 | 6 | A | S | 0.82 |
| EXAMPLE | m56 | 11.2 | 12.9 | 2.9 | 1.4 | 6 | A | S | 0.86 |
| EXAMPLE | m57 | 10.9 | 1.8 | 1.6 | 1.3 | 4 | S | A | 0.51 |
| EXAMPLE | m58 | 11.8 | 4.7 | 1.8 | 1.3 | 5 | S | S | 0.68 |
| EXAMPLE | m59 | 11.5 | 6.4 | 2.0 | 1.4 | 5 | A | S | 0.73 |
| EXAMPLE | m60 | 11 | 7.6 | 2.2 | 1.4 | 5 | A | S | 0.79 |

TABLE 5-continued

| | | COMPONENT | | SURFACE | V CONTENT | VARIOUS PERFORMANCES | | | |
| | | | | | | RUST % AFTER 24 H | | | |
| No. | | COATING WEIGHT g/m² | V CONTENT wt % | ROUGHNESS Ra μm | IN CRYSTAL (x/y) | FROM SST FOR CORROSION RESISTANCE | POWDERING PROPERTIES | COATING ADHESION | EMISSIVITY |
|---|---|---|---|---|---|---|---|---|---|
| EXAMPLE | m61 | 11.3 | 3.1 | 1.7 | 1.2 | 5 | S | A | 0.55 |
| EXAMPLE | m62 | 11.5 | 7.9 | 2.1 | 1.5 | 5 | A | S | 0.78 |
| EXAMPLE | m63 | 9.8 | 4.5 | 1.8 | 1.4 | 5 | S | S | 0.67 |
| EXAMPLE | m64 | 10.1 | 11.3 | 2.6 | 1.6 | 6 | A | S | 0.85 |
| EXAMPLE | m65 | 11.8 | 1.6 | 1.6 | 1.2 | 4 | S | S | 0.53 |
| EXAMPLE | m66 | 11.9 | 5.6 | 2.1 | 1.3 | 5 | A | S | 0.62 |
| EXAMPLE | m67 | 15.2 | 4.6 | 2.5 | 1.2 | 4 | A | A | 0.75 |
| EXAMPLE | m68 | 11.2 | 4.8 | 2.2 | 1.3 | 5 | A | A | 0.61 |
| EXAMPLE | m69 | 11 | 7.5 | 1.5 | 1.2 | 4 | A | A | 0.61 |
| EXAMPLE | m70 | 11 | 7.5 | 1.5 | 1.2 | 4 | A | A | 0.61 |
| EXAMPLE | m71 | 11.9 | 15.3 | 3.1 | 2.5 | 6 | A | S | 0.89 |
| EXAMPLE | m72 | 11.2 | 18.2 | 3.4 | 2.7 | 6 | A | S | 0.91 |
| EXAMPLE | m73 | 38.2 | 16.5 | 3.8 | 2.8 | 6 | A | S | 0.93 |

TABLE 6

| | | COMPONENT | | SURFACE ROUGHNESS Ra μm | V CONTENT IN CRYSTAL (x/y) | VARIOUS PERFORMANCES | | | |
| | | | | | | RUST % AFTER 24 H | | | |
| No. | | COATING WEIGHT g/m² | V CONTENT wt % | | | FROM SST FOR CORROSION RESISTANCE | POWDERING PROPERTIES | COATING ADHESION | EMISSIVITY |
|---|---|---|---|---|---|---|---|---|---|
| COMPARATIVE EXAMPLE | x1 | 20 | 0 | 0.7 | — | 1 | S | C | LESS THAN 0.1 |
| COMPARATIVE EXAMPLE | x2 | 10 | 10 | 1.5 | — | 1 | C | B | 0.61 |
| COMPARATIVE EXAMPLE | x3 | 14 | 7 | 1.4 | — | 1 | B | B | 0.65 |
| COMPARATIVE EXAMPLE | x4 | 13 | 5 | 1.2 | — | 1 | B | B | 0.61 |
| COMPARATIVE EXAMPLE | x5 | 2.4 | 3.1 | 1.2 | 1.1 | 3 | A | A | 0.25 |
| COMPARATIVE EXAMPLE | x6 | 2 | 8.5 | 1.5 | 1.3 | 2 | A | A | 0.31 |
| COMPARATIVE EXAMPLE | x7 | 1.6 | 9.1 | 1.3 | 1.3 | 2 | A | A | 0.31 |
| COMPARATIVE EXAMPLE | x8 | 2.6 | 15.4 | 1.7 | 1.4 | 3 | B | A | 0.45 |
| COMPARATIVE EXAMPLE | x9 | 5.8 | 0.5 | 0.9 | — | 1 | S | C | 0.15 |
| COMPARATIVE EXAMPLE | x10 | 6 | 0.6 | 1.0 | — | 1 | S | C | 0.20 |
| COMPARATIVE EXAMPLE | x11 | 8 | 0.9 | 1.1 | — | 1 | S | B | 0.28 |
| COMPARATIVE EXAMPLE | x12 | 6 | 0.9 | 1.0 | — | 1 | S | B | 0.10 |
| COMPARATIVE EXAMPLE | x13 | 10.5 | 0.6 | 1.3 | — | 1 | S | C | 0.36 |
| COMPARATIVE EXAMPLE | x14 | 10.5 | 0.8 | 1.3 | — | 1 | S | C | 0.41 |
| COMPARATIVE EXAMPLE | x15 | 11 | 6.8 | 1.1 | — | 2 | S | B | 0.32 |

As shown in Tables 4 to 6, in the surface-treated steel sheets of Examples m1 to m73 and Comparative Examples x3, x4, and x15, the vanadium content was 1% or higher and 20% or less, and the coating weight was 3 g/m² or higher and 40 g/m² or less.

On the other hand, as shown in Table 6, in the surface-treated steel sheets of Comparative Examples x1, x9 to x14, the vanadium content was less than 1%. In addition, in the surface-treated steel sheets of Comparative Examples x5 to x8, x12, the coating weight was less than 3 g/m².

The coated layers of Examples m1 to m73 and Comparative Examples x1 to x15 were observed using a scanning electron microscope, and whether or not a plurality of dendritic columnar crystals which were grown in the thickness direction of the steel sheet (copper sheet) were included were checked. The results are shown in FIGS. 3A to 6B. In the photographs of the cross-sections shown in FIGS. 3A to 6B, white parts of the uppermost surfaces are gold layers provided to easily observe the coated layers.

FIGS. 3A and 3B are scanning electron micrographs of the coated layer of the surface-treated steel sheet of Example m23. FIG. 3A is a photograph in a view from the upper surface side, and FIG. 3B is a photograph of the cross-section. As shown in FIGS. 3A and 3B, the coated layer of Example m23 did not have cracks (gaps) that reach the steel sheet and had a plurality of dendritic columnar crystals grown in the thickness of the steel sheet. Similarly to Example m23, the coated layers of the surface-treated steel sheets of Examples m1 to m73 and Comparative Examples x5 to x8 did not have cracks (gaps) that reach the steel sheets and had a plurality of dendritic columnar crystals grown in the thickness of the steel sheets.

Figure 4A:
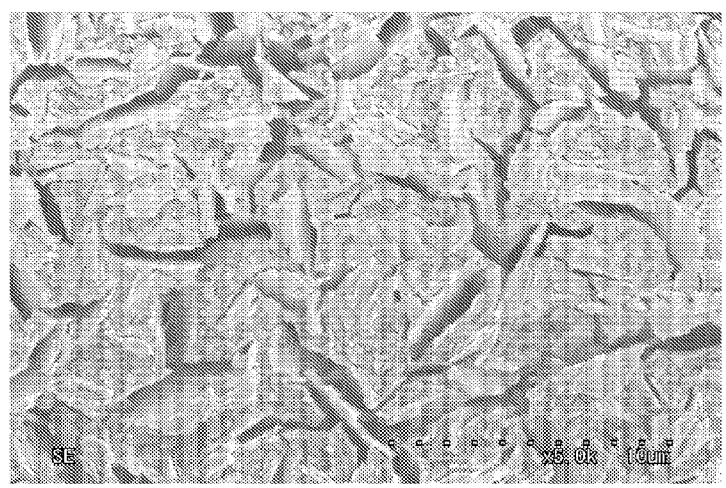
FIG. 4A is a scanning electron micrograph of a coated layer of a surface-treated steel sheet of Comparative Example x3, and is a photograph in a view from the upper surface side.
Figure 4B:
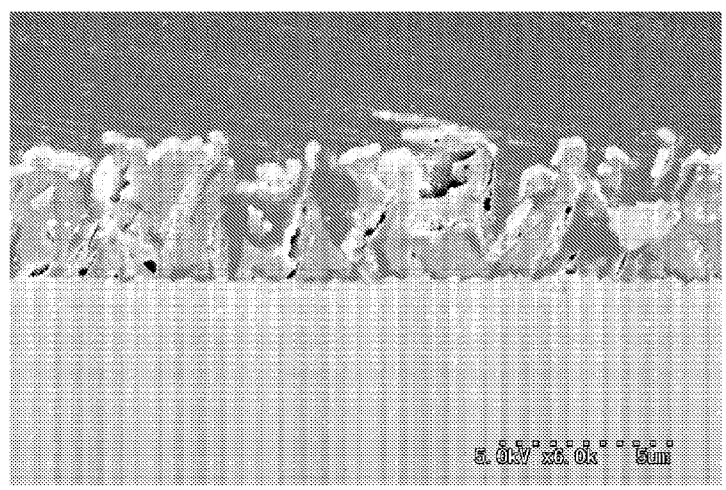
FIG. 4B is a scanning electron micrograph of the coated layer of the surface-treated steel sheet of Comparative Example x3, and is a photograph of the cross-section.

FIGS. 4A and 4B are scanning electron micrographs of the coated layer of the surface-treated steel sheet of Comparative Example x3. FIG. 4A is a photograph in a view from the upper surface side, and FIG. 4B is a photograph of the cross-section. As shown in FIGS. 4A and 4B, the coated layer of Comparative Example x3 formed using the coating bath in the stationary state did not have dendritic columnar crystals. Moreover, as shown in FIG. 4B, the coated layer of Comparative Example x3 had deep cracks (gaps) formed to reach the steel sheet on the surface.

In addition, the coated layer of Comparative Example x4 formed using the coating bath in the stirred state had the same crystal structure as that of Comparative Example x3, had deep cracks (gaps) formed to reach the steel sheet on the surface, and did not have dendritic columnar crystals. In addition, even in Comparative Example x15 in which 0.01% of nitric acid ions were included in the coating bath, dendritic columnar crystals were not included.

Figure 5A:
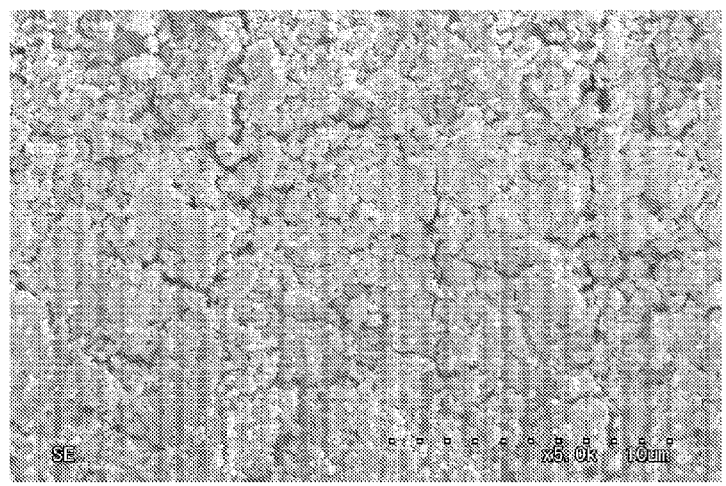
FIG. 5A is a scanning electron micrograph of a coated layer of an surface-treated copper sheet of Comparative Example x2, and is a photograph in a view from the upper surface side.
Figure 5B:
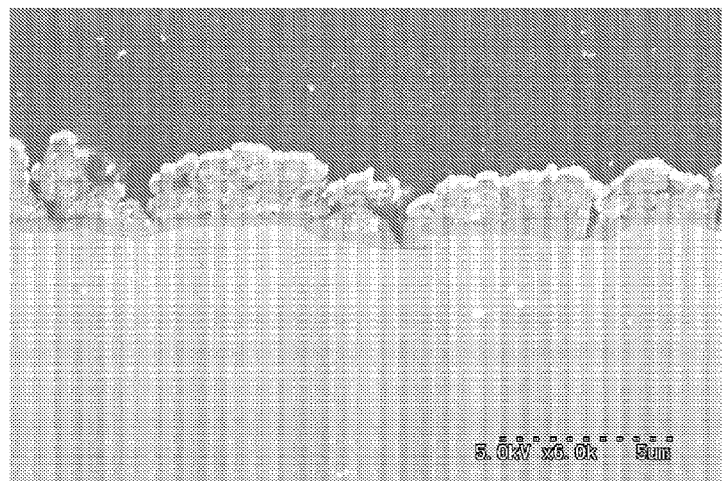
FIG. 5B is a scanning electron micrograph of the coated layer of the surface-treated copper sheet of Comparative Example x2, and is a photograph of the cross-section.

FIGS. 5A and 5B are scanning electron micrographs of the coated layer of the electro coated copper sheet of Comparative Example x2. FIG. 5A is a photograph in a view from the upper surface side, and FIG. 5B is a photograph of the cross-section. As shown in FIGS. 5A and 5B, the coated layer of Comparative Example x2 formed on the surface of the copper sheet had aggregated granular crystals and did not have dendritic columnar crystals.

Figure 6A:
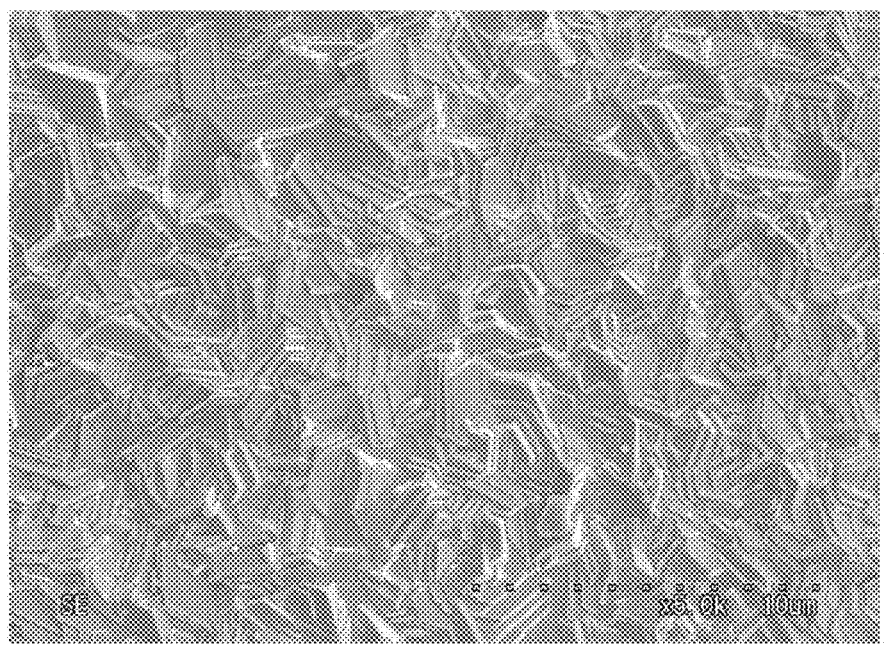
FIG. 6A is a scanning electron micrograph of a coated layer of a surface-treated steel sheet of Comparative Example x1, and is a photograph in a view from the upper surface side.
Figure 6B:
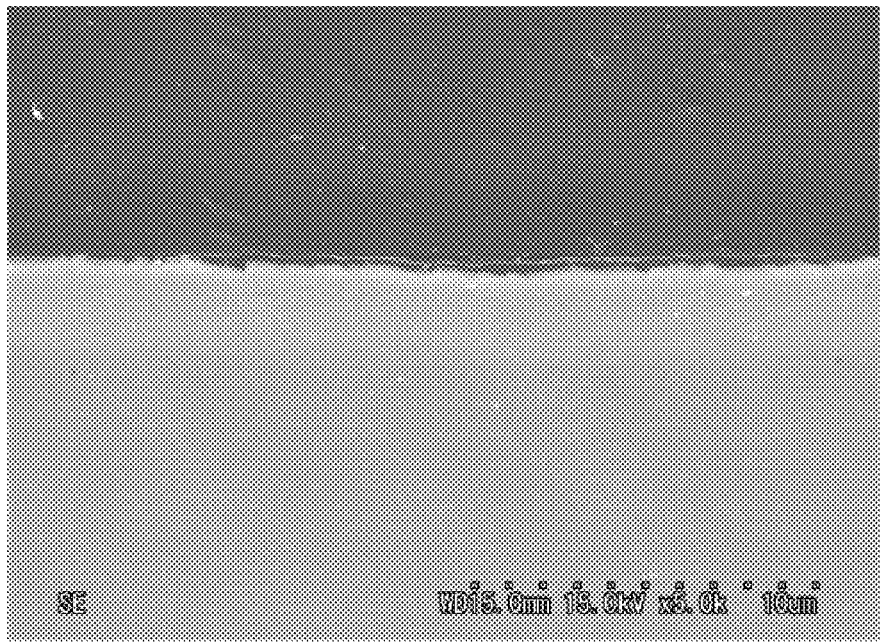
FIG. 6B is a scanning electron micrograph of the coated layer of the surface-treated steel sheet of Comparative Example x1, and is a photograph of the cross-section.

FIGS. 6A and 6B are scanning electron micrographs of the coated layer of the surface-treated steel sheet of Comparative Example x1. FIG. 6A is a photograph in a view from the upper surface side, and FIG. 6B is a photograph of the cross-section. As shown in FIGS. 6A and 6B, the coated layer of Comparative Example x1, which did not include vanadium, did not have dendritic columnar crystals.

In addition, the coated layers of Comparative Examples x9 to x14 in which the vanadium content was less than 1% had the same crystal structure as that of Comparative Example x1 and did not have dendritic columnar crystals.

Among the surface-treated steel sheets (copper sheets) of Examples m1 to m73 and Comparative Examples x1 to x15, regarding Examples m1 to m73 and Comparative Examples x5 to x8 in which the coated layer had dendritic columnar crystals, the content x of vanadium that was present between the adjacent columnar crystals and the content y of vanadium that was present inside the columnar crystals were each measured at a plurality of points using an EPMA (Electron Probe Micro-Analyzer).

Between the adjacent columnar crystals is referred to as an area corresponding to the dark gray part in the scanning electron micrograph shown in FIG. 3B. In addition, inside the columnar crystals is referred to as an area corresponding to the light gray part in the scanning electron micrograph shown in FIG. 3B.

On the basis of the measurement results, the average value of each of the content x of vanadium that was present between the adjacent columnar crystals (outside the arms) and the content y of vanadium that was present inside the columnar crystals (inside the arms) was calculated, and the ratio x/y of x to y was obtained. The results are shown in Tables 4 to 6.

As shown in Tables 4 to 6, in the coated layers of the surface-treated steel sheets of Examples m1 to m73 and Comparative Examples x5 to x8, the ratio x/y of x to y was 1.1 or higher and 3.0 or less in terms of vanadium element.

As bare properties of the surface-treated steel sheets (copper sheets) of Examples m1 to m73 and Comparative Examples x1 to x15, corrosion resistance, powdering properties, painting adhesion, emissivity were evaluated by the method described as follows. The results are shown in Tables 4 to 6.

[Corrosion Resistance]

The edge and the rear surface of a specimen cut from the surface-treated steel sheet were sealed with a tape, and were subjected to a salt spray test (JIS Z 2371). In addition, the ratio of area of non-sealed parts where white rust was generated was visually observed after 24 hours and evaluated according to the following criteria. The ratio of area where white rust was generated is a percentage of the area of a part where white surface was generated with respect to the area of the observed part.

(Criteria)

6: a ratio of area where white rust was generated of less than 3%

5: a ratio of area where white rust was generated of 3% or higher and less than 10%

4: a ratio of area where white rust was generated of 10% or higher and less than 25%

3: a ratio of area where white rust was generated of 25% or higher and less than 50%

2: a ratio of area where white rust was generated of 50% or higher and less than 75%

1: a ratio of area where white rust was generated of 75% or higher

[Powdering Properties (Adhesion between Coated Layer and Steel Sheet)]

For a powdering property test, a 60° V-bending die was used. Bending at 60° was performed using a die in which the radius of curvature of the tip end is 1 mm so that the evaluation surface of the specimen cut from the surface-treated steel sheet is positioned on the inside of the bent portion, a tape was attached to the inside of the bent portion, and the tape was teared off. From the peeled status of the coated layer peeled along with the tape, powdering properties were evaluated according to the following criteria.

(Criteria)

S: a peeled width of less than 2 mm
A: a peeled width of 2 mm or greater and less than 3 mm
B: a peeled width of 3 mm or greater and less than 5 mm
C: a peeled width of 5 mm or greater

[Emissivity]

Using the Fourier transform infrared spectrometer "VALOR-III" made by JASCO Corporation, the infrared emission spectrum in a region where a wave number is 600 to 3000 $cm^{-1}$ when the temperature of the surface-treated steel sheet was 100° C. was measured, and this was calculated by being compared to the emission spectrum of a standard black body. In addition, as the standard black body, an iron sheet sprayed with "THI-1B black body spray" sold by Tascojapan CO., LTD. (made by Okitsumo Inc.) to have a film thickness of 30±2 µm was used.

[Painting Adhesion]

A paint (Amilac #1000, made by Kansai Paint Co., Ltd.) was applied onto the specimen cut from the surface-treated steel sheet through bar coating, the resultant was baked at 140° C. for 20 minutes, thereby forming a film having a dried film thickness of 25 µm. The obtained painted sheet was dipped into boiling water for 30 minutes and was left indoors at room temperature for 24 hours. Thereafter, a grid with 100 1-mm squares was carved in the specimen with an NT cutter, and this was extruded into 7 mm by an Erichsen tester. Thereafter, a peeling test was performed by an adhesive tape on the extruded convex portion, and painting adhesion was evaluated according to the following criteria.
(Criteria)
  S: no peeled
  A: the number of peeled portions is 1 or more and less than 10
  B: the number of peeled portions is 10 or more and less than 50
  C: the number of peeled portions is more than 50

As shown in Tables 4 and 5, in the surface-treated steel sheets of Examples m1 to m73, corrosion resistance was graded 4 or higher in the criteria, powdering properties were graded A or higher in the criteria, painting adhesion was graded A or higher in the criteria, and thus all the corrosion resistance, powdering properties, and painting adhesion were excellent.

On the other hand, as shown in Table 6, in Comparative Example x1 in which the coated layer did not include vanadium, although powdering properties were excellent, a coated layer having dendritic columnar crystals was not obtained, and corrosion resistance and painting adhesion were insufficient.

In Comparative Example x2 in which the coated layer was formed on the surface of the copper sheet, a coated layer having dendritic columnar crystals was not obtained, powdering properties, corrosion resistance and painting adhesion were insufficient.

In Comparative Example x3 in which the coated layer was formed using the coating bath in the stationary state and in Comparative Example x4 in which the coated layer was formed using the coating bath in the stirred state, a coated layer having dendritic columnar crystals was not obtained, and although painting adhesion was good, powdering properties and corrosion resistance were insufficient.

In Comparative Examples x5 to x8 in which the coating weight of the coated layer was less than 3 g/m$^2$, corrosion resistance was insufficient.

In Comparative Examples x9 to x14 in which the vanadium content of the coated layer was less than 1%, although powdering properties were excellent, coated layers having dendritic columnar crystals were not obtained, corrosion resistance was very poor, and painting adhesion was insufficient.

In Comparative Examples x15 in which dendritic crystals were not formed, corrosion resistance and painting adhesion were insufficient.

Example 2

Next, on the surface-treated steel sheet (copper sheet) having the coated layer including zinc and oxides of vanadium, which was manufactured in Example 1, raw materials of a resin film having the composition shown in Tables 8 to 10 were applied onto the surface of the steel sheet subjected to coating using chemicals of the resin film as shown in Table 7, the resultant was baked and dried, thereby forming a resin film. In addition, as performances after forming the film, corrosion resistance of worked parts, conductivity, emissivity, and scratch resistance were evaluated. Regarding the emissivity, in the same method as in Example 1, evaluations were performed according to the same criteria. Regarding corrosion resistance of worked parts, conductivity, and scratch resistance, evaluations were performed as follows. The results are shown in Tables 11 to 13.

In addition, hereinafter, all the contents in the resin film are mass % with respect to the solid content of the resin film. In addition, Coating in the tables represents the number of the used surface-treated steel sheet and corresponds to the number of Example 1. In addition, blanks represent no intentional content.

[Corrosion Resistance of Worked Parts]

The center portion of the specimen was extruded into 6 mm by the Erichsen tester (based on A dimensions of JIS Z 2247), and thereafter a salt spray test (SST) based on JIS Z 2371 was performed by sealing the end surface with a tape for 24 hours, 72 hours, and 120 hours. A status of rust generated after each of the test times in the part subjected to the extrusion was observed, and evaluations were performed according to the following evaluation criteria.
(Criteria)
  5: an area where white rust was generated was less than 1%
  4: an area where white rust was generated was 1% or larger and less than 5%
  3: an area where white rust was generated was 5% or larger and less than 10%
  2: an area where white rust was generated was 10% or larger and less than 30%
  1: an area where white rust was generated was 30% or larger

[Conductivity]

Using the specimen cut from the surface-treated steel sheet where the resin film was formed, an interlayer resistance ($\Omega \cdot cm^2$) was measured by the measurement method specified in JIS C 2550, and conductivity was evaluated according to the following criteria, where grades of C or higher are appropriate.
(Criteria)
  S: an interlayer resistance of less than 1.0 $\Omega \cdot cm^2$
  A: an interlayer resistance of 1.0 $\Omega \cdot cm^2$ or higher and less than 1.5 $\Omega \cdot cm^2$
  B: an interlayer resistance of 1.5 $\Omega \cdot cm^2$ or higher and less than 2.0 $\Omega \cdot cm^2$
  C: an interlayer resistance of 2.0 $\Omega \cdot cm^2$ or higher and less than 2.5 $\Omega \cdot cm^2$
  D: an interlayer resistance of 2.5 $\Omega \cdot cm^2$ or higher and less than 3.0 $\Omega \cdot cm^2$
  E: an interlayer resistance of 3.0 $\Omega \cdot cm^2$ or higher

[Scratch Resistance]

After installing the specimen in a rubbing tester (made by Ohira RKC Co., Ltd.), corrugated paper having dimensions of 30 mm in length and 30 mm in width was mounted to be parallel to the specimen at the tip end of the sliding tool of the rubbing tester. The status of the film after the corrugated paper was rubbed for 5 reciprocations and 10 reciprocations under a load of 9.8 N (1.0 kgf) was evaluated according to the following evaluation criteria.
(Criteria)
  5: no trace was admitted in the rubbed surface
  4: extremely slight sliding flaws had occurred in the rubbed surface (a level at which sliding flaws could be barely seen and determined with caution)
  3: slight sliding flaws had occurred in the rubbed surface (a level at which sliding flaws could be easily seen and determined with caution)
  2: definite sliding flaws had occurred in the rubbed surface (a level at which sliding flaws could be determined at once)
  1: the coating of the rubbed surface was peeled off, and the metal sheet of the underlayer was exposed

TABLE 7

| CLASSIFICATION | TYPE | BRAND NAME | MANUFACTURER | SYMBOL |
|---|---|---|---|---|
| RESIN (A) | POLYESTER RESIN | VYLONAL MD-1200 | TOYOBO CO., LTD. | A01 |
| | POLYURETHANE RESIN | SUPERFLEX170 | DAI-ICHI KOGYO SEIYAKU CO., LTD. | A02 |
| | EPOXY RESIN | ADEKA RESIN EM0436FS-12 | ADEKA CORPORATION | A03 |
| | ACRYLIC RESIN | KANEBINORU KD-5 | NIPPON NSC LTD. | A04 |
| | POLYOLEFIN RESIN | HTEC S-3121 | TOHO CHEMICAL INDUSTRY CO., LTD. | A05 |
| METAL OXIDE PARTICLES (B) | GRANULAR SILICA, PARTICLE DIAMETER OF 15 nm | SNOWTEX N | NISSAN CHEMICAL INDUSTRIES, LTD. | B01 |
| | SPHERICAL SILICA PARTICLES, PARTICLE DIAMETER OF 0.1 μm | MP-1040 | NISSAN CHEMICAL INDUSTRIES, LTD. | B02 |
| PHOSPHATE COMPOUND (C) | SODIUM DIHYDROGENPHOSPHATE | — | — | C01 |
| CROSS-LINKING AGENT (D, E) | SILANE COUPLING AGENT | γ-GLYCIDOXYPROPYL-TRIMETHOXYSILANE | — | D01 |
| | MELAMINE RESIN | CYMEL 325 | NIHON CYTEC INDUSTRIES INC. | E01 |
| LUBRICANT (H) | POLYETHYLENE RESIN PARTICLES, PARTICLE DIAMETER OF 1.0 μm | CHEMIPEARL W700 | MITSUI CHEMICALS, INC. | H01 |

TABLE 8

| | | | RESIN FILM | | | | | | | | | | |
|---|---|---|---|---|---|---|---|---|---|---|---|---|---|
| | | AQUEOUS RESIN (A) | | METAL OXIDE PARTICLES (B) | | PHOSPHATE COMPOUND (C) | | CROSS-LINKING AGENT (D, E) | | LUBRICANT (H) | | DRYING TEMPERATURE ° C. | THICKNESS μm |
| No. | COATING | SYMBOL | CONTENT | SYMBOL | CONTENT | SYMBOL | CONTENT | SYMBOL | CONTENT | SYMBOL | CONTENT | | |
| EXAMPLE s1 | m10 | A02 | 100 | | | | | | | | | 150 | 2 |
| EXAMPLE s2 | m15 | A02 | 100 | | | | | | | | | 150 | 2 |
| EXAMPLE s3 | m38 | A02 | 100 | | | | | | | | | 150 | 2 |
| EXAMPLE s4 | m40 | A02 | 100 | | | | | | | | | 150 | 2 |
| EXAMPLE s5 | m40 | A02 | 80 | B01 | 20 | | | | | | | 150 | 2 |
| EXAMPLE s6 | m40 | A02 | 77 | B01 | 20 | | | | | H01 | 3 | 150 | 2 |
| EXAMPLE s7 | m40 | A02 | 79 | B01 | 20 | C01 | 1 | | | | | 150 | 2 |
| EXAMPLE s8 | m40 | A02 | 76 | B01 | 20 | C01 | 1 | | | H01 | 3 | 150 | 2 |
| EXAMPLE s9 | m40 | A02 | 96 | | | C01 | 1 | | | H01 | 3 | 150 | 2 |
| EXAMPLE s10 | m40 | A02 | 93 | B01 | 3 | C01 | 1 | | | H01 | 3 | 150 | 2 |
| EXAMPLE s11 | m40 | A02 | 91.5 | B01 | 4.5 | C01 | 1 | | | H01 | 3 | 150 | 2 |
| EXAMPLE s12 | m40 | A02 | 86 | B01 | 10 | C01 | 1 | | | H01 | 3 | 150 | 2 |
| EXAMPLE s13 | m40 | A02 | 66 | B01 | 30 | C01 | 1 | | | H01 | 3 | 150 | 2 |
| EXAMPLE s14 | m40 | A02 | 56 | B01 | 40 | C01 | 1 | | | H01 | 3 | 150 | 2 |
| EXAMPLE s15 | m40 | A01 | 76 | B01 | 20 | C01 | 1 | | | H01 | 3 | 150 | 2 |
| EXAMPLE s16 | m40 | A03 | 76 | B01 | 20 | C01 | 1 | | | H01 | 3 | 150 | 2 |
| EXAMPLE s17 | m40 | A04 | 76 | B01 | 20 | C01 | 1 | | | H01 | 3 | 150 | 2 |
| EXAMPLE s18 | m40 | A05 | 76 | B01 | 20 | C01 | 1 | | | H01 | 3 | 150 | 2 |
| EXAMPLE s19 | m40 | A02 | 73 | B01 | 20 | C01 | 1 | D01 | 3 | H01 | 3 | 150 | 2 |
| EXAMPLE s20 | m40 | A02 | 65 | B01 | 20 | C01 | 1 | E01 | 11 | H01 | 3 | 150 | 2 |

TABLE 9

| | | | RESIN FILM | | | | | | | | | | |
|---|---|---|---|---|---|---|---|---|---|---|---|---|---|
| | | AQUEOUS RESIN (A) | | METAL OXIDE PARTICLES (B) | | | | PHOSPHATE COMPOUND (C) | | CROSS-LINKING AGENT (D, E) | | LUBRICANT (H) | |
| No. | COATING | SYMBOL | CONTENT | SYMBOL | CONTENT | SYMBOL | CONTENT | SYMBOL | CONTENT | SYMBOL | CONTENT | SYMBOL | CONTENT | DRYING TEMPERATURE ° C. | THICKNESS μm |
| EXAMPLE s21 | m40 | A02 | 73 | B01 | 15 | B02 | 5 | C01 | 1 | D01 | 3 | H01 | 3 | 150 | 2 |
| EXAMPLE s22 | m40 | A02 | 73 | B01 | 15 | B02 | 5 | C01 | 1 | D01 | 3 | H01 | 3 | 150 | 2 |
| EXAMPLE s23 | m40 | A02 | 73 | B01 | 15 | B02 | 5 | C01 | 1 | D01 | 3 | H01 | 3 | 150 | 2 |
| EXAMPLE s24 | m40 | A02 | 73 | B01 | 15 | B02 | 5 | C01 | 1 | D01 | 3 | H01 | 3 | 150 | 2 |

TABLE 9-continued

| | | RESIN FILM | | | | | | | | | | | | |
|---|---|---|---|---|---|---|---|---|---|---|---|---|---|---|
| | | AQUEOUS RESIN (A) | | METAL OXIDE PARTICLES (B) | | | | PHOSPHATE COMPOUND (C) | | CROSS-LINKING AGENT (D, E) | | LUBRICANT (H) | | DRYING TEMPER- | THICK- |
| No. | COAT-ING | SYM-BOL | CON-TENT | SYM-BOL | CON-TENT | SYM-BOL | CON-TENT | SYM-BOL | CON-TENT | SYM-BOL | CON-TENT | SYM-BOL | CON-TENT | ATURE °C. | NESS μm |
| EXAMPLE | s25 | m40 | A02 | 73 | B01 | 15 | B02 | 5 | C01 | 1 | D01 | 3 | | 3 | 150 | 2 |
| EXAMPLE | s26 | m40 | A02 | 73 | B01 | 15 | B02 | 5 | C01 | 1 | D01 | 3 | | 3 | 150 | 2 |
| EXAMPLE | s27 | m40 | A02 | 73 | B01 | 15 | B02 | 5 | C01 | 1 | D01 | 3 | | 3 | 150 | 2 |
| EXAMPLE | s28 | m40 | A02 | 73 | B01 | 15 | B02 | 5 | C01 | 1 | D01 | 3 | | 3 | 150 | 2 |
| EXAMPLE | s29 | m40 | A02 | 73 | B01 | 15 | B02 | 5 | C01 | 1 | D01 | 3 | | 3 | 150 | 2 |
| EXAMPLE | s30 | m40 | A02 | 73 | B01 | 15 | B02 | 5 | C01 | 1 | D01 | 3 | | 3 | 150 | 2 |
| EXAMPLE | s31 | m40 | A02 | 73 | B01 | 15 | B02 | 5 | C01 | 1 | D01 | 3 | H01 | 3 | 150 | 2 |
| EXAMPLE | s32 | m10 | A02 | 73 | B01 | 15 | B02 | 5 | C01 | 1 | D01 | 3 | H01 | 3 | 150 | 1 |
| EXAMPLE | s33 | m15 | A02 | 73 | B01 | 15 | B02 | 5 | C01 | 1 | D01 | 3 | H01 | 3 | 150 | 1 |
| EXAMPLE | s34 | m38 | A02 | 73 | B01 | 15 | B02 | 5 | C01 | 1 | D01 | 3 | H01 | 3 | 150 | 1 |
| EXAMPLE | s35 | m40 | A02 | 73 | B01 | 15 | B02 | 5 | C01 | 1 | D01 | 3 | H01 | 3 | 150 | 1 |
| EXAMPLE | s36 | m10 | A02 | 73 | B01 | 15 | B02 | 5 | C01 | 1 | D01 | 3 | H01 | 3 | 150 | 3 |
| EXAMPLE | s37 | m15 | A02 | 73 | B01 | 15 | B02 | 5 | C01 | 1 | D01 | 3 | H01 | 3 | 150 | 3 |
| EXAMPLE | s38 | m38 | A02 | 73 | B01 | 15 | B02 | 5 | C01 | 1 | D01 | 3 | H01 | 3 | 150 | 3 |
| EXAMPLE | s39 | m40 | A02 | 73 | B01 | 15 | B02 | 5 | C01 | 1 | D01 | 3 | H01 | 3 | 150 | 3 |
| EXAMPLE | s40 | m38 | A02 | 73 | B01 | 15 | B02 | 5 | C01 | 1 | D01 | 3 | H01 | 3 | 150 | 5 |

TABLE 10

| | | RESIN FILM | | | | | | | | | | | | |
|---|---|---|---|---|---|---|---|---|---|---|---|---|---|---|
| | | AQUEOUS RESIN (A) | | METAL OXIDE PARTICLES (B) | | | | PHOSPHATE COMPOUND (C) | | CROSS-LINKING AGENT (D, E) | | LUBRICANT (H) | | DRYING TEMPER- | THICK- |
| No. | COAT-ING | SYM-BOL | CON-TENT | SYM-BOL | CON-TENT | SYM-BOL | CON-TENT | SYM-BOL | CON-TENT | SYM-BOL | CON-TENT | SYM-BOL | CON-TENT | ATURE °C. | NESS μm |
| COMPARATIVE EXAMPLE | y1 | x1 | A02 | 100 | | | | | | | | | | | 150 | 1 |
| COMPARATIVE EXAMPLE | y2 | x1 | A02 | 100 | | | | | | | | | | | 150 | 2 |
| COMPARATIVE EXAMPLE | y3 | x2 | A02 | 100 | | | | | | | | | | | 150 | 2 |
| COMPARATIVE EXAMPLE | y4 | x3 | A02 | 100 | | | | | | | | | | | 150 | 2 |
| COMPARATIVE EXAMPLE | y6 | x11 | A02 | 100 | | | | | | | | | | | 150 | 2 |
| COMPARATIVE EXAMPLE | y7 | x1 | A02 | 73 | B01 | 15 | B02 | 5 | C01 | 1 | D01 | 3 | H01 | 3 | 150 | 2 |
| COMPARATIVE EXAMPLE | y8 | x2 | A02 | 73 | B01 | 15 | B02 | 5 | C01 | 1 | D01 | 3 | H01 | 3 | 150 | 2 |
| COMPARATIVE EXAMPLE | y9 | x3 | A02 | 73 | B01 | 15 | B02 | 5 | C01 | 1 | D01 | 3 | H01 | 3 | 150 | 2 |
| COMPARATIVE EXAMPLE | y10 | x11 | A02 | 73 | B01 | 15 | B02 | 5 | C01 | 1 | D01 | 3 | H01 | 3 | 150 | 2 |
| REFERENCE EXAMPLE | y11 | m40 | | | | | | | NO FILM FORMED | | | | | | | |

TABLE 11

| | | AFTER FILM FORMATION | | | | | | |
|---|---|---|---|---|---|---|---|---|
| | | CORROSION RESISTANCE OF WORKED PARTS | | | | EMISSIVITY | SCRATCH RESISTANCE | |
| No. | COATING | 24 h | 72 h | 120 h | CONDUCTIVITY | (REFERENCE) | 5 RECIPROCATIONS | 10 RECIPROCATIONS |
| EXAMPLE | s1 | m10 | 5 | 4 | 4 | A | 0.93 | 3 | 3 |
| EXAMPLE | s2 | m15 | 3 | 3 | 3 | A | 0.87 | 3 | 3 |
| EXAMPLE | s3 | m38 | 5 | 3 | 3 | A | 0.93 | 3 | 3 |
| EXAMPLE | s4 | m40 | 3 | 3 | 3 | A | 0.9 | 3 | 3 |
| EXAMPLE | s5 | m40 | 4 | 4 | 3 | A | 0.86 | 4 | 3 |

TABLE 11-continued

| | | | CORROSION RESISTANCE OF WORKED PARTS | | | | AFTER FILM FORMATION | SCRATCH RESISTANCE | |
|---|---|---|---|---|---|---|---|---|---|
| No. | | COATING | 24 h | 72 h | 120 h | CONDUCTIVITY | EMISSIVITY (REFERENCE) | 5 RECIPROCATIONS | 10 RECIPROCATIONS |
| EXAMPLE | s6 | m40 | 4 | 4 | 3 | A | 0.86 | 4 | 4 |
| EXAMPLE | s7 | m40 | 5 | 4 | 4 | A | 0.86 | 4 | 3 |
| EXAMPLE | s8 | m40 | 5 | 4 | 4 | A | 0.86 | 4 | 4 |
| EXAMPLE | s9 | m40 | 4 | 4 | 3 | A | 0.9 | 4 | 3 |
| EXAMPLE | s10 | m40 | 4 | 4 | 4 | A | 0.9 | 4 | 3 |
| EXAMPLE | s11 | m40 | 5 | 4 | 4 | A | 0.9 | 4 | 4 |
| EXAMPLE | s12 | m40 | 5 | 4 | 4 | A | 0.89 | 4 | 4 |
| EXAMPLE | s13 | m40 | 5 | 4 | 4 | A | 0.82 | 4 | 4 |
| EXAMPLE | s14 | m40 | 4 | 4 | 4 | A | 0.81 | 4 | 4 |
| EXAMPLE | s15 | m40 | 5 | 4 | 4 | A | 0.83 | 4 | 4 |
| EXAMPLE | s16 | m40 | 4 | 4 | 4 | A | 0.83 | 4 | 4 |
| EXAMPLE | s17 | m40 | 4 | 4 | 4 | A | 0.83 | 4 | 4 |
| EXAMPLE | s18 | m40 | 5 | 4 | 4 | A | 0.83 | 4 | 4 |
| EXAMPLE | s19 | m40 | 5 | 5 | 4 | A | 0.83 | 4 | 3 |
| EXAMPLE | s20 | m40 | 5 | 5 | 4 | A | 0.82 | 5 | 4 |

TABLE 12

| | | | CORROSION RESISTANCE OF WORKED PARTS | | | | AFTER FILM FORMATION | SCRATCH RESISTANCE | |
|---|---|---|---|---|---|---|---|---|---|
| No. | | COATING | 24 h | 72 h | 120 h | CONDUCTIVITY | EMISSIVITY (REFERENCE) | 5 RECIPROCATIONS | 10 RECIPROCATIONS |
| EXAMPLE | s21 | m40 | 5 | 5 | 4 | A | 0.83 | 5 | 5 |
| EXAMPLE | s22 | m40 | 5 | 5 | 4 | A | 0.83 | 5 | 5 |
| EXAMPLE | s23 | m40 | 5 | 5 | 4 | A | 0.83 | 5 | 5 |
| EXAMPLE | s24 | m40 | 5 | 5 | 4 | A | 0.83 | 5 | 4 |
| EXAMPLE | s25 | m40 | 3 | 3 | 3 | A | 0.83 | 3 | 3 |
| EXAMPLE | s26 | m40 | 4 | 3 | 3 | A | 0.83 | 4 | 3 |
| EXAMPLE | s27 | m40 | 5 | 4 | 4 | A | 0.83 | 5 | 4 |
| EXAMPLE | s28 | m40 | 5 | 5 | 5 | A | 0.83 | 5 | 5 |
| EXAMPLE | s29 | m40 | 5 | 5 | 5 | A | 0.83 | 5 | 5 |
| EXAMPLE | s30 | m40 | 5 | 5 | 5 | A | 0.83 | 5 | 5 |
| EXAMPLE | s31 | m40 | 5 | 5 | 4 | A | 0.83 | 4 | 4 |
| EXAMPLE | s32 | m10 | 5 | 5 | 5 | S | 0.87 | 5 | 5 |
| EXAMPLE | s33 | m15 | 5 | 4 | 4 | S | 0.82 | 4 | 4 |
| EXAMPLE | s34 | m38 | 5 | 5 | 4 | S | 0.87 | 5 | 4 |
| EXAMPLE | s35 | m40 | 5 | 4 | 4 | S | 0.83 | 4 | 4 |
| EXAMPLE | s36 | m10 | 5 | 5 | 5 | B | 0.9 | 5 | 5 |
| EXAMPLE | s37 | m15 | 5 | 5 | 5 | B | 0.84 | 5 | 5 |
| EXAMPLE | s38 | m38 | 5 | 5 | 5 | B | 0.89 | 5 | 5 |
| EXAMPLE | s39 | m40 | 5 | 5 | 5 | B | 0.85 | 5 | 5 |
| EXAMPLE | s40 | m38 | 5 | 5 | 5 | C | 0.89 | 5 | 5 |

TABLE 13

| | | | CORROSION RESISTANCE OF WORKED PARTS | | | | AFTER FILM FORMATION | SCRATCH RESISTANCE | |
|---|---|---|---|---|---|---|---|---|---|
| No. | | COATING | 24 h | 72 h | 120 h | CONDUCTIVITY | EMISSIVITY (REFERENCE) | 5 RECIPROCATIONS | 10 RECIPROCATIONS |
| COMPARATIVE EXAMPLE | y1 | x1 | 2 | 1 | 1 | E | 0.1 | 3 | 3 |
| COMPARATIVE EXAMPLE | y2 | x1 | 3 | 1 | 1 | E | 0.1 | 3 | 3 |
| COMPARATIVE EXAMPLE | y3 | x2 | 2 | 1 | 1 | E | 0.85 | 3 | 3 |
| COMPARATIVE EXAMPLE | y4 | x3 | 3 | 1 | 1 | A | 0.87 | 3 | 3 |
| COMPARATIVE EXAMPLE | y6 | x11 | 3 | 1 | 1 | D | 0.18 | 3 | 3 |

TABLE 13-continued

| | | | AFTER FILM FORMATION | | | | | |
|---|---|---|---|---|---|---|---|---|
| | | | CORROSION RESISTANCE OF | | | | SCRATCH RESISTANCE | |
| | | | WORKED PARTS | | | CONDUC- | EMISSIVITY | 5 RECIPRO- | 10 RECIPRO- |
| No. | | COATING | 24 h | 72 h | 120 h | TIVITY | (REFERENCE) | CATIONS | CATIONS |
| COMPARATIVE EXAMPLE | y7 | x1 | 5 | 4 | 3 | E | 0.15 | 4 | 4 |
| COMPARATIVE EXAMPLE | y8 | x2 | 4 | 2 | 1 | E | 0.83 | 4 | 4 |
| COMPARATIVE EXAMPLE | y9 | x3 | 4 | 2 | 1 | A | 0.88 | 4 | 4 |
| COMPARATIVE EXAMPLE | y10 | x11 | 5 | 4 | 3 | D | 0.85 | 4 | 4 |
| REFERENCE EXAMPLE | y11 | m40 | 3 | 2 | 1 | S | 0.58 | 2 | 2 |

As shown in Tables 11 to 13, in the surface-treated steel sheets of Examples s1 to s40, corrosion resistance of worked parts was graded 3 or higher, conductivity was graded C or higher, and scratch resistance was graded 3 or higher, which shows excellence.

Example 3

Next, a water-based metal surface treatment agent having the composition shown in Tables 15 to 17 was applied onto the surface of the surface-treated steel sheet having the coated layer that includes zinc and oxides of vanadium, which was manufactured in Example 1, by using chemicals as shown in Table 14, the resultant was baked and dried, thereby forming a film.

In addition, as performances after forming the film, corrosion resistance of worked parts, conductivity, workability (working adhesion), and emissivity were evaluated in the same method as Example 2 according to the same criteria except for workability. Workability was evaluated as follows. The results are shown in Tables 18 to 20.

[Workability]

After performing 180° bending on the specimen cut from the surface-treated steel sheet where the film was formed, a tape peeling test was performed on the outside of the bent portion. The appearance of the tape peeled portion was observed by a magnifying glass with a magnification of 10×, and was evaluated according to the following evaluation criteria. Bending was performed using a spacer having a size of 0.5 mm interposed in an atmosphere of 20° C.

(Criteria)

5: no peeled portion was admitted in the painted film

4: peeled portions were admitted in an extremely partial painted film (peeled area≤2%)

3: peeled portions were admitted in a partial painted film (2%<peeled areas≤10%)

2: peeled portions were admitted in the painted film (10%<peeled area≤20%)

1: peeled portions were admitted in the painted film (peeled area>20%)

TABLE 14

| SILANE COUPLING AGENT (I, J) | | ORGANIC RESIN (GB) | | VANADIUM COMPOUND (Z) | | POLYETHYLENE WAX (Q) | | CARBON BLACK |
|---|---|---|---|---|---|---|---|---|
| I1 | 3-AMINOPROPYL-TRIETHOXYSILANE | GB1 | POLYURETHANE RESIN (SUPERFLEX620 MADE BY DAI-ICHI KOGYO SEIYAKU CO., LTD.) | Z1 | AMMONIUM VANADATE | Q1 | POLYETHYLENE RESIN PARTICLES (CHEMIPEARL W950 MADE BY MITSUI CHEMICALS, INC., PARTICLE DIAMETER OF 0.6 μm) | P1 EMF BLACK HK-3 MADE BY TOYOCHEM CO., LTD. |
| I2 | VINYLTRI-METHOXYSILANE | | | | | | | |
| J1 | 3-GLYCIDOXYPROPYL-TRIMETHOXYSILANE | | | | | | | |

TABLE 15

| | | ORGANIC SILICON COMPOUND (W) | | | | ORGANIC RESIN (GB) | | PHOSPHORIC ACID (Y) | | VANADIUM COMPOUND (Z) | | TITANIUM HYDROFLUORIC ACID (O) ZIRCONIUM HYDROFLUORIC ACID (P) | |
|---|---|---|---|---|---|---|---|---|---|---|---|---|---|
| | | SILANE COUPLING AGENT | | BLENDING RATIO | MOLECULAR WEIGHT | | CONTENT | | CONTENT | | CONTENT | | CONTENT |
| No. | COATING | (I) | (J) | (I)/(J) | | TYPE | | TYPE | | TYPE | | TYPE | |
| EXAMPLE t1 | m10 | I1 | J1 | 1.1 | 3000 | 100 | | | | | | | |
| EXAMPLE t2 | m15 | I1 | J1 | 1.1 | 3000 | 100 | | | | | | | |

TABLE 15-continued

| No. | COAT-ING | ORGANIC SILICON COMPOUND (W) ||||| ORGANIC RESIN (GB) || PHOS-PHORIC ACID (Y) | VANADIUM COMPOUND (Z) || TITANIUM HYDRO-FLUORIC ACID (O) ZIRCONIUM HYDRO-FLUORIC ACID (P) ||
|---|---|---|---|---|---|---|---|---|---|---|---|---|---|
| | | SILANE COUPLING AGENT || BLEND-ING RATIO | MOLEC-ULAR WEIGHT | CON-TENT | | | | | | | |
| | | (I) | (J) | (I)/(J) | | | TYPE | CON-TENT | CON-TENT | TYPE | CON-TENT | TYPE | CON-TENT |
| EXAMPLE t3 | m18 | I1 | J1 | 1.1 | 3000 | 100 | | | | | | | |
| EXAMPLE t4 | m40 | I1 | J1 | 1.1 | 3000 | 100 | | | | | | | |
| EXAMPLE t5 | m40 | I1 | J1 | 1.1 | 3000 | 50 | GB1 | 50 | | | | | |
| EXAMPLE t6 | m40 | I1 | J1 | 1.1 | 3000 | 95 | | | | | | | |
| EXAMPLE t7 | m40 | I1 | J1 | 1.1 | 3000 | 90 | | | 10 | | | | |
| EXAMPLE t8 | m40 | I1 | J1 | 1.1 | 3000 | 85 | | | 10 | Z1 | 5 | | |
| EXAMPLE t9 | m40 | I1 | J1 | 1.1 | 3000 | 85 | | | 10 | | | O | 5 |
| EXAMPLE t10 | m40 | I1 | J1 | 1.1 | 3000 | 80 | | | 10 | Z1 | 5 | O | 5 |
| EXAMPLE t11 | m40 | I1 | J1 | 1.1 | 3000 | 45 | GB1 | 45 | 10 | | | | |
| EXAMPLE t12 | m40 | I1 | J1 | 1.1 | 3000 | 42.5 | GB1 | 42.5 | 10 | Z1 | 5 | | |
| EXAMPLE t13 | m40 | I1 | J1 | 1.1 | 3000 | 42.5 | GB1 | 42.5 | 10 | | | O | 5 |
| EXAMPLE t14 | m10 | I1 | J1 | 1.1 | 3000 | 40 | GB1 | 40 | 10 | Z1 | 5 | O | 5 |
| EXAMPLE t15 | m15 | I1 | J1 | 1.1 | 3000 | 40 | GB1 | 40 | 10 | Z1 | 5 | O | 5 |
| EXAMPLE t16 | m18 | I1 | J1 | 1.1 | 3000 | 40 | GB1 | 40 | 10 | Z1 | 5 | O | 5 |
| EXAMPLE t17 | m40 | I1 | J1 | 1.1 | 3000 | 40 | GB1 | 40 | 10 | Z1 | 5 | O | 5 |
| EXAMPLE t18 | m40 | I2 | — | — | 300 | 40.0 | GB1 | 40 | 10 | Z1 | 5 | O | 5 |
| EXAMPLE t19 | m40 | I1 | — | — | 500 | 40.0 | GB1 | 40 | 10 | Z1 | 5 | O | 5 |
| EXAMPLE t20 | m40 | — | J1 | — | 500 | 40.0 | GB1 | 40 | 10 | Z1 | 5 | O | 5 |
| EXAMPLE t21 | m40 | I1 | J1 | 0.5 | 3000 | 40.0 | GB1 | 40 | 10 | Z1 | 5 | O | 5 |
| EXAMPLE t22 | m40 | I1 | J1 | 0.3 | 3000 | 40.0 | GB1 | 40 | 10 | Z1 | 5 | O | 5 |
| EXAMPLE t23 | m40 | I1 | J1 | 1.3 | 3000 | 40.0 | GB1 | 40 | 10 | Z1 | 5 | O | 5 |
| EXAMPLE t24 | m40 | I1 | J1 | 1.1 | 3000 | 85 | | | 10 | | | | |
| EXAMPLE t25 | m40 | I1 | J1 | 1.1 | 3000 | 80 | | | 10 | Z1 | 5 | | |

TABLE 16

| No. | COAT-ING | ORGANIC SILICON COMPOUND (W) ||||| ORGANIC RESIN (GB) || PHOS-PHORIC ACID (Y) | VANADIUM COMPOUND (Z) || TITANIUM HYDRO-FLUORIC ACID (O) ZIRCONIUM HYDRO-FLUORIC ACID (P) ||
|---|---|---|---|---|---|---|---|---|---|---|---|---|---|
| | | SILANE COUPLING AGENT || BLEND-ING RATIO | MOLEC-ULAR WEIGHT | CON-TENT | | | | | | | |
| | | (I) | (J) | (I)/(J) | | | TYPE | CON-TENT | CON-TENT | TYPE | CON-TENT | TYPE | CON-TENT |
| EXAMPLE t26 | m40 | I1 | J1 | 1.1 | 3000 | 80 | | | 10 | | | O | 5 |
| EXAMPLE t27 | m40 | I1 | J1 | 1.1 | 3000 | 75 | | | 10 | Z1 | 5 | O | 5 |
| EXAMPLE t28 | m40 | I1 | J1 | 1.1 | 3000 | 75 | | | 10 | Z1 | 5 | O | 5 |
| EXAMPLE t29 | m40 | I1 | J1 | 1.1 | 3000 | 75 | | | 10 | Z1 | 5 | O | 5 |
| EXAMPLE t30 | m40 | I1 | J1 | 1.1 | 3000 | 75 | | | 10 | Z1 | 5 | O | 5 |
| EXAMPLE t31 | m40 | I1 | J1 | 1.1 | 3000 | 75 | | | 10 | Z1 | 5 | O | 5 |
| EXAMPLE t32 | m40 | I1 | J1 | 1.1 | 3000 | 42.5 | GB1 | 42.5 | 10 | | | | |
| EXAMPLE t33 | m40 | I1 | J1 | 1.1 | 3000 | 40 | GB1 | 40 | 10 | Z1 | 5 | | |
| EXAMPLE t34 | m40 | I1 | J1 | 1.1 | 3000 | 40 | GB1 | 40 | 10 | | | O | 5 |
| EXAMPLE t35 | m40 | I1 | J1 | 1.1 | 3000 | 37.5 | GB1 | 37.5 | 10 | Z1 | 5 | O | 5 |
| EXAMPLE t36 | m40 | I1 | J1 | 1.1 | 3000 | 85 | | | 10 | | | P | 5 |
| EXAMPLE t37 | m40 | I1 | J1 | 1.1 | 3000 | 40 | GB1 | 40 | 10 | Z1 | 5 | P | 5 |
| EXAMPLE t38 | m40 | I1 | J1 | 1.1 | 3000 | 37.5 | GB1 | 37.5 | 10 | Z1 | 5 | O | 5 |
| EXAMPLE t39 | m40 | I1 | J1 | 1.1 | 3000 | 35 | GB1 | 35 | 10 | Z1 | 5 | | |
| EXAMPLE t40 | m40 | I1 | J1 | 1.1 | 3000 | 35 | GB1 | 35 | 10 | | | O | 5 |
| EXAMPLE t41 | m40 | I1 | J1 | 1.1 | 3000 | 35 | GB1 | 35 | 10 | | | P | 5 |
| EXAMPLE t42 | m40 | I1 | J1 | 1.1 | 3000 | 37.5 | GB1 | 37.5 | 10 | Z1 | 5 | O | 5 |
| EXAMPLE t43 | m40 | I1 | J1 | 1.1 | 3000 | 35 | GB1 | 35 | 10 | Z1 | 5 | O | 5 |
| EXAMPLE t44 | m40 | I1 | J1 | 1.1 | 3000 | 35 | GB1 | 35 | 10 | | | O | 5 |
| EXAMPLE t45 | m40 | I1 | J1 | 1.1 | 3000 | 35 | GB1 | 35 | 10 | | | P | 5 |
| EXAMPLE t46 | m40 | I1 | J1 | 1.1 | 3000 | 37.5 | GB1 | 37.5 | 10 | Z1 | 5 | O | 5 |
| EXAMPLE t47 | m40 | I1 | J1 | 1.1 | 3000 | 35 | GB1 | 35 | 10 | Z1 | 5 | O | 5 |

TABLE 16-continued

| | | ORGANIC SILICON COMPOUND (W) | | | | | ORGANIC RESIN (GB) | | PHOSPHORIC ACID (Y) | VANADIUM COMPOUND (Z) | | TITANIUM HYDROFLUORIC ACID (O) ZIRCONIUM HYDROFLUORIC ACID (P) | |
|---|---|---|---|---|---|---|---|---|---|---|---|---|---|
| | | SILANE COUPLING AGENT | | BLENDING RATIO | MOLECULAR | | | | | | | | |
| No. | COATING | (I) | (J) | (I)/(J) | WEIGHT | CONTENT | TYPE | CONTENT | CONTENT | TYPE | CONTENT | TYPE | CONTENT |
| EXAMPLE t48 | m40 | I1 | J1 | 1.1 | 3000 | 35 | GB1 | 35 | 10 | | | O | 5 |
| EXAMPLE t49 | m40 | I1 | J1 | 1.1 | 3000 | 35 | GB1 | 35 | 10 | | | P | 5 |

TABLE 17

| | | ORGANIC SILICON COMPOUND (W) | | | | | ORGANIC RESIN (GB) | | PHOSPHORIC ACID (Y) | VANADIUM COMPOUND (Z) | | TITANIUM HYDROFLUORIC ACID (O) ZIRCONIUM HYDROFLUORIC ACID (P) | |
|---|---|---|---|---|---|---|---|---|---|---|---|---|---|
| | | SILANE COUPLING AGENT | | BLENDING RATIO | MOLECULAR | | | | | | | | |
| No. | COATING | (I) | (J) | (I)/(J) | WEIGHT | CONTENT | TYPE | CONTENT | CONTENT | TYPE | CONTENT | TYPE | CONTENT |
| COMPARATIVE EXAMPLE | e1 | x1 | I1 | J1 | 1.1 | 3000 | 100 | | | | | | |
| COMPARATIVE EXAMPLE | e2 | x1 | I1 | J1 | 1.1 | 3000 | 100 | | | | | | |
| COMPARATIVE EXAMPLE | e3 | x2 | I1 | J1 | 1.1 | 3000 | 100 | | | | | | |
| COMPARATIVE EXAMPLE | e4 | x3 | I1 | J1 | 1.1 | 3000 | 100 | | | | | | |
| COMPARATIVE EXAMPLE | e5 | x11 | I1 | J1 | 1.1 | 3000 | 100 | | | | | | |
| COMPARATIVE EXAMPLE | e6 | x1 | I1 | J1 | 1.1 | 3000 | 35 | GB1 | 35 | 10 | | | O | 5 |
| COMPARATIVE EXAMPLE | e7 | x1 | I1 | J1 | 1.1 | 3000 | 35 | GB1 | 35 | 10 | | | O | 5 |
| COMPARATIVE EXAMPLE | e8 | x2 | I1 | J1 | 1.1 | 3000 | 35 | GB1 | 35 | 10 | | | O | 5 |
| COMPARATIVE EXAMPLE | e9 | x3 | I1 | J1 | 1.1 | 3000 | 35 | GB1 | 35 | 10 | | | O | 5 |
| COMPARATIVE EXAMPLE | e10 | x11 | I1 | J1 | 1.1 | 3000 | 35 | GB1 | 35 | 10 | | | O | 5 |
| REFERENCE EXAMPLE | e11 | m40 | | | | | NO FILM FORMED | | | | | | |

TABLE 18

| | POLYETHYLENE WAX (Q) | | CARBON BLACK (P1) | | DRYING TEMPERATURE °C. | THICKNESS μm | AFTER FILM FORMATION | | | | | | SCRATCH RESISTANCE | |
|---|---|---|---|---|---|---|---|---|---|---|---|---|---|---|
| | | | | | | | CORROSION RESISTANCE OF WORKED | | | CONDUCTIVITY | WORKING ADHESION | EMISSIVITY | 5 RECIPROCATIONS | 10 RECIPROCATIONS |
| No. | TYPE | CONTENT | TYPE | CONTENT | | | 24 h | 72 h | 120 h | | | | | |
| EXAMPLE t1 | | | | | 130 | 1 | 5 | 4 | 3 | S | 5 | 0.81 | 3 | 3 |
| EXAMPLE t2 | | | | | 130 | 1 | 3 | 3 | 3 | S | 5 | 0.73 | 3 | 3 |
| EXAMPLE t3 | | | | | 130 | 1 | 5 | 4 | 3 | S | 5 | 0.72 | 3 | 3 |

TABLE 18-continued

| | | POLY-ETHYLENE WAX (Q) | | CARBON BLACK (P1) | | DRYING TEMPERATURE °C. | THICKNESS μm | AFTER FILM FORMATION | | | | | | | |
|---|---|---|---|---|---|---|---|---|---|---|---|---|---|---|---|
| | | | | | | | | CORROSION RESISTANCE OF WORKED | | | CONDUCTIVITY | WORKING ADHESIO | EMISSIVITY | SCRATCH RESISTANCE | |
| No. | | TYPE | CONTENT | TYPE | CONTENT | | | 24 h | 72 h | 120 h | | | | 5 RECIPROCATIONS | 10 RECIPROCATIONS |
| EXAMPLE | t4 | | | | | 130 | 1 | 3 | 3 | 3 | S | 5 | 0.75 | 3 | 3 |
| EXAMPLE | t5 | | | | | 130 | 1 | 4 | 3 | 3 | S | 5 | 0.83 | 4 | 3 |
| EXAMPLE | t6 | Q1 | 5 | | | 130 | 1 | 3 | 3 | 3 | S | 5 | 0.76 | 4 | 4 |
| EXAMPLE | t7 | | | | | 130 | 1 | 4 | 3 | 3 | S | 5 | 0.77 | 3 | 3 |
| EXAMPLE | t8 | | | | | 130 | 1 | 4 | 3 | 3 | S | 5 | 0.78 | 3 | 3 |
| EXAMPLE | t9 | | | | | 130 | 1 | 4 | 4 | 3 | S | 5 | 0.78 | 3 | 3 |
| EXAMPLE | t10 | | | | | 130 | 1 | 5 | 4 | 3 | S | 5 | 0.79 | 3 | 3 |
| EXAMPLE | t11 | | | | | 130 | 1 | 5 | 4 | 3 | S | 5 | 0.82 | 4 | 3 |
| EXAMPLE | t12 | | | | | 130 | 1 | 5 | 4 | 3 | S | 5 | 0.82 | 4 | 3 |
| EXAMPLE | t13 | | | | | 130 | 1 | 5 | 4 | 4 | S | 5 | 0.82 | 4 | 3 |
| EXAMPLE | t14 | | | | | 130 | 1 | 5 | 5 | 5 | S | 5 | 0.89 | 4 | 3 |
| EXAMPLE | t15 | | | | | 130 | 1 | 5 | 5 | 5 | S | 5 | 0.81 | 4 | 3 |
| EXAMPLE | t16 | | | | | 130 | 1 | 5 | 5 | 5 | S | 5 | 0.88 | 4 | 3 |
| EXAMPLE | t17 | | | | | 130 | 1 | 5 | 5 | 5 | S | 5 | 0.82 | 4 | 3 |
| EXAMPLE | t18 | | | | | 130 | 1 | 4 | 3 | 3 | S | 5 | 0.73 | 4 | 3 |
| EXAMPLE | t19 | | | | | 130 | 1 | 4 | 4 | 3 | S | 5 | 0.74 | 4 | 3 |
| EXAMPLE | t20 | | | | | 130 | 1 | 5 | 4 | 4 | S | 5 | 0.74 | 4 | 3 |
| EXAMPLE | t21 | | | | | 130 | 1 | 5 | 4 | 4 | S | 5 | 0.75 | 4 | 3 |
| EXAMPLE | t22 | | | | | 130 | 1 | 5 | 5 | 4 | S | 5 | 0.75 | 4 | 3 |
| EXAMPLE | t23 | | | | | 130 | 1 | 5 | 5 | 5 | S | 5 | 0.74 | 4 | 3 |
| EXAMPLE | t24 | Q1 | 5 | | | 130 | 1 | 4 | 3 | 3 | S | 5 | 0.78 | 4 | 4 |
| EXAMPLE | t25 | Q1 | 5 | | | 130 | 1 | 4 | 3 | 3 | S | 5 | 0.79 | 4 | 4 |

TABLE 19

| | | POLY-ETHYLENE WAX (Q) | | CARBON BLACK (P1) | | DRYING TEMPERATURE °C. | THICKNESS μm | AFTER FILM FORMATION | | | | | | | |
|---|---|---|---|---|---|---|---|---|---|---|---|---|---|---|---|
| | | | | | | | | CORROSION RESISTANCE OF WORKED | | | CONDUCTIVITY | WORKING ADHESIO | EMISSIVITY | SCRATCH RESISTANCE | |
| No. | | TYPE | CONTENT | TYPE | CONTENT | | | 24 h | 72 h | 120 h | | | | 5 RECIPROCATIONS | 10 RECIPROCATIONS |
| EXAMPLE | t26 | Q1 | 5 | | | 130 | 1 | 4 | 4 | 3 | S | 5 | 0.79 | 4 | 4 |
| EXAMPLE | t27 | Q1 | 5 | | | 130 | 1 | 5 | 4 | 3 | S | 5 | 0.8 | 4 | 4 |
| EXAMPLE | t28 | Q1 | 5 | | | 130 | 0.2 | 4 | 3 | 3 | S | 5 | 0.61 | 3 | 3 |
| EXAMPLE | t29 | Q1 | 5 | | | 130 | 0.3 | 4 | 3 | 3 | S | 5 | 0.62 | 4 | 3 |
| EXAMPLE | t30 | Q1 | 5 | | | 130 | 0.6 | 4 | 4 | 3 | S | 5 | 0.67 | 4 | 3 |
| EXAMPLE | t31 | Q1 | 5 | | | 130 | 2 | 5 | 5 | 4 | A | 4 | 0.85 | 5 | 5 |
| EXAMPLE | t32 | Q1 | 5 | | | 130 | 1 | 5 | 4 | 3 | S | 5 | 0.82 | 5 | 5 |
| EXAMPLE | t33 | Q1 | 5 | | | 130 | 1 | 5 | 4 | 3 | S | 5 | 0.82 | 5 | 5 |
| EXAMPLE | t34 | Q1 | 5 | | | 130 | 1 | 5 | 4 | 4 | S | 5 | 0.82 | 5 | 5 |
| EXAMPLE | t35 | Q1 | 5 | | | 130 | 1 | 5 | 5 | 5 | S | 5 | 0.82 | 5 | 5 |
| EXAMPLE | t36 | | | | | 130 | 1 | 4 | 3 | 3 | S | 5 | 0.8 | 5 | 5 |
| EXAMPLE | t37 | | | | | 130 | 1 | 5 | 4 | 4 | S | 5 | 0.82 | 4 | 3 |
| EXAMPLE | t38 | Q1 | 5 | | | 130 | 0.5 | 5 | 5 | 4 | S | 5 | 0.68 | 4 | 3 |
| EXAMPLE | t39 | Q1 | 5 | P1 | 5 | 130 | 0.5 | 5 | 5 | 4 | S | 5 | 0.7 | 5 | 5 |
| EXAMPLE | t40 | Q1 | 5 | P1 | 10 | 130 | 0.5 | 5 | 4 | 4 | S | 5 | 0.73 | 5 | 5 |
| EXAMPLE | t41 | Q1 | 5 | P1 | 10 | 130 | 0.5 | 5 | 4 | 3 | S | 5 | 0.73 | 5 | 5 |
| EXAMPLE | t42 | Q1 | 5 | | | 130 | 2 | 5 | 5 | 5 | A | 5 | 0.88 | 5 | 5 |
| EXAMPLE | t43 | Q1 | 5 | P1 | 5 | 130 | 2 | 5 | 5 | 5 | A | 5 | 0.9 | 5 | 5 |
| EXAMPLE | t44 | Q1 | 5 | P1 | 10 | 130 | 2 | 5 | 5 | 5 | A | 5 | 0.92 | 5 | 5 |
| EXAMPLE | t45 | Q1 | 5 | P1 | 10 | 130 | 2 | 5 | 5 | 5 | A | 5 | 0.92 | 5 | 5 |
| EXAMPLE | t46 | Q1 | 5 | | | 130 | 4 | 5 | 5 | 5 | B | 5 | 0.87 | 5 | 5 |
| EXAMPLE | t47 | Q1 | 5 | P1 | 5 | 130 | 4 | 5 | 5 | 5 | B | 5 | 0.88 | 5 | 5 |
| EXAMPLE | t48 | Q1 | 5 | P1 | 10 | 130 | 4 | 5 | 5 | 5 | B | 5 | 0.89 | 5 | 5 |
| EXAMPLE | t49 | Q1 | 5 | P1 | 10 | 130 | 4 | 5 | 5 | 5 | B | 5 | 0.89 | 5 | 5 |

TABLE 20

| | | POLY-ETHYLENE WAX (Q) | | CARBON BLACK (P1) | | DRYING TEMPERATURE ° C. | THICKNESS μm | AFTER FILM FORMATION | | | | | | SCRATCH RESISTANCE | |
|---|---|---|---|---|---|---|---|---|---|---|---|---|---|---|---|
| | | | | | | | | CORROSION RESISTANCE OF WORKED PARTS | | | CONDUCTIVITY | WORKING ADHESIO | EMISSIVITY | 5 RECIPROCATIONS | 10 RECIPROCATIONS |
| No. | | TYPE | CONTENT | TYPE | CONTENT | | | 24 h | 72 h | 120 h | | | | | |
| COMPARATIVE EXAMPLE | e1 | | | | | 130 | 0.5 | 2 | 1 | 1 | S | 3 | LESS THAN 0.1 | 2 | 1 |
| COMPARATIVE EXAMPLE | e2 | | | | | 130 | 1 | 3 | 1 | 1 | B | 3 | 0.1 | 3 | 3 |
| COMPARATIVE EXAMPLE | e3 | | | | | 130 | 1 | 3 | 2 | 1 | A | 1 | 0.78 | 3 | 3 |
| COMPARATIVE EXAMPLE | e4 | | | | | 130 | 1 | 3 | 2 | 1 | A | 2 | 0.8 | 3 | 3 |
| COMPARATIVE EXAMPLE | e5 | | | | | 130 | 1 | 3 | 2 | 1 | B | 2 | 0.15 | 3 | 3 |
| COMPARATIVE EXAMPLE | e6 | Q1 | 5 | P1 | 10 | 130 | 0.5 | 4 | 2 | 2 | S | 1 | 0.3 | 4 | 3 |
| COMPARATIVE EXAMPLE | e7 | Q1 | 5 | P1 | 10 | 130 | 2 | 5 | 3 | 3 | E | 1 | 0.6 | 5 | 5 |
| COMPARATIVE EXAMPLE | e8 | Q1 | 5 | P1 | 10 | 130 | 2 | 4 | 2 | 2 | A | 1 | 0.83 | 5 | 5 |
| COMPARATIVE EXAMPLE | e9 | Q1 | 5 | P1 | 10 | 130 | 2 | 3 | 2 | 2 | A | 2 | 0.83 | 5 | 5 |
| COMPARATIVE EXAMPLE | e10 | Q1 | 5 | P1 | 10 | 130 | 2 | 4 | 2 | 2 | E | 1 | 0.65 | 5 | 5 |
| REFERENCE EXAMPLE | e11 | | | NO FILM FORMED | | | | 3 | 2 | 1 | S | — | 0.58 | 2 | 2 |

As shown in Tables 18 to 20, in the surface-treated steel sheets of Examples t1 to t49, corrosion resistance of worked parts was graded 3 or higher, conductivity was graded B or higher, and scratch resistance was graded 3 or higher, which shows excellence.

Example 4

Next, an organic resin film was formed on the surface of the surface-treated steel sheet having the coated layer including zinc and oxides of vanadium, which was manufactured in Example 1, by the method described as follows, thereby forming surface-treated steel sheets (copper sheets) of Examples r1 to r87 and Comparative Examples f1 to f9.

That is, a black water-based paint that includes the resin (A1) shown in Table 21, the curing agent (B1) shown in Table 22, the colorant (C1) shown in Table 23, and any one or both the silica (D1) shown in Table 24 and the lubricant (E1) shown in Table 25 as necessary, was applied onto the surface of the surface-treated steel sheet (copper sheet) having the coated layer including zinc and oxides of vanadium, the resultant was baked and dried, thereby forming an organic resin film.

The water-based paint was manufactured by stirring the resin as the component of the organic resin film, the curing agent (B1), the colorant (C1), and any one or both the silica (D1) and the lubricant (E1) as necessary in water with a disperser to be dissolved and dispersed. In addition, roll coating was used to apply the water-based paint. In addition, as the baking and drying method, a method of heating the steel sheet (copper sheet) formed with the coated layer to the end-point temperature (end-point sheet temperature) shown in Tables 29 to 31 after applying the water-based paint was used.

From each of the surface-treated steel sheets (copper sheets) obtained as described above, a specimen of 50 mm in length and 100 mm in width was cut, and by the method described as follows, as performances after forming the film, appearances (concealing properties, L* value, glossiness), working adhesion, corrosion resistance of worked parts, and scratch resistance were evaluated. The results are shown in Tables 29 to 31.

[Concealing Properties]

The specimens were visually observed, and concealing properties of the painted films were evaluated according to the following evaluation criteria.

[Criteria]

5: Both black color and surface gloss were uniform. The underlayer was not seen through at all.

4: Although black color was uniform, surface gloss was not uniform. The underlayer was not seen through at all.

3: Both black color and surface gloss were not uniform. The underlayer was not seen through at all.

2: Both black color and surface gloss were not uniform and could be easily confirmed. The underlayer was slightly seen through.

1: Both black color and surface gloss were not uniform and could be easily confirmed. The underlayer was clearly seen through.

[Gloss]

The 60-degree gloss value of the specimen was measured using a gloss meter (brand name: Uni Gloss 60 Plus (made by Konica Minolta, Inc.)).

[L* Value]

The L* value of the specimen was measured using a colorimeter CR-400 (made by Konica Minolta, Inc.).

TABLE 21

| No. | RESIN (A1) |
|---|---|
| A11 | POLYESTER RESIN CONTAINING SULFONIC ACID SODIUM GROUP (HYDROXYL NUMBER: 10 mgKOH/g, Tg: 15° C., MOLECULAR WEIGHT: 15000) |
| A12 | POLYURETHANE RESIN CONTAINING CARBOXYL GROUP (TAKELAC WS-5000, MADE BY MITSUI CHEMICALS, INC.) |
| A13 | ACRYLIC RESIN (KANEBINORU KD-5, MADE BY NIPPON NSC LTD.) |

TABLE 22

| No. | CURING AGENT (B1) |
|---|---|
| B11 | MELAMINE RESIN (CYMEL 325, MADE BY NIHON CYTEC INDUSTRIES INC.) |
| B12 | POLYISOCYANATE COMPOUND (TAKENATE WD-725, MADE BY MITSUI CHEMICALS, INC.) |

TABLE 23

| No. | COLORANT (C1) |
|---|---|
| C11 | CARBON BLACK (MA100 MADE BY MITSUBISHI CHEMICAL CORPORATION, PARTICLE DIAMETER OF 24 nm) |

TABLE 24

| No. | SILICA PARTICLES (D1) |
|---|---|
| D11 | GRANULAR SILICA PARTICLES (SNOWTEX N MADE BY NISSAN CHEMICAL INDUSTRIES, LTD., PARTICLE DIAMETER OF 15 nm) |
| D12 | GRANULAR SILICA PARTICLES (HPS-1000 MADE BY TOAGOSEI CO., LTD., PARTICLE DIAMETER OF 1 μm) |

TABLE 25

| No. | LUBRICANT (E1) |
|---|---|
| E11 | POLYETHYLENE RESIN PARTICLES (CHEMIPEARL W700 MADE BY MITSUI CHEMICALS, INC., PARTICLE DIAMETER OF 1.0 μm) |

TABLE 26

| | | | | FILM | | | | | |
|---|---|---|---|---|---|---|---|---|---|
| | | | | RESIN (A1) | | | | CURING AGENT (B1) | |
| No. | COATING | TYPE | AMOUNT (%) | TYPE | AMOUNT (%) | TYPE | AMOUNT (%) | TYPE | AMOUNT (%) |
| EXAMPLE r1 | m40 | A11 | 80 | | | | | B11 | 14 |
| EXAMPLE r2 | m40 | A11 | 72 | | | | | B11 | 12 |
| EXAMPLE r3 | m40 | A11 | 78 | | | | | B11 | 13 |
| EXAMPLE r4 | m40 | A11 | 69 | | | | | B11 | 12 |
| EXAMPLE r5 | m40 | A11 | 66 | | | A13 | 3 | B11 | 12 |
| EXAMPLE r6 | m40 | A11 | 66 | A12 | 3 | | | B11 | 12 |
| EXAMPLE r7 | m40 | A11 | 66 | A12 | 3 | | | B11 | 12 |
| EXAMPLE r8 | m40 | A11 | 65 | A12 | 4 | | | B11 | 12 |
| EXAMPLE r9 | m40 | A11 | 65 | A12 | 4 | | | B11 | 12 |
| EXAMPLE r10 | m40 | A11 | 35 | A12 | 34 | | | B11 | 12 |
| EXAMPLE r11 | m40 | A11 | 33 | A12 | 36 | | | B11 | 12 |
| EXAMPLE r12 | m40 | A11 | 52 | A12 | 15 | A13 | 2 | B11 | 12 |
| EXAMPLE r13 | m15 | A11 | 67 | | | A13 | 2 | B11 | 12 |
| EXAMPLE r14 | m40 | A11 | 67 | | | A13 | 2 | B11 | 12 |
| EXAMPLE r15 | m10 | A11 | 67 | | | A13 | 2 | B11 | 12 |
| EXAMPLE r16 | m38 | A11 | 67 | | | A13 | 2 | B11 | 12 |
| EXAMPLE r17 | m23 | A11 | 67 | | | A13 | 2 | B11 | 12 |
| EXAMPLE r18 | m40 | A11 | 76 | | | A13 | 2 | B11 | 3 |
| EXAMPLE r19 | m40 | A11 | 75 | | | A13 | 2 | B11 | 4 |
| EXAMPLE r20 | m40 | A11 | 71 | | | A13 | 2 | B11 | 8 |
| EXAMPLE r21 | m40 | A11 | 63 | | | A13 | 2 | B11 | 16 |
| EXAMPLE r22 | m40 | A11 | 59 | | | A13 | 2 | B11 | 20 |
| EXAMPLE r23 | m40 | A11 | 55 | | | A13 | 2 | B11 | 24 |
| EXAMPLE r24 | m40 | A11 | 69 | | | A13 | 2 | B11 | 12 |
| EXAMPLE r25 | m40 | A11 | 68 | | | A13 | 2 | B11 | 12 |
| EXAMPLE r26 | m40 | A11 | 65 | | | A13 | 2 | B11 | 12 |
| EXAMPLE r27 | m40 | A11 | 64 | | | A13 | 2 | B11 | 11 |
| EXAMPLE r28 | m40 | A11 | 59 | | | A13 | 2 | B11 | 11 |
| EXAMPLE r29 | m40 | A11 | 58 | | | A13 | 2 | B11 | 10 |
| EXAMPLE r30 | m40 | A11 | 73 | | | A13 | 2 | B11 | 13 |
| EXAMPLE r31 | m40 | A11 | 71 | | | A13 | 2 | B11 | 13 |
| EXAMPLE r32 | m40 | A11 | 59 | | | A13 | 2 | B11 | 11 |

TABLE 26-continued

| | | | | AMOUNT | | | AMOUNT | | AMOUNT |
|---|---|---|---|---|---|---|---|---|---|
| EXAMPLE | r33 | m40 | A11 | 58 | | A13 | 2 | B11 | 10 |
| EXAMPLE | r34 | m40 | A11 | 58 | | A13 | 2 | B11 | 10 |
| EXAMPLE | r35 | m40 | A11 | 58 | | A13 | 2 | B11 | 11 |
| EXAMPLE | r36 | m40 | A11 | 50 | | A13 | 2 | B11 | 9 |
| EXAMPLE | r37 | m40 | A11 | 46 | | A13 | 2 | B11 | 8 |
| EXAMPLE | r38 | m40 | A11 | 67 | | A13 | 2 | B11 | 12 |
| EXAMPLE | r39 | m40 | A11 | 65 | | A13 | 2 | B11 | 12 |

| | | FILM | | | | | | |
|---|---|---|---|---|---|---|---|---|
| | | COLORANT (C1) | | SILICA PARTICLES (D1) | | | | LUBRICANT (E1) |
| | | TYPE | AMOUNT (%) | TYPE | AMOUNT (%) | TYPE | AMOUNT (%) | TYPE | AMOUNT (%) |
| EXAMPLE | r1 | C11 | 6 | | | | | | |
| EXAMPLE | r2 | C11 | 6 | D11 | 10 | | | | |
| EXAMPLE | r3 | C11 | 6 | | | | | E11 | 3 |
| EXAMPLE | r4 | C11 | 6 | D11 | 10 | | | E11 | 3 |
| EXAMPLE | r5 | C11 | 6 | D11 | 10 | | | E11 | 3 |
| EXAMPLE | r6 | C11 | 6 | D11 | 10 | | | E11 | 3 |
| EXAMPLE | r7 | C11 | 6 | D11 | 5 | D12 | 5 | E11 | 3 |
| EXAMPLE | r8 | C11 | 6 | D11 | 10 | | | E11 | 3 |
| EXAMPLE | r9 | C11 | 6 | D11 | 5 | D12 | 5 | E11 | 3 |
| EXAMPLE | r10 | C11 | 6 | D11 | 10 | | | E11 | 3 |
| EXAMPLE | r11 | C11 | 6 | D11 | 10 | | | E11 | 3 |
| EXAMPLE | r12 | C11 | 6 | D11 | 10 | | | E11 | 3 |
| EXAMPLE | r13 | C11 | 6 | D11 | 10 | | | E11 | 3 |
| EXAMPLE | r14 | C11 | 6 | D11 | 10 | | | E11 | 3 |
| EXAMPLE | r15 | C11 | 6 | D11 | 10 | | | E11 | 3 |
| EXAMPLE | r16 | C11 | 6 | D11 | 10 | | | E11 | 3 |
| EXAMPLE | r17 | C11 | 6 | D11 | 10 | | | E11 | 3 |
| EXAMPLE | r18 | C11 | 6 | D11 | 10 | | | E11 | 3 |
| EXAMPLE | r19 | C11 | 6 | D11 | 10 | | | E11 | 3 |
| EXAMPLE | r20 | C11 | 6 | D11 | 10 | | | E11 | 3 |
| EXAMPLE | r21 | C11 | 6 | D11 | 10 | | | E11 | 3 |
| EXAMPLE | r22 | C11 | 6 | D11 | 10 | | | E11 | 3 |
| EXAMPLE | r23 | C11 | 6 | D11 | 10 | | | E11 | 3 |
| EXAMPLE | r24 | C11 | 4 | D11 | 10 | | | E11 | 3 |
| EXAMPLE | r25 | C11 | 5 | D11 | 10 | | | E11 | 3 |
| EXAMPLE | r26 | C11 | 8 | D11 | 10 | | | E11 | 3 |
| EXAMPLE | r27 | C11 | 10 | D11 | 10 | | | E11 | 3 |
| EXAMPLE | r28 | C11 | 15 | D11 | 10 | | | E11 | 3 |
| EXAMPLE | r29 | C11 | 17 | D11 | 10 | | | E11 | 3 |
| EXAMPLE | r30 | C11 | 6 | D11 | 3 | | | E11 | 3 |
| EXAMPLE | r31 | C11 | 6 | D11 | 5 | | | E11 | 3 |
| EXAMPLE | r32 | C11 | 15 | D11 | 5 | D12 | 5 | E11 | 3 |
| EXAMPLE | r33 | C11 | 17 | D11 | 5 | D12 | 5 | E11 | 3 |
| EXAMPLE | r34 | C11 | 17 | | | D12 | 10 | E11 | 3 |
| EXAMPLE | r35 | C11 | 6 | D11 | 20 | | | E11 | 3 |
| EXAMPLE | r36 | C11 | 6 | D11 | 30 | | | E11 | 3 |
| EXAMPLE | r37 | C11 | 6 | D11 | 35 | | | E11 | 3 |
| EXAMPLE | r38 | C11 | 6 | D11 | 10 | | | E11 | 3 |
| EXAMPLE | r39 | C11 | 6 | D11 | 10 | | | E11 | 5 |

TABLE 27

| | | FILM | | | | | | | |
|---|---|---|---|---|---|---|---|---|---|
| | | RESIN (A1) | | | | | | CURING AGENT (B1) | |
| No. | COATING | TYPE | AMOUNT (%) | TYPE | AMOUNT (%) | TYPE | AMOUNT (%) | TYPE | AMOUNT (%) |
| EXAMPLE r40 | m40 | A11 | 64 | | | A13 | 2 | B11 | 12 |
| EXAMPLE r41 | m40 | A11 | 61 | | | A13 | 2 | B11 | 11 |
| EXAMPLE r42 | m40 | A11 | 59 | | | A13 | 2 | B11 | 11 |
| EXAMPLE r43 | m40 | A11 | 65 | | | A13 | 2 | B11 | 12 |
| EXAMPLE r44 | m40 | A11 | 64 | | | A13 | 2 | B11 | 11 |
| EXAMPLE r45 | m40 | A11 | 59 | | | A13 | 2 | B11 | 11 |
| EXAMPLE r46 | m40 | A11 | 58 | | | A13 | 2 | B11 | 10 |
| EXAMPLE r47 | m40 | A11 | 65 | | | A13 | 2 | B11 | 12 |
| EXAMPLE r48 | m40 | A11 | 64 | | | A13 | 2 | B11 | 11 |
| EXAMPLE r49 | m40 | A11 | 59 | | | A13 | 2 | B11 | 11 |
| EXAMPLE r50 | m40 | A11 | 58 | | | A13 | 2 | B11 | 10 |
| EXAMPLE r51 | m40 | A11 | 70 | | | A13 | 2 | B11 | 12 |

TABLE 27-continued

| | | | | | | | | | | |
|---|---|---|---|---|---|---|---|---|---|---|
| EXAMPLE | r52 | m40 | A11 | 59 | | | A13 | 2 | B11 | 11 |
| EXAMPLE | r53 | m40 | A11 | 58 | | | A13 | 2 | B11 | 10 |
| EXAMPLE | r54 | m40 | A11 | 70 | | | A13 | 2 | B11 | 12 |
| EXAMPLE | r55 | m40 | A11 | 59 | | | A13 | 2 | B11 | 11 |
| EXAMPLE | r56 | m40 | A11 | 58 | | | A13 | 2 | B11 | 10 |
| EXAMPLE | r57 | m40 | A11 | 58 | | | A13 | 2 | B11 | 10 |
| EXAMPLE | r58 | m40 | A11 | 58 | | | A13 | 2 | B11 | 10 |
| EXAMPLE | r59 | m40 | A11 | 58 | | | A13 | 2 | B11 | 10 |
| EXAMPLE | r60 | m40 | A11 | 70 | | | A13 | 2 | B12 | 10 |
| EXAMPLE | r61 | m40 | A11 | 67 | | | A13 | 2 | B11 | 12 |
| EXAMPLE | r62 | m40 | A11 | 67 | | | A13 | 2 | B11 | 12 |
| EXAMPLE | r63 | m40 | A11 | 67 | | | A13 | 2 | B11 | 12 |
| EXAMPLE | r64 | m40 | A11 | 67 | | | A13 | 2 | B11 | 12 |
| EXAMPLE | r65 | m40 | A11 | 67 | | | A13 | 2 | B11 | 12 |
| EXAMPLE | r66 | m40 | A11 | 67 | | | A13 | 2 | B11 | 12 |
| EXAMPLE | r67 | m40 | A11 | 67 | | | A13 | 2 | B11 | 12 |
| EXAMPLE | r68 | m40 | A11 | 67 | | | A13 | 2 | B11 | 12 |
| EXAMPLE | r69 | m40 | A11 | 69 | | | | | B11 | 12 |
| EXAMPLE | r70 | m40 | A11 | 52 | A12 | 15 | A13 | 2 | B11 | 12 |
| EXAMPLE | r71 | m15 | A11 | 67 | | | A13 | 2 | B11 | 12 |
| EXAMPLE | r72 | m10 | A11 | 67 | | | A13 | 2 | B11 | 12 |
| EXAMPLE | r73 | m38 | A11 | 67 | | | A13 | 2 | B11 | 12 |
| EXAMPLE | r74 | m23 | A11 | 67 | | | A13 | 2 | B11 | 12 |
| EXAMPLE | r75 | m15 | A11 | 67 | | | A13 | 2 | B11 | 12 |
| EXAMPLE | r76 | m10 | A11 | 67 | | | A13 | 2 | B11 | 12 |
| EXAMPLE | r77 | m38 | A11 | 67 | | | A13 | 2 | B11 | 12 |
| EXAMPLE | r78 | m23 | A11 | 67 | | | A13 | 2 | B11 | 12 |
| EXAMPLE | r79 | m15 | A11 | 52 | A12 | 15 | A13 | 2 | B11 | 12 |
| EXAMPLE | r80 | m10 | A11 | 52 | A12 | 15 | A13 | 2 | B11 | 12 |
| EXAMPLE | r81 | m38 | A11 | 52 | A12 | 15 | A13 | 2 | B11 | 12 |
| EXAMPLE | r82 | m23 | A11 | 52 | A12 | 15 | A13 | 2 | B11 | 12 |
| EXAMPLE | r83 | m40 | A11 | 71.5 | | | A13 | 2 | B11 | 12 |
| EXAMPLE | r84 | m40 | A11 | 70 | | | A13 | 2 | B11 | 12 |
| EXAMPLE | r85 | m40 | A11 | 68 | | | A13 | 2 | B11 | 11 |
| EXAMPLE | r86 | m40 | A11 | 58 | | | A13 | 2 | B11 | 10 |
| EXAMPLE | r87 | m40 | A11 | 58 | | | A13 | 2 | B11 | 10 |

| | | FILM | | | | | | |
|---|---|---|---|---|---|---|---|---|
| | | COLORANT (C1) | | SILICA PARTICLES (D1) | | | | LUBRICANT (E1) |
| | | TYPE | AMOUNT (%) | TYPE | AMOUNT (%) | TYPE | AMOUNT (%) | TYPE | AMOUNT (%) |
| EXAMPLE | r40 | C11 | 6 | D11 | 10 | | | E11 | 6 |
| EXAMPLE | r41 | C11 | 6 | D11 | 10 | | | E11 | 10 |
| EXAMPLE | r42 | C11 | 6 | D11 | 10 | | | E11 | 12 |
| EXAMPLE | r43 | C11 | 8 | D11 | 10 | | | E11 | 3 |
| EXAMPLE | r44 | C11 | 10 | D11 | 10 | | | E11 | 3 |
| EXAMPLE | r45 | C11 | 15 | D11 | 10 | | | E11 | 3 |
| EXAMPLE | r46 | C11 | 17 | D11 | 10 | | | E11 | 3 |
| EXAMPLE | r47 | C11 | 8 | D11 | 10 | | | E11 | 3 |
| EXAMPLE | r48 | C11 | 10 | D11 | 10 | | | E11 | 3 |
| EXAMPLE | r49 | C11 | 15 | D11 | 10 | | | E11 | 3 |
| EXAMPLE | r50 | C11 | 17 | D11 | 10 | | | E11 | 3 |
| EXAMPLE | r51 | C11 | 3 | D11 | 10 | | | E11 | 3 |
| EXAMPLE | r52 | C11 | 15 | D11 | 10 | | | E11 | 3 |
| EXAMPLE | r53 | C11 | 17 | D11 | 10 | | | E11 | 3 |
| EXAMPLE | r54 | C11 | 3 | D11 | 10 | | | E11 | 3 |
| EXAMPLE | r55 | C11 | 15 | D11 | 10 | | | E11 | 3 |
| EXAMPLE | r56 | C11 | 17 | D11 | 10 | | | E11 | 3 |
| EXAMPLE | r57 | C11 | 17 | D11 | 5 | D12 | 5 | E11 | 3 |
| EXAMPLE | r58 | C11 | 17 | | | D12 | 10 | E11 | 3 |
| EXAMPLE | r59 | C11 | 15 | | | D12 | 10 | E11 | 3 |
| EXAMPLE | r60 | C11 | 10 | D11 | 5 | | | E11 | 3 |
| EXAMPLE | r61 | C11 | 6 | D11 | 10 | | | E11 | 3 |
| EXAMPLE | r62 | C11 | 6 | D11 | 10 | | | E11 | 3 |
| EXAMPLE | r63 | C11 | 6 | D11 | 10 | | | E11 | 3 |
| EXAMPLE | r64 | C11 | 6 | D11 | 10 | | | E11 | 3 |
| EXAMPLE | r65 | C11 | 6 | D11 | 10 | | | E11 | 3 |
| EXAMPLE | r66 | C11 | 6 | D11 | 10 | | | E11 | 3 |
| EXAMPLE | r67 | C11 | 6 | D11 | 10 | | | E11 | 3 |
| EXAMPLE | r68 | C11 | 6 | D11 | 10 | | | E11 | 3 |
| EXAMPLE | r69 | C11 | 6 | D11 | 10 | | | E11 | 3 |
| EXAMPLE | r70 | C11 | 6 | D11 | 10 | | | E11 | 3 |
| EXAMPLE | r71 | C11 | 6 | D11 | 10 | | | E11 | 3 |
| EXAMPLE | r72 | C11 | 6 | D11 | 10 | | | E11 | 3 |
| EXAMPLE | r73 | C11 | 6 | D11 | 10 | | | E11 | 3 |
| EXAMPLE | r74 | C11 | 6 | D11 | 10 | | | E11 | 3 |
| EXAMPLE | r75 | C11 | 6 | D11 | 10 | | | E11 | 3 |

TABLE 27-continued

| | | | | | | | | | |
|---|---|---|---|---|---|---|---|---|---|
| EXAMPLE | r76 | C11 | 6 | D11 | 10 | | | E11 | 3 |
| EXAMPLE | r77 | C11 | 6 | D11 | 10 | | | E11 | 3 |
| EXAMPLE | r78 | C11 | 6 | D11 | 10 | | | E11 | 3 |
| EXAMPLE | r79 | C11 | 6 | D11 | 10 | | | E11 | 3 |
| EXAMPLE | r80 | C11 | 6 | D11 | 10 | | | E11 | 3 |
| EXAMPLE | r81 | C11 | 6 | D11 | 10 | | | E11 | 3 |
| EXAMPLE | r82 | C11 | 6 | D11 | 10 | | | E11 | 3 |
| EXAMPLE | r83 | C11 | 1.5 | D11 | 10 | | | E11 | 3 |
| EXAMPLE | r84 | C11 | 3 | D11 | 10 | | | E11 | 3 |
| EXAMPLE | r85 | C11 | 6 | D11 | 10 | | | E11 | 3 |
| EXAMPLE | r86 | C11 | 17 | D11 | 10 | | | E11 | 3 |
| EXAMPLE | r87 | C11 | 17 | D11 | 5 | D12 | 5 | E11 | 3 |

TABLE 28

| | | | FILM | | | | | | |
|---|---|---|---|---|---|---|---|---|---|
| | | | RESIN (A1) | | | | | | CURING AGENT (B1) |
| No. | | COATING | TYPE | AMOUNT (%) | TYPE | AMOUNT (%) | TYPE | AMOUNT (%) | TYPE | AMOUNT (%) |
| COMPARATIVE EXAMPLE | f1 | x1 | A11 | 67 | | | A13 | 2 | B11 | 12 |
| COMPARATIVE EXAMPLE | f2 | x2 | A11 | 67 | | | A13 | 2 | B11 | 12 |
| COMPARATIVE EXAMPLE | f3 | x3 | A11 | 67 | | | A13 | 2 | B11 | 12 |
| COMPARATIVE EXAMPLE | f4 | x5 | A11 | 67 | | | A13 | 2 | B11 | 12 |
| COMPARATIVE EXAMPLE | f5 | x11 | A11 | 67 | | | A13 | 2 | B11 | 12 |
| REFERENCE EXAMPLE | f6 | m40 | A11 | 73 | | | A13 | 2 | B11 | 12 |
| REFERENCE EXAMPLE | f7 | m40 | A11 | 81 | | | | | | |
| REFERENCE EXAMPLE | f8 | m40 | | | | | A13 | 69 | B11 | 12 |
| REFERENCE EXAMPLE | f9 | m40 | NO PAINTED FILM | | | | | | | |

| | | FILM | | | | | | |
|---|---|---|---|---|---|---|---|---|
| | | COLORANT (C1) | | SILICA PARTICLES (D1) | | | | LUBRICANT (E1) |
| | | TYPE | AMOUNT (%) | TYPE | AMOUNT (%) | TYPE | AMOUNT (%) | TYPE | AMOUNT (%) |
| COMPARATIVE EXAMPLE | f1 | C11 | 6 | D11 | 10 | | | E11 | 3 |
| COMPARATIVE EXAMPLE | f2 | C11 | 6 | D11 | 10 | | | E11 | 3 |
| COMPARATIVE EXAMPLE | f3 | C11 | 6 | D11 | 10 | | | E11 | 3 |
| COMPARATIVE EXAMPLE | f4 | C11 | 6 | D11 | 10 | | | E11 | 3 |
| COMPARATIVE EXAMPLE | f5 | C11 | 6 | D11 | 10 | | | E11 | 3 |
| REFERENCE EXAMPLE | f6 | | | D11 | 10 | | | E11 | 3 |
| REFERENCE EXAMPLE | f7 | C11 | 6 | D11 | 10 | | | E11 | 3 |
| REFERENCE EXAMPLE | f8 | C11 | 6 | D11 | 10 | | | E11 | 3 |
| REFERENCE EXAMPLE | f9 | | | NO PAINTED FILM | | | | | |

|  | No. | THICK-NESS (μm) | PIGMENT CONCEN-TRATION × THICKNESS | END-POINT SHEET TEMPER-ATURE (° C.) | AFTER FILM FORMATION |  |  |  |  |  |  | SCRATCH |  |
|---|---|---|---|---|---|---|---|---|---|---|---|---|---|
|  |  |  |  |  | APPEARANCE |  |  |  | CORROSION |  |  | 5 | 10 |
|  |  |  |  |  | CONCEALING PROPERTIES | L* | GLOSS-INESS | WORKING ADHESION | 24 TIME | 72 TIME | 120 TIME | RECIPRO-CATIONS | RECIPRO-CATIONS |
| EXAMPLE | r1 | 3 | 18 | 200 | 5 | 21 | 25 | 5 | 5 | 5 | 5 | 4 | 3 |
| EXAMPLE | r2 | 3 | 18 | 200 | 5 | 21 | 20 | 5 | 5 | 5 | 5 | 4 | 4 |
| EXAMPLE | r3 | 3 | 18 | 200 | 5 | 22 | 24 | 5 | 5 | 5 | 5 | 4 | 4 |
| EXAMPLE | r4 | 3 | 18 | 200 | 5 | 21 | 14 | 5 | 5 | 5 | 5 | 5 | 4 |
| EXAMPLE | r5 | 3 | 18 | 200 | 5 | 21 | 16 | 5 | 5 | 5 | 5 | 5 | 4 |
| EXAMPLE | r6 | 3 | 18 | 200 | 5 | 21 | 13 | 5 | 5 | 5 | 5 | 5 | 5 |
| EXAMPLE | r7 | 3 | 18 | 200 | 5 | 21 | 18 | 5 | 5 | 5 | 5 | 5 | 5 |
| EXAMPLE | r8 | 3 | 18 | 200 | 5 | 21 | 13 | 5 | 5 | 5 | 5 | 5 | 5 |
| EXAMPLE | r9 | 3 | 18 | 200 | 5 | 21 | 18 | 5 | 5 | 5 | 5 | 5 | 5 |
| EXAMPLE | r10 | 3 | 18 | 200 | 5 | 21 | 12 | 5 | 5 | 5 | 5 | 5 | 5 |
| EXAMPLE | r11 | 3 | 18 | 200 | 5 | 21 | 12 | 5 | 5 | 5 | 5 | 5 | 5 |
| EXAMPLE | r12 | 3 | 18 | 200 | 5 | 21 | 15 | 5 | 5 | 5 | 4 | 5 | 4 |
| EXAMPLE | r13 | 3 | 18 | 200 | 5 | 25 | 18 | 5 | 5 | 4 | 3 | 5 | 5 |
| EXAMPLE | r14 | 3 | 18 | 200 | 5 | 23 | 16 | 5 | 5 | 5 | 5 | 5 | 5 |
| EXAMPLE | r15 | 3 | 18 | 200 | 5 | 20 | 14 | 5 | 5 | 5 | 5 | 5 | 5 |
| EXAMPLE | r16 | 3 | 18 | 200 | 5 | 18 | 6 | 5 | 5 | 5 | 5 | 5 | 5 |
| EXAMPLE | r17 | 3 | 18 | 200 | 3 | 21 | 7 | 5 | 5 | 4 | 5 | 5 | 5 |
| EXAMPLE | r18 | 3 | 18 | 200 | 4 | 21 | 16 | 5 | 5 | 5 | 4 | 5 | 4 |
| EXAMPLE | r19 | 3 | 18 | 200 | 5 | 21 | 16 | 5 | 5 | 5 | 4 | 5 | 4 |
| EXAMPLE | r20 | 3 | 18 | 200 | 5 | 21 | 16 | 5 | 5 | 5 | 4 | 5 | 4 |
| EXAMPLE | r21 | 3 | 18 | 200 | 5 | 21 | 16 | 5 | 5 | 4 | 4 | 5 | 4 |
| EXAMPLE | r22 | 3 | 18 | 200 | 5 | 21 | 16 | 4 | 5 | 4 | 4 | 5 | 4 |
| EXAMPLE | r23 | 3 | 18 | 200 | 5 | 21 | 16 | 4 | 5 | 4 | 4 | 5 | 4 |
| EXAMPLE | r24 | 3 | 12 | 200 | 4 | 25 | 12 | 5 | 5 | 4 | 4 | 5 | 5 |
| EXAMPLE | r25 | 3 | 15 | 200 | 4 | 23 | 14 | 5 | 5 | 4 | 4 | 5 | 5 |
| EXAMPLE | r26 | 3 | 24 | 200 | 5 | 20 | 17 | 5 | 5 | 4 | 4 | 5 | 4 |
| EXAMPLE | r27 | 3 | 30 | 200 | 5 | 19 | 19 | 5 | 5 | 4 | 4 | 5 | 4 |
| EXAMPLE | r28 | 3 | 45 | 200 | 5 | 17 | 22 | 5 | 5 | 5 | 4 | 4 | 3 |
| EXAMPLE | r29 | 3 | 51 | 200 | 5 | 16 | 23 | 5 | 5 | 5 | 4 | 4 | 3 |
| EXAMPLE | r30 | 3 | 18 | 200 | 5 | 21 | 25 | 5 | 5 | 4 | 4 | 4 | 3 |
| EXAMPLE | r31 | 3 | 18 | 200 | 5 | 21 | 21 | 5 | 5 | 5 | 4 | 4 | 3 |
| EXAMPLE | r32 | 3 | 45 | 200 | 5 | 18 | 18 | 5 | 5 | 5 | 4 | 5 | 4 |
| EXAMPLE | r33 | 3 | 51 | 200 | 5 | 17 | 19 | 5 | 5 | 5 | 4 | 5 | 4 |
| EXAMPLE | r34 | 3 | 51 | 200 | 5 | 18 | 17 | 5 | 5 | 5 | 4 | 5 | 5 |
| EXAMPLE | r35 | 3 | 18 | 200 | 5 | 21 | 15 | 5 | 5 | 5 | 4 | 5 | 4 |
| EXAMPLE | r36 | 3 | 18 | 200 | 5 | 21 | 13 | 5 | 5 | 4 | 4 | 5 | 5 |
| EXAMPLE | r37 | 3 | 18 | 200 | 5 | 21 | 12 | 5 | 5 | 5 | 4 | 5 | 5 |
| EXAMPLE | r38 | 3 | 18 | 200 | 5 | 21 | 16 | 5 | 5 | 4 | 4 | 5 | 4 |
| EXAMPLE | r39 | 3 | 18 | 200 | 5 | 21 | 17 | 5 | 5 | 5 | 4 | 5 | 4 |

TABLE 30

|  | No. | THICK-NESS (μm) | PIGMENT CONCEN-TRATION × THICKNESS | END-POINT SHEET TEMPER-ATURE (° C.) | AFTER FILM FORMATION |  |  |  |  |  |  | SCRATCH |  |
|---|---|---|---|---|---|---|---|---|---|---|---|---|---|
|  |  |  |  |  | APPEARANCE |  |  |  | CORROSION |  |  | 5 | 10 |
|  |  |  |  |  | CONCEALING PROPERTIES | L* | GLOSS-INESS | WORKING ADHESION | 24 TIME | 72 TIME | 120 TIME | RECIPRO-CATIONS | RECIPRO-CATIONS |
| EXAMPLE | r40 | 3 | 18 | 200 | 5 | 21 | 16 | 5 | 5 | 5 | 4 | 5 | 4 |
| EXAMPLE | r41 | 3 | 18 | 200 | 5 | 21 | 16 | 5 | 5 | 5 | 4 | 5 | 4 |
| EXAMPLE | r42 | 3 | 18 | 200 | 5 | 21 | 16 | 5 | 5 | 5 | 4 | 5 | 4 |
| EXAMPLE | r43 | 2 | 16 | 200 | 4 | 23 | 10 | 5 | 5 | 4 | 4 | 5 | 4 |
| EXAMPLE | r44 | 2 | 20 | 200 | 5 | 22 | 15 | 5 | 5 | 4 | 4 | 4 | 4 |
| EXAMPLE | r45 | 2 | 30 | 200 | 5 | 20 | 15 | 5 | 5 | 4 | 4 | 4 | 3 |
| EXAMPLE | r46 | 2 | 34 | 200 | 5 | 19 | 18 | 5 | 5 | 4 | 3 | 4 | 3 |
| EXAMPLE | r47 | 1 | 8 | 200 | 3 | 26 | 9 | 5 | 4 | 3 | 3 | 4 | 3 |
| EXAMPLE | r48 | 1 | 10 | 200 | 3 | 25 | 13 | 5 | 4 | 3 | 3 | 4 | 3 |
| EXAMPLE | r49 | 1 | 15 | 200 | 4 | 23 | 15 | 5 | 4 | 3 | 3 | 3 | 3 |
| EXAMPLE | r50 | 1 | 17 | 200 | 4 | 22 | 15 | 5 | 4 | 3 | 3 | 3 | 3 |
| EXAMPLE | r51 | 6 | 18 | 200 | 5 | 21 | 14 | 5 | 5 | 5 | 5 | 5 | 5 |
| EXAMPLE | r52 | 6 | 90 | 200 | 5 | 16 | 23 | 5 | 5 | 5 | 5 | 4 | 3 |
| EXAMPLE | r53 | 6 | 102 | 200 | 5 | 17 | 24 | 4 | 5 | 5 | 5 | 4 | 3 |
| EXAMPLE | r54 | 10 | 30 | 200 | 5 | 20 | 18 | 4 | 5 | 5 | 5 | 5 | 4 |
| EXAMPLE | r55 | 10 | 150 | 200 | 5 | 15 | 26 | 4 | 5 | 5 | 5 | 4 | 3 |

TABLE 30-continued

| | | THICK-NESS (μm) | PIGMENT CONCEN-TRATION × THICKNESS | END-POINT SHEET TEMPER-ATURE (° C.) | AFTER FILM FORMATION | | | | CORROSION | | | SCRATCH | |
|---|---|---|---|---|---|---|---|---|---|---|---|---|---|
| | | | | | APPEARANCE | | | | | | | 5 | 10 |
| No. | | | | | CONCEALING PROPERTIES | L* | GLOSS-INESS | WORKING ADHESION | 24 TIME | 72 TIME | 120 TIME | RECIPRO-CATIONS | RECIPRO-CATIONS |
| EXAMPLE | r56 | 10 | 170 | 200 | 5 | 16 | 27 | 4 | 5 | 5 | 5 | 4 | 3 |
| EXAMPLE | r57 | 10 | 170 | 200 | 5 | 17 | 23 | 4 | 5 | 5 | 5 | 5 | 4 |
| EXAMPLE | r58 | 10 | 170 | 200 | 5 | 19 | 20 | 4 | 5 | 5 | 5 | 5 | 5 |
| EXAMPLE | r59 | 13 | 195 | 200 | 5 | 18 | 22 | 4 | 5 | 5 | 4 | 5 | 5 |
| EXAMPLE | r60 | 3 | 30 | 200 | 5 | 21 | 16 | 4 | 5 | 4 | 3 | 4 | 4 |
| EXAMPLE | r61 | 3 | 18 | 140 | 5 | 23 | 16 | 5 | 5 | 4 | 3 | 5 | 4 |
| EXAMPLE | r62 | 3 | 18 | 150 | 5 | 23 | 16 | 5 | 5 | 4 | 4 | 5 | 4 |
| EXAMPLE | r63 | 3 | 18 | 160 | 5 | 23 | 17 | 5 | 5 | 5 | 4 | 5 | 4 |
| EXAMPLE | r64 | 3 | 18 | 180 | 5 | 22 | 18 | 5 | 5 | 5 | 4 | 5 | 4 |
| EXAMPLE | r65 | 3 | 18 | 220 | 5 | 22 | 19 | 4 | 5 | 5 | 5 | 5 | 4 |
| EXAMPLE | r66 | 3 | 18 | 230 | 5 | 22 | 21 | 4 | 5 | 5 | 5 | 4 | 3 |
| EXAMPLE | r67 | 3 | 18 | 250 | 5 | 21 | 21 | 4 | 5 | 5 | 5 | 4 | 3 |
| EXAMPLE | r68 | 3 | 18 | 260 | 5 | 19 | 20 | 4 | 5 | 5 | 5 | 5 | 4 |
| EXAMPLE | r69 | 3 | 18 | 200 | 5 | 21 | 15 | 5 | 5 | 5 | 5 | 5 | 4 |
| EXAMPLE | r70 | 3 | 18 | 200 | 5 | 21 | 16 | 5 | 5 | 5 | 4 | 5 | 4 |
| EXAMPLE | r71 | 3 | 18 | 200 | 5 | 25 | 18 | 5 | 5 | 4 | 3 | 5 | 4 |
| EXAMPLE | r72 | 3 | 18 | 200 | 5 | 20 | 14 | 5 | 5 | 5 | 5 | 5 | 5 |
| EXAMPLE | r73 | 3 | 18 | 200 | 5 | 18 | 6 | 5 | 5 | 4 | 5 | 5 | 5 |
| EXAMPLE | r74 | 3 | 18 | 200 | 5 | 21 | 7 | 5 | 5 | 4 | 5 | 5 | 5 |
| EXAMPLE | r75 | 3 | 18 | 200 | 5 | 25 | 18 | 5 | 5 | 5 | 3 | 5 | 4 |
| EXAMPLE | r76 | 3 | 18 | 200 | 5 | 20 | 14 | 5 | 5 | 5 | 5 | 5 | 5 |
| EXAMPLE | r77 | 3 | 18 | 200 | 5 | 18 | 6 | 5 | 5 | 5 | 5 | 5 | 5 |
| EXAMPLE | r78 | 3 | 18 | 200 | 5 | 21 | 7 | 5 | 5 | 5 | 5 | 5 | 5 |
| EXAMPLE | r79 | 3 | 18 | 200 | 5 | 25 | 17 | 5 | 5 | 5 | 3 | 5 | 4 |
| EXAMPLE | r80 | 3 | 18 | 200 | 5 | 20 | 13 | 5 | 5 | 5 | 5 | 5 | 5 |
| EXAMPLE | r81 | 3 | 18 | 200 | 5 | 18 | 5 | 5 | 5 | 5 | 5 | 5 | 5 |
| EXAMPLE | r82 | 3 | 18 | 200 | 5 | 21 | 6 | 5 | 5 | 5 | 5 | 5 | 5 |
| EXAMPLE | r83 | 3 | 4.5 | 200 | 3 | 28 | 12 | 5 | 5 | 5 | 5 | 5 | 5 |
| EXAMPLE | r84 | 3 | 9 | 200 | 3 | 25 | 14 | 5 | 5 | 5 | 5 | 5 | 5 |
| EXAMPLE | r85 | 3 | 18 | 200 | 5 | 21 | 16 | 5 | 5 | 5 | 5 | 5 | 4 |
| EXAMPLE | r86 | 3 | 51 | 200 | 5 | 16 | 22 | 5 | 5 | 5 | 5 | 4 | 3 |
| EXAMPLE | r87 | 3 | 51 | 200 | 5 | 17 | 19 | 5 | 5 | 5 | 5 | 5 | 4 |

TABLE 31

| | | THICK-NESS (μm) | PIGMENT CONCEN-TRATION × THICKNESS | END-POINT SHEET TEMPER-ATURE (° C.) | AFTER FILM FORMATION | | | | CORROSION RESISTANCE OF WORKED PARTS | | | SCRATCH RESISTANCE | |
|---|---|---|---|---|---|---|---|---|---|---|---|---|---|
| | | | | | APPEARANCE | | | | | | | 5 | 10 |
| No. | | | | | CONCEALING PROPERTIES | L* | GLOSS-INESS | WORKING ADHESION | 24 TIME | 72 TIME | 120 TIME | RECIPRO-CATIONS | RECIPRO-CATIONS |
| COM-PARATIVE EXAMPLE | f1 | 3 | 18 | 200 | 2 | 34 | 31 | 1 | 4 | 2 | 1 | 3 | 2 |
| COM-PARATIVE EXAMPLE | f2 | 3 | 18 | 200 | 4 | 21 | 19 | 1 | 3 | 1 | 1 | 4 | 3 |
| COM-PARATIVE EXAMPLE | f3 | 3 | 18 | 200 | 4 | 18 | 17 | 3 | 4 | 3 | 2 | 4 | 3 |
| COM-PARATIVE EXAMPLE | f4 | 3 | 18 | 200 | 3 | 31 | 26 | 3 | 5 | 3 | 2 | 4 | 3 |
| COM-PARATIVE EXAMPLE | f5 | 3 | 18 | 200 | 2 | 31 | 28 | 2 | 4 | 2 | 1 | 3 | 2 |
| REFER-ENCE EXAMPLE | f7 | 3 | 0 | 200 | 1 | 27 | 15 | 5 | 5 | 5 | 5 | 5 | 4 |

TABLE 31-continued

| | | PIGMENT CONCEN- | END-POINT SHEET | AFTER FILM FORMATION | | | | CORROSION RESISTANCE OF WORKED PARTS | | | SCRATCH RESISTANCE | |
| | | TRATION | TEMPER- | APPEARANCE | | | | | | | 5 | 10 |
| | THICK- NESS | × | ATURE | CONCEALING | | GLOSS- | WORKING | 24 | 72 | 120 | RECIPRO- | RECIPRO- |
| No. | (μm) | THICKNESS | (° C.) | PROPERTIES | L* | INESS | ADHESION | TIME | TIME | TIME | CATIONS | CATIONS |
| REFERENCE EXAMPLE | f8 | 3 | 18 | 200 | 5 | 21 | 15 | 2 | 5 | 3 | 2 | 3 | 2 |
| REFERENCE EXAMPLE | f9 | 3 | 18 | 200 | 5 | 21 | 15 | 1 | 4 | 2 | 2 | 5 | 5 |
| COMPARATIVE EXAMPLE | f10 | — | | | 1 | 28 | 6 | 5 | 3 | 2 | 1 | 2 | 2 |

As shown in Tables 29 to 31, in the surface-treated steel sheets of Examples r1 to r87, concealing properties were graded 3 or higher, the L* value was graded 35 or less, and the 60-degree gloss value was graded 50 or less, thereby obtaining an excellent appearance. In addition, working adhesion was graded 4 or higher, corrosion resistance of worked parts was graded 3 or higher even after any of test times, scratch resistance was graded 3 or higher, and thus working adhesion, corrosion resistance of worked parts, and scratch resistance were excellent.

Example 5

A coloring painted film layer including a coloring pigment layer was formed on the surface of the surface-treated steel sheet having the coated layer including zinc and oxides of vanadium, which was manufactured in Example 1, by the method described as follows.

In addition, when the coloring painted film layer was formed, as necessary, by the method described as follows, a primer-painted film layer was formed between the coated layer and the coloring pigment layer on one side surface, thereby forming a coloring painted film layer consisting of the coloring pigment layer and the primer-painted film layer.

In addition, as necessary, a chemical conversion treatment layer was formed between the coated layer and the coloring painted film layer on one side surface by the method described as follows.

[Formation of Chemical Conversion Treatment Layer]

In a case where a chemical conversion treatment was performed on one side surface of the steel sheet formed with the coated layer, a chemical conversion treatment of applying a treatment liquid described as follows with an adhesion amount of 100 mg/m$^2$ by a roll coater, thereby forming a chemical conversion treatment film. Thereafter, the chemical conversion treatment film was dried under the condition in which the temperature of steel sheet had reached 60° C. in a hot air oven and was naturally cooled, thereby obtaining a chemical conversion treatment layer.

[Treatment Liquid of Chemical Conversion Treatment]

An aqueous solution including 5 g/L of a silane coupling agent, 1.0 g/L of silica, and 25 g/L of a resin was prepared to be used as the treatment liquid of the chemical conversion treatment. In addition, γ-glycidoxypropyltrimethoxysilane was used as the silane coupling agent, "SNOWTEX-N" made by NISSAN CHEMICAL INDUSTRIES, Ltd. which is water dispersion fine particle silica was used as the silica, and polyacrylic acid which is a water-based acrylic resin was used as the resin.

[Formation of Primer-Painted Film Layer]

On one side surface of the steel sheet formed with the coated layer or on one side surface of the steel sheet formed with the chemical conversion treatment layer on the coated layer, a primer paint was applied with a film thickness of 5 μm by a roll coater, thereby forming a primer-painted film. Thereafter, the primer-painted film was dried and baked under the condition in which the temperature of steel sheet had reached 210° C. in an induction heating oven and was water-cooled, thereby obtaining a primer-painted film layer.

[Primer Paint]

As the resin, a resin obtained by cross-linking a polyester resin with melamine was used. As the polyester resin, "Vylon (registered trademark) 29CS (which was obtained by dissolving "Vylon (registered trademark) 290" as an amorphous polyester resin in an organic solvent to be in a liquid phase and have a solid content concentration of 30 mass %, had a cyclohexanone/Solvesso dissolved type, and had a glass transition point (hereinafter, Tg) of 72° C. and a number average molecular weight (hereinafter, MN) of 17,000.)" made by TOYOBO CO., LTD. was used, and as the curing agent, a melamine resin "CYMEL (registered trademark) 303" made by Mitsui Cytec Ltd. was used. The mixing ratio of the polyester resin and the melamine resin was set to polyester resin:melamine resin=80:20, in terms of mass ratio of the solid content of the resin.

The primer paint was manufactured by adding, to a clear paint obtained by adding 0.5 mass % of an acidic catalyst "CATALYST TM600" made by Mitsui Cytec Ltd. to the mixed solution of the polyester resin and the melamine resin mixed at the above mixing ratio and stirring the resultant, a rust-preventive pigment (obtained by mixing aluminum dihydrogen tripolyphosphate "K-WHITE K-G105" (hereinafter, referred to as "P—Al""), which included P, was subjected to a Mg treatment, and made by Tayca Corporation, with calcium ion exchanged silica "SHIELDEX C303" (hereinafter, referred to as Ca—Si) which included Si and was made by W. R. Grace & Co.-Conn. at a mass ratio of P—Al:Ca—Si=1:1) at the addition amount (the content of the rust-prevent pigment of the rust-preventive agent in the primer-painted film layer (solid content concentration)) shown in Table 2, and stirring the resultant.

In addition, in order to apply the primer paint, the primer paint was appropriately diluted by an organic solvent (obtained by mixing cyclohexanone and Solvesso 150 at a mass ratio of cyclohexanone:Solvesso 150=1:1) to adjust the viscosity.

[Formation of Coloring Pigment Layer of One Side Surface (Front Surface)]

On one side surface of the steel sheet formed with the coated layer or on one side surface of the steel sheet formed with the chemical conversion treatment layer and/or the primer-painted film layer on the coated layer, a coloring paint described as follows was applied with a film thickness of 15 μm by a curtain coater, thereby forming a coloring painted film. Thereafter, the coloring painted film was dried and baked under the condition in which the temperature of steel sheet had reached 230° C. in an induction heating oven and was water-cooled, thereby obtaining a coloring pigment layer.

[Coloring Paint]

As the resin, a resin obtained by cross-linking a polyester resin with melamine was used. As the polyester resin, "Vylon (registered trademark) C300 (which was an amorphous polyester resin, had a cyclohexanone/Solvesso dissolved type, and had a Tg of 7° C. and a number average molecular weight (MN) of 23,000)" made by TOYOBO CO., LTD. was used, and as the curing agent, a melamine resin "CYMEL (registered trademark) 303" made by Mitsui Cytec Ltd. was used. The mixing ratio of the polyester resin and the melamine resin was set to polyester resin:melamine resin=80:20, in terms of mass ratio of the solid content of the resin.

The coloring paint was manufactured by adding, to a clear paint obtained by adding 0.5 mass % of an acidic catalyst "CATALYST TM600" made by Mitsui Cytec Ltd. to the mixed solution of the polyester resin and the melamine resin mixed at the above mixing ratio and stirring the resultant, titanium oxide "TIPAQUE (registered trademark) CR-95" made by ISHIHARA SANGYO KAISHA, LTD., which is a white pigment, or carbon black "TOKA BLACK #7350" made by TOKAI CARBON CO., LTD., which is a black pigment, and stirring the resultant.

In addition, in a case where the titanium oxide was used as the pigment, 100 parts by mass thereof was added to 100 parts by mass of the whole resin solid content in the coloring paint. In addition, in a case where the carbon black was used as the pigment, 5 parts by mass thereof was added to 100 parts by mass of the whole resin solid content in the coloring paint.

In addition, in order to apply the coloring paint, the coloring paint was appropriately diluted by an organic solvent (obtained by mixing cyclohexanone and Solvesso 150 at a mass ratio of cyclohexanone:Solvesso 150=1:1) to adjust the viscosity.

[Formation of Coloring Pigment Layer on the Other Side Surface (Rear Surface)]

On the other surface of the steel sheet 81 formed with the coated layer, "FL100HQ" which is a commercially available polyester-based finish coating paint and made by NIPPON PAINT Co., Ltd. was applied by a roll coater with a film thickness of 5 μm, thereby forming a gray coloring painted film. Thereafter, the coloring painted film was dried and baked under the condition in which the temperature of steel sheet had reached 210° C. in an induction heating oven and was water-cooled, thereby obtaining a coloring pigment layer of the other surface.

The following evaluation tests were performed on the surface-treated steel sheets manufactured as described above as performances after forming the film. In addition, in any of the tests, the tests were performed on one side surfaces (front surfaces) for evaluation. The results of the evaluation tests are shown in Table 32.

I. Bending Workability Test

Figure 9:
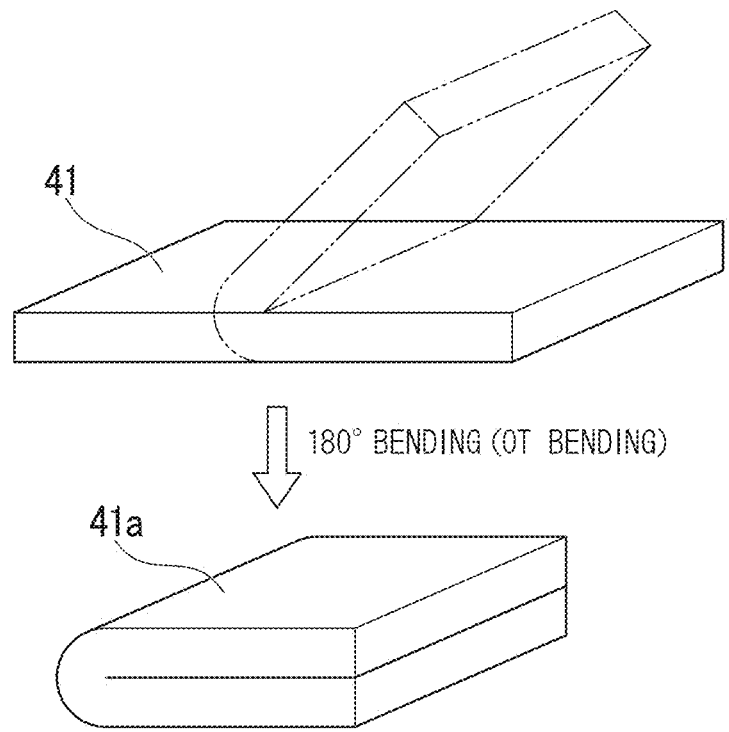
FIG. 9 is a schematic perspective view for explaining bending in a bending workability test.

FIG. 9 is a schematic perspective view for explaining bending in the bending workability test. As shown in FIG. 9, an evaluation surface 41*a* (one side surface) of the surface-treated steel sheet 41 was set to be positioned on the outside in the atmosphere of 20° C., and 180° bending (contact bending generally called "0T bending") was performed, and the worked part was observed by a 20 times magnifying glass to determine the absence or presence of cracks in the painted film.

In addition, a tape was attached to the worked part of the bent steel sheet 41 and was peeled off to observe a residual state of the painted film after peeling off the tape. In addition, a case where the painted film was not peeled at all over the entire surface of the worked part was evaluated as A, a case where the painted film was peeled off from a part of the worked part was evaluated as B, and a case where the entire surface of the painted film was peeled off was evaluated as C.

II. Drawing Workability Test

A cylinder drawing test of forming a molded body through press work was performed on the surface-treated steel sheets using an Erichsen type 20*t* press tester under the conditions described as follows. Press work was performed until the surface-treated steel sheet was drawn out under the conditions of a die shoulder R of a die of 3 mm, a punch shoulder R of 3 mm, a punch diameter of ϕ50 mm, a drawing ratio of 2.0, a blank holding pressure of 1 t, and no lubricating oil, thereby obtaining a cup-shaped molded body 42 illustrated in FIG. 10.

Figure 10:
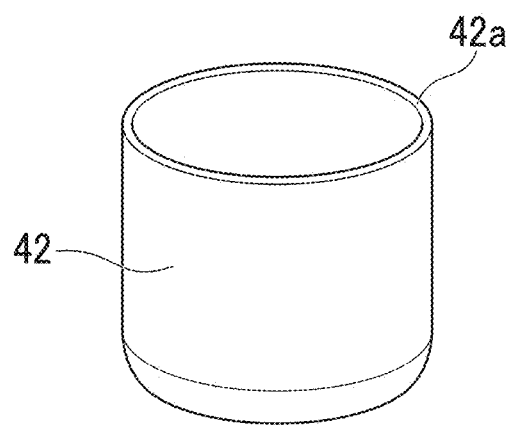
FIG. 10 is a schematic perspective view illustrating a cup-shaped molded body in a drawing workability test.

FIG. 10 is a schematic perspective view illustrating the cup-shaped molded body in the drawing workability test. The molded body 42 illustrated in FIG. 10 was dipped into boiling water for 1 hour, and the painted film was observed after the dipping. In addition, those in which the painted film was not peeled off from the molded body 42 at all were evaluated as A, those having portions peeled off from a molded body end surface 42*a* of the molded body 42 illustrated in FIG. 10 within a printed film peeled width of 5 mm were evaluated as B, and those having portions peeled off from the molded body end surface 42*a* over a painted film peeled width of 5 mm were evaluated as C.

III. Corrosion Resistance Test

The obtained surface-treated steel sheet was cut into a size of 70 mm in width×150 mm in length to be used as a sample for a corrosion resistance test. In addition, when the surface-treated steel sheet was cut, the end surface portion which was the long side of the sample was set so that warpage (burr) during cutting was to be on the other side surface (rear surface) (was to be lower burr). In addition, the end surface portion of the short side of the sample was sealed with a tape after cutting.

A salt spray test was performed on the samples obtained as described above by the method described in 9.1 of JIS K 5400. Salt water was sprayed onto one side surface (front surface) to inject the surface. The test time was set to 240 hours. In addition, in this test, cut flaws that reach the basis material (the steel sheet) of the sample from above the painted film were not provided.

After the test was ended, the average blistering width and the maximum blistering width of the end surface of the long side of the sample were measured, and a case where the average blistering width was 2 mm or less was evaluated as S, a case of greater than 2 mm and equal to or less than 3 mm was evaluated as A, a case of greater than 3 mm and equal to or less than 5 mm was evaluated as B, a case of greater than 5 mm was evaluated as C. In addition, regarding the average blistering width of the end surfaces, the average blistering width was obtained by dividing the long side of the sample having a length of 150 mm by interval of 10 mm into sections (a total of 15 sections), measuring the maximum blustering width in each of the sections, and dividing the sum of the maximum blustering widths of the sections by the number of total sections (15).

INDUSTRIAL APPLICABILITY

In the surface-treated steel sheet according to the present invention, the coated layer which has a vanadium content of 1% or higher and 20% or less and a coating weight of 3 g/m² or higher and 40 g/m² or less, has a plurality of dendritic arms that are grown in the thickness direction of the steel sheet, and has a ratio x/y of a content x of vanadium that is present outside the arms to a content y of vanadium that is present inside the arms of 1.1 or higher and 3.0 or less in

TABLE 32

| | | | PRIMER-PAINTED FILM LAYER | | | EVALUATION TEST RESULT AFTER FILM FORMATION | | |
|---|---|---|---|---|---|---|---|---|
| | | CHEMICAL CONVERSION TREATMENT | | RUST-PREVENTIVE | COLORING | | | |
| No. | COATING | LAYER PRESENCE OR ABSENCE | PRESENCE OR ABSENCE | AGENT CONTENT (MASS %) | PIGMENT LAYER (COLOR) | BENDING WORKA-BILITY | DRAWING WORKA-BILITY | CORROSION RESISTANCE |
| EXAMPLE n1 | m4 | ABSENCE | ABSENCE | | BLACK | A | B | A |
| EXAMPLE n2 | m9 | ABSENCE | ABSENCE | | BLACK | A | B | A |
| EXAMPLE n3 | m15 | ABSENCE | ABSENCE | | BLACK | A | B | A |
| EXAMPLE n4 | m40 | ABSENCE | ABSENCE | | BLACK | A | B | A |
| EXAMPLE n5 | m40 | PRESENCE | ABSENCE | | BLACK | A | A | A |
| EXAMPLE n6 | m40 | ABSENCE | PRESENCE | 3 | BLACK | A | B | A |
| EXAMPLE n7 | m40 | ABSENCE | PRESENCE | 5 | BLACK | A | B | S |
| EXAMPLE n8 | m40 | ABSENCE | PRESENCE | 15 | BLACK | A | B | S |
| EXAMPLE n9 | m40 | ABSENCE | PRESENCE | 30 | BLACK | A | B | S |
| EXAMPLE n10 | m40 | ABSENCE | PRESENCE | 50 | BLACK | B | B | S |
| EXAMPLE n11 | m40 | PRESENCE | PRESENCE | 3 | BLACK | A | A | A |
| EXAMPLE n12 | m40 | PRESENCE | PRESENCE | 5 | BLACK | A | A | S |
| EXAMPLE n13 | m40 | PRESENCE | PRESENCE | 15 | BLACK | A | A | S |
| EXAMPLE n14 | m40 | PRESENCE | PRESENCE | 30 | BLACK | A | A | S |
| EXAMPLE n15 | m40 | PRESENCE | PRESENCE | 50 | BLACK | A | B | S |
| EXAMPLE n16 | m15 | ABSENCE | ABSENCE | | BLACK | B | B | B |
| EXAMPLE n17 | m4 | ABSENCE | ABSENCE | | WHITE | A | B | A |
| EXAMPLE n18 | m9 | ABSENCE | ABSENCE | | WHITE | A | B | A |
| EXAMPLE n19 | m15 | ABSENCE | ABSENCE | | WHITE | A | B | A |
| EXAMPLE n20 | m40 | ABSENCE | ABSENCE | | WHITE | A | B | A |
| EXAMPLE n21 | m40 | PRESENCE | ABSENCE | | WHITE | A | A | A |
| EXAMPLE n22 | m40 | ABSENCE | PRESENCE | 3 | WHITE | A | B | A |
| EXAMPLE n23 | m40 | ABSENCE | PRESENCE | 5 | WHITE | A | B | S |
| EXAMPLE n24 | m40 | ABSENCE | PRESENCE | 15 | WHITE | A | B | S |
| EXAMPLE n25 | m40 | ABSENCE | PRESENCE | 30 | WHITE | A | B | S |
| EXAMPLE n26 | m40 | ABSENCE | PRESENCE | 50 | WHITE | B | B | S |
| EXAMPLE n27 | m40 | PRESENCE | PRESENCE | 3 | WHITE | A | A | A |
| EXAMPLE n28 | m40 | PRESENCE | PRESENCE | 5 | WHITE | A | A | S |
| EXAMPLE n29 | m40 | PRESENCE | PRESENCE | 15 | WHITE | A | A | S |
| EXAMPLE n30 | m40 | PRESENCE | PRESENCE | 30 | WHITE | A | A | S |
| EXAMPLE n31 | m40 | PRESENCE | PRESENCE | 50 | WHITE | A | B | S |
| EXAMPLE n32 | m15 | ABSENCE | ABSENCE | | BLACK | B | B | B |
| COMPARATIVE EXAMPLE n33 | x1 | ABSENCE | ABSENCE | | BLACK | C | C | C |
| COMPARATIVE EXAMPLE n34 | x3 | ABSENCE | ABSENCE | | BLACK | C | C | B |
| COMPARATIVE EXAMPLE n35 | x4 | ABSENCE | ABSENCE | | BLACK | C | C | B |
| COMPARATIVE EXAMPLE n36 | x9 | ABSENCE | ABSENCE | | BLACK | C | C | C |

As shown in Table 32, in the surface-treated steel sheets of Examples n1 to n32, all evaluations were B or higher. Even in the surface-treated steel sheets of Examples n1 to n5, n16 to n21, and n32 in which the coloring painted film layer did not include the primer-painted film layer but was only made from the coloring pigment layer, and even in the surface-treated steel sheets of Examples n1 to n4, n6 to n10, n16 to n20, n22 to n26, and n32 in which a chemical conversion treatment layer was not formed between the coloring painted film layer and the coated layer, corrosion resistance and/or workability was excellent.

terms of vanadium element is formed. Therefore, corrosion resistance and painting adhesion are excellent.

DESCRIPTION OF REFERENCE NUMERALS AND SIGNS

1, 10, 71, 81: STEEL SHEET
2, 32: COATING BATH
21, 22: COATING TANK
3, 23: ANODE
4, 5: ROLL

2a: UPPER SUPPLY PIPE
2b: LOWER SUPPLY PIPE
21a: UPPER TANK
21b: LOWER TANK
32c: DISCHARGE PORT
32d: SUPPLY PORT
32e: PIPE
P: PUMP
11: COATED LAYER
12: COLUMNAR CRYSTAL

The invention claimed is:

1. A surface-treated steel sheet comprising:
a steel sheet; and
a coated layer which is formed on one surface or both surfaces of the steel sheet and includes zinc and vanadium,
wherein the coated layer has a vanadium content of 1% or higher and 20% or less and a coating weight of 3 g/m$^2$ or higher and 40 g/m$^2$ or less, and has a plurality of dendritic arms that are grown in a thickness direction of the steel sheet, and
wherein a ratio x/y of a content x of the vanadium that is present outside the arms to a content y of the vanadium that is present inside the arms is 1.1 or higher and 3.0 or less in terms of the vanadium element.

2. The surface-treated steel sheet according to claim 1, wherein the coated layer has an emissivity of 0.30 or higher and 0.95 or less in a region where a wave number measured under a condition of a surface temperature of 100° C. is 600 to 3000 cm$^{-1}$.

3. The surface-treated steel sheet according to claim 1 or 2,
wherein a surface roughness of the coated layer is 1.0 μm or higher and 4.0 μm or less in terms of center-line average roughness Ra specified in JIS B 0601:2001.

4. The surface-treated steel sheet according to claim 1 or 2,
wherein one or more layers of films are further formed on the coated layer.

5. The surface-treated steel sheet according to claim 4, wherein the film contains an organic resin.

6. The surface-treated steel sheet according to claim 5, wherein the film is a resin film, and contains:
5 to 50 parts by mass of metal oxide particles with respect to 100 parts by mass of a solid content of the resin film; and
0.1 to 30 mass % of a lubricant with respect to 100 mass % of the solid content of the resin film.

7. The surface-treated steel sheet according to claim 5, wherein the organic resin has at least one type of a carboxyl group, a hydroxyl group, a sulfonic acid group, and a silanol group in its structure, and includes:
a polyester resin containing a sulfonic acid group;
a curing agent; and
a coloring pigment containing carbon black.

8. The surface-treated steel sheet according to claim 4, wherein the film is obtained by applying and drying a water-based metal surface treatment agent containing a silane coupling agent onto the steel sheet.

9. The surface-treated steel sheet according to claim 8, wherein the film further contains an inhibitor component which essentially includes a fluorometal complex compound having at least one type selected from titanium and zirconium.

10. The surface-treated steel sheet according to claim 8, wherein the film is a composite film including:
a polyether polyurethane resin; and
a coloring pigment containing carbon black.

11. The surface-treated steel sheet according to claim 5, wherein the film is a coloring painted film layer including a coloring pigment layer.

12. The surface-treated steel sheet according to claim 11, wherein the coloring painted film layer includes a primer-painted film layer, and
the primer-painted film layer is formed between the coated layer and the coloring pigment layer and includes a rust-preventive agent.

13. The surface-treated steel sheet according to claim 11, wherein the coloring painted film layer is formed on the coated layer to be in contact therewith.

14. The surface-treated steel sheet according to claim 11, wherein a chemical conversion treatment layer is further included between the coloring painted film layer and the coated layer.

* * * * *